US008713515B1

(12) United States Patent
Biggerstaff

(10) Patent No.: US 8,713,515 B1
(45) Date of Patent: Apr. 29, 2014

(54) AUTOMATED SYNCHRONIZATION OF DESIGN FEATURES IN DISPARATE CODE COMPONENTS USING TYPE DIFFERENCING

(71) Applicant: Ted James Biggerstaff, Austin, TX (US)

(72) Inventor: Ted James Biggerstaff, Austin, TX (US)

(73) Assignee: Ted J. Biggerstaff, Austin, TX (US)

( * ) Notice: Subject to any disclaimer, the term of this patent is extended or adjusted under 35 U.S.C. 154(b) by 0 days.

(21) Appl. No.: 13/892,462

(22) Filed: May 13, 2013

(51) Int. Cl.
*G06F 9/44* (2006.01)
*G06F 9/45* (2006.01)

(52) U.S. Cl.
USPC ............ 717/104; 717/106; 717/114; 717/137

(58) Field of Classification Search
USPC ....................................................... 717/137
See application file for complete search history.

(56) References Cited

U.S. PATENT DOCUMENTS

| | | | | |
|---|---|---|---|---|
| 5,815,713 | A * | 9/1998 | Sanders | 717/106 |
| 6,269,480 | B1 * | 7/2001 | Curtis | 717/106 |
| 6,314,562 | B1 * | 11/2001 | Biggerstaff | 717/156 |
| 7,269,823 | B2 * | 9/2007 | Szyperski | 717/123 |
| 2002/0147696 | A1 * | 10/2002 | Acker et al. | 707/1 |
| 2004/0083454 | A1 * | 4/2004 | Bigus et al. | 717/117 |
| 2006/0225053 | A1 * | 10/2006 | Lakshman et al. | 717/140 |
| 2009/0300054 | A1 * | 12/2009 | Fisher et al. | 707/102 |

OTHER PUBLICATIONS

Mark Asztalos, Eugene Syriani, Manuel Wimmer, and Marouane Kessentini. 2010. Simplifying model transformation chains by rule composition. In Proceedings of the 2010 international conference on Models in software engineering (Models'10), Juergen Dingel and Arnor Solberg (Eds.). Springer-Verlag, Berlin, Heidelberg, 293-307.*

Luca Cardelli, "Type Systems," in Allen B. Tucker, ed., The Computer Science and Engineering Handbook. CRC Press: 2208-2236, 1997.

Luca Cardelli and Peter Wegner, "On understanding types, data abstraction, and polymorphism," ACM Computing Surveys, vol. 17, No. 4, Dec. 1985.

Edmund M. Clarke, Jeannette M. Wing, et al., "Formal Methods: State of the Art and Future Directions", ACM Computing Surveys, vol. 28, No. 4, Dec. 1996.

* cited by examiner

*Primary Examiner* — James D Rutten

(57) ABSTRACT

A method and a system for automatically synchronizing the design features of disparate but conceptually corresponding code elements (e.g., image representations) within disparate but potentially composable code components (e.g., frameworks and their payloads). For example, an element that is a field within a structure that points to an abstract image BP within a skeletal framework component may conceptually correspond to a simple element that is a concrete image B within some intended framework payload. In the composition of the framework and the computational payload, the concrete image B must acquire the design features of the abstract image BP (i.e., a pointer within a structure field) to be properly synchronized with the design of the framework. This invention automates differencing of composite types to compute transformations that can add design features to B to convert it to BP thereby synchronizing the design features of the framework and its payload.

24 Claims, 43 Drawing Sheets

| Type Constructor Form | Comments |
|---|---|
| (DSDefArray (<D1> <D2> ...) <atype> <keyword parms>) | <Di> is a dimension of the array. If the dimensions list is nil, the resulting type is the supertype of all arrays returning <type>. |
| (DSDefArray <tag> (<D1> <D2> ...) <atype> <keyword parms>) | <atype> is the array element type. <keyword parms> are specializers. <tag> is a C-like tag name allowing re-use without re-writing |
| (DSDefUnion ((<utype1> <name1> <keyword parms>) (<utype2> <name2> <keyword parms>) ...)) | Each "(<utypei> <namei> <keyword parms>)" type/name/keyword parms group is equivalent to (DSDeclare <utypei> <namei> <keyword parms>), (i.e., it creates an instance namei of type utypei with <keyword parms>) AND ALSO creates the type |
| (DSDefUnion <utag> ((<utype1> <name1> <keyword parms>) (<utype2> <name2> <keyword parms>) ...)) | (DSDefFieldOP <ftag> (<namei> <utag> <keyword parms>) <utypei>). Keyword parms allow types to be specific to a target program scope. |
| (DSDefStruct ((<ptype1> <name1> <keyword parms>) (<ptype2> <name2> <keyword parms>)...)) | Each "(<ptypei> <namei> <keyword parms>)" type/name/keyword parms is equivalent to (DSDeclare <utypei> <namei> <keyword parms>) ( i.e., it creates an instance namei of type ptypei) AND creates the type |
| (DSDefStruct <stag> ((<ptype1> <name1> <keyword parms>) (<ptype2> <name2> <keyword parms>)...)) | (DSDefFieldOP <ftag> (<namei> <stag> <keyword parms>) <ptypei>). <stag> is a subtype of all <ptypei> types. |

Fig. 1a

| Type Constructor Form | Comments |
|---|---|
| (DSDefFunop <tag> (<parm types>) <rettype>) | (<parm types>) is the list of parameter types. It may be nil. |
| (DSDefFunop (<parm types>) <rettype>) | <rettype> is the return type of the function. |
| (DSDefFieldOP<br>(<fieldname> <stag> <keyword parms>)<br><resulttype>) | <stag> is the tag of the struct or union that generated this DSDefFieldOP.<br><keyword parms> allow keyword parameters like :dsvalue (for initial values) and :myscope to make type definitions specific to scope objects within the target program being generated. |
| (DSDefFieldOP <ftag><br>(<fieldname> <stag> <keyword parms>)<br><resulttype>) | <ftag> is the tag name for referencing the field and is human provided or if not human provided, a unique <ftag> name is generated. |
| (DSDefPtr <decl> <keyword parms>) | <decl> is a type. This creates a specialization of type <decl>. |
| (DSDefMulti <tag> (<ptype1> <ptype2> ...) | Generates a type with multiple supertypes <ptype1>, <ptype2>, etc. |

Fig. 1b

| | |
|---|---|
| (<storageclass> <type>)<br>(<storageclass> <type> <keyword parms>) | <storageclass> includes for example, auto, extern, register, static and typedef. |
| (<typequalifiers> <type>)<br>(<typequalifiers> <type> <keyword parms>) | <typequalifiers> includes, for example, const, restrict, and volatile. |
| (<type-spec> <type>)<br>(<type-spec> <type> <keyword parms>) | <type-spec> includes, for example, short, long, signed, and unsigned. |
| (<type> <keyword parms>) | <type> is any legal type (e.g., unsigned) that may be specialized by keyword parms (e.g., ":myscope scope3") |

$$b = [(a \oplus s)^2 + (a \oplus sp)^2]^{1/2}$$

― 22a-02

Where $\oplus$ is mathematically defined as:

$$(a_{i,j} \oplus s) = (\Sigma_{p,q} \, (w(s)_{p,q} * a_{i+p, j+q})$$

Fig. 22a

AUTOMATED SYNCHRONIZATION OF DESIGN FEATURES IN DISPARATE CODE COMPONENTS USING TYPE DIFFERENCING

CROSS-REFERENCE TO RELATED APPLICATIONS

U.S. Pat. No. 8,060,857, Titled "Automated Partitioning of a Computation for Parallel or Other High Capability Architecture," Ted J. Biggerstaff, Application Jan. 31, 2009, Issued Nov. 15, 2011.

U.S. Pat. No. 8,225,277, Titled "Non-Localized Constraints for Automated Program Generation," Ted J. Biggerstaff, Application Apr. 25, 2010, Issued Jul. 17, 2012.

U.S. Pat. No. 8,327,321, Titled "Synthetic Partitioning for Imposing Implementation Design Patterns onto Logical Architectures of Computations," Ted J. Biggerstaff, Application Aug. 27, 2011, Issued Dec. 4, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable.

INCORPORATION-BY-REFERENCE OF MATERIAL SUBMITTED ON COMPACT DISC

Not Applicable

BACKGROUND

This invention is understood to be implemented on a general purpose computer comprising a processor, memory and associated support hardware. All algorithms and processes described within this specification execute on this hardware.

FIELD OF INVENTION

In general, this invention relates to the automatic generation of computer programs that are built by combining and synchronizing the designs of a plurality of separately derived and disparate code components. The components are disparate from each other in that one component may have design features that some other, ostensibly combinable component, does not have. The mechanisms of this combining and synchronization are different from methods that are employed by conventional programming languages in the sense that some modifications will be required (e.g., adding missing design features) to one or the other of components in order to make them compatible and compose-able. If these components were defined in conventional programming languages or even conventional design abstractions, it would require human intelligence and action to rework one or several of the components to make them compatible and therefore, compose-able. In this invention, the components are specified in terms of non-programming language abstractions that render them open to fully automated reworking that will make them compatible (i.e., synchronize their design features) and therefore, make them combinable without human intervention. As a consequence, this invention introduces fully automated synchronization mechanisms that are more general than, more automated than, and more flexible than combining methods that are employed by conventional programming languages. That is to say, these mechanisms are different from and more powerful and general than methods such as, simple (i.e., macro-like) substitution and expansion; direct or indirect calling of procedures, functions and methods; API (Application Program Interface) protocols for inter- and intra-module communication (e.g., operating system services APIs); etc. Importantly, the components that are being combined via this invention may have design differences that render automated use of the combination methods used by conventional programming languages infeasible for these components. Nevertheless, the design differences among disparate components that have conceptual relationships that can be intuitively detected by a human programmer, but cannot be determined and processed by automated methods, can nevertheless be automatically determined and processed by this invention to adapt one or more of the components to work together. When so adapted, the designs of the adapted components are synchronized such that they may be consistently combined so that they work together to accomplish the combined computational goals of the various components. The conceptual relationships among distinct data entities within the separate components may suggest that the different and separate but conceptually related data entities are dealing with the same kinds of data even though the formal expressions of those distinct data entities are so different that the exact relationship is not automatically recognizable or processable by mechanisms of prior art.

As an example of a component, in the context of this invention, consider so-called design patterns. A design pattern might be combined with some other component written at a different place, at a different time by a different person. Design patterns in the context of this invention are frameworks comprising some coding details interspersed with gaps or holes wherein code coming from outside the framework can be put. The gaps or holes will have some associated information that guides, limits or restricts the kind and/or form of code that can be inserted there. This definition of design pattern is different from and more formalized than the informal notion of design patterns more commonly used. (See Erich Gamma, Richard Helm, Ralph Johnson, John Vlissides, "Design Patterns," Addison-Wesley, 1995.)

By this invention, for example, abstract design patterns can be expressed as generic code frameworks that represent a particular pattern of parallel processing without any design commitment to the exact nature or structure of the concrete computational payload component that is to be adapted to this pattern of parallel processing. (For more information about parallel processing patterns, see Timothy G. Mattson, Beverly A. Sanders, and Berna L. Massingill, "Patterns for Parallel Programming," Addison-Wesley, 2005.) This property allows these generic frameworks to be seeded with an infinite variety of specific concrete computational payloads with only minimal constraints on those payloads to realize an infinite variety of implementations and to do so automatically.

OBJECTS AND ADVANTAGES

There are several important mechanisms in this invention:
1. Type constructor machinery that allows the specification of functionally related types and their subtypes or alternatively, simply pairs of types that are functionally (but not subtype) related, such that the type/subtype structure (or non-subtype functional relationship) determines the functional relationship of instances of those types and subtypes and thereby, allows automated redesign (i.e., construction) of one instance from a related instance based on the relationship of their types;

2. A Composite type differencing mechanism to automatically generate redesign transformations where the redesign transformations will recode an instance of one of the types into the related instance of the other functionally related type;

3. Type inference rules that are automatically generated when functionally related types are generated by the composite type differencing mechanism;

4. Anaphoric Reference Protocol for Synchronizing (ARPS) to establish the domain specific (conceptual) relationships between entities in different contexts that need to be synchronized, where the relationships in one context are defined in terms of domain specific information (i.e., domain specific signposts) from the other context; and 5. Progenitor types (a form of parameterized type) that allows elements of composite types to be parameterized, thereby allowing a deferred, parametric connection between disparate components such as a design framework and a payload for that framework (possibly produced at different times and places). For example, a design framework could introduce new design features (e.g., a C-language like struct field whose value slot is the parameter ?BPvalue). The parameter allows such design features to be specified in the design framework even though they may not be present (and almost certainly will not be present) in a payload component when the design framework and payload are initially brought together for combination. However, given that ARPS can supply a conceptual connection between the parameter ?BPvalue in the design framework and some data item in the payload (e.g., a data matrix B), the type construction machinery can provide the opportunity to construct an explicit connection by creating a chain of functionally related types connecting the two. Such a type chain is designed to allow synchronization between the design framework and the payload. That is, the type chain allows data elements from the payload (e.g., a data matrix B) to be redesigned for the design framework context such that the redesigned instance will exploit the additional design feature (or features) of the design framework and thereby be suitable for direct use within an instantiated version of the design framework. The ARPS specification allows the generator to make the initial and critical "conceptual connection" between the parameter ?BPvalue in the framework and the data matrix B in the payload.

There are several advantages provided by these mechanisms:

1. The type constructor machinery that produces composite types built of more primitive types allows the expression of types that incorporate information specific to the context of definition (e.g., a payload context or a design framework context). Furthermore, such composite types also incorporate the functional relationships between the composite type and other types from the same or related contexts, thereby providing an opportunity to automatically redesign an instance of a type in one context to a computationally equivalent but structurally different instance of a type in another context (i.e., the two types have the same computational result but may be expressed differently only because of the context in which they are defined). In such a case, one of the contexts may include additional design features that the other does not and if so, the difference between the types reveals how to re-design the computation instance from the context without the additional design features into an instance in the context with the additional design features. For example, a payload may know an image matrix as the variable B defined in a scope named "scopeP" where its type might be "|(image_:myscope_scopeP)|". B might be determined to correspond to another version of the image type that is defined in scopeF (i.e., its type would be "|(image_:myscope_scopeF)|". The composite type machinery incorporating context information would allow one to automatically redesign an instance of "B" found in scopeP into the instance "(*(BC rsparms9))" in scopeF by differencing pairs of types in a type chain between type "|(image_:myscope_scopeP)|" and "|(image_:myscope_scopeF)|" and incrementally applying those differences to redesign "B" into "(*(BC rsparms9))". Context information in types along that chain contains problem specific information needed to create the new form, information such as the existence of BC as a field of rsparm9 (i.e., BC is an instance of a related C-style struct type).

2. The automatic generation of type inference rules expressing the relationships between functionally related types allows the new relationships to be automatically dealt with in the course of generation, totally without human intervention. These rules have the same characteristics as the existing type inference rules and because the type inference system of the preferred embodiment is based on inheritance, the new rules can be incorporated at the appropriate points in the type hierarchy and they will shadow similar but more general rules as they should but not trigger when the more general types should apply. Thus the type inference system is automatically extended by the machinery of the invention without the need for any manual intervention.

3. The ARPS system allows the expression of relationships between an entity in one context (e.g., a framework) and a "yet to be defined" entity in some other context (e.g., a payload for the framework). The "yet to be defined" entity is so designated because it may be defined in the future or at a different place or by a different programmer or perhaps some combination of these. Because the ARPS system operates on problem domain specific representations and eschews the programming language representation domain, it can establish connections between two disparate contexts with ease once they are brought together during the process of automatically generating a program. Inferring such connections in a programming language representation domain often involves extensive analysis, deep inference, partial evaluation of code and use of knowledge that is not specifically a part of the specification of the two contexts that a generator is attempting to connect. In the general case, the problem is so difficult in the programming language representation domain that it is often impossible for intelligent, knowledgeable humans with significant supporting material to accomplish it. On the other hand, establishing such connections in a problem domain representation mostly reduces to a problem of navigation through the problem domain objects using simple domain specific properties of the objects being navigated over. The reason for the simplicity is that the problem domain representation comprises elements that have not yet been integrated into programming code representations and are factored into separate and not yet interwoven design features (e.g., a partitioning pattern of the eventual code). Often, those domain representation elements "imply" certain features of the code representation but they have not yet been applied, integrated and propagated into a code representation, a representation where explicit domain elements have been converted into hidden but implied information. Said differently, while the programming language representation is prescriptive (i.e., it is an agenda of computational actions), the domain representation is factored into structures of declarative pieces (e.g., goals, data descriptions and constraints) that have yet to be processed into a prescriptive form. And the essence of ARPS expressions comprises finding pieces (e.g., computational goals or data descriptions) and the things that logically restrict or modify them (e.g., constraints). Therefore, ARPS applied to pre-program language representations of a computation converts a problem that is so difficult that it precludes automation when expressed in the programming language domain into a problem that is relatively easy to automate when expressed in the problem domain.

4. The parameters used in progenitor types allow one to defer connections to those parameters until payload integration time. When coupled with the ARPS machinery as a connection binding tool, we have a rough analogy to classical function parameter sequences and the calling machinery that binds actual arguments to those parameters. In this analogy, progenitor types play the role of parameters (to frameworks, in this case) and ARPS plays the role of the parameter binding mechanism. The analogy is not perfect but serves as a guide to understanding the mechanism. Like the parameter/argument system of conventional functions, the parameter variables represented by progenitor types and the ARPS connection mechanism allows separation of parts in time and space while still allowing the eventual integration of those parts to form a tightly integrated result. Overall, this facility combined with the other mechanisms of this invention, provides a higher variability of resultant components constructed from a smaller number of piece parts than a system that starts with piece parts that are expressed in a programming language domain (i.e., in code). This higher variability results from design frameworks being less constrained to a small set of possible payloads because the design frameworks assume very little about the payloads that will instantiate them. Therefore, almost any payload that has certain domain specific properties (e.g., computation of individual cells of a matrix are not dependent on the computation of other cells of the matrix) can instantiate the same design framework thereby providing a combinatorial amplification of the number of resultant components.

BRIEF SUMMARY OF THE INVENTION

This invention addresses the problem of integrating two separately derived pieces of code that are potentially compatible but differ in a few design details that will have to be synchronized to achieve compatibility. These design differences arise from slightly differing requirements for the differing specifications. For example, consider a code framework (i.e., a combination of actual code plus holes to accept insertion of foreign, target computation code, for example, Ref. 1-01) as one of those pieces of code. It might express a pattern of parallel computation using threads to implement parallel execution. Its design might be constrained by the requirements of the thread package used. For example, a routine for initiating a thread might only allow one user data parameter to be passed to the application programmer's thread routine (along with the thread specific parameters, of course). If that thread routine requires more than a single item of user data to operate (e.g., matrices, the dimensions of the matrices, and perhaps some start and end indexes specific to the algorithm), then the programmer may have to setup global variables to communicate that data to the thread routine. Alternatively, the programmer could package up the set of data into a structure (for example) before calling the thread routine, send a structure pointer to the thread routine as the single user argument and then unpack the data items within the application's thread routine. Given those requirements on the thread based code framework, then consider the nature of the target code payload (e.g., Ref. 1-02) that is to be merged with that thread based framework. That target computation payload might benefit from parallel computation but might require several design modifications to execute correctly with that framework (Ref. 1-01). For example, among the modifications that will have to be made to synchronize it with the code in the framework is the redesign of its references to its data. Its references to the user data (e.g., the matrices, etc.) will have to be modified to synchronize with the design implicit in the application's calling routine (i.e., the routine skeletally defined in the framework). For example, the direct references to the data matrices will have to be adapted to the structure design used to communicate the data to the user's thread routine. Of course, there are alternative design choices for data communication (e.g., global variables) but in either case, the code that is the framework for parallel operation and the code that specifies the actual computation must be coordinated. If the framework design cannot be changed (e.g., it is a reusable library component or it calls unchangeable routines), then the design of the payload will have to be altered. This invention provides an automated method for this redesign process.

More specifically, the invention provides a key mechanism for defining composite types (e.g., a pointer to BWImage) such that there is a functional relationship between the primitive type (e.g., BWImage) and the composite type (i.e. the pointer to BWImage), where BWImage is a black and white image type. The functional relationship determines how to automatically generate transformations that can automatically convert an instance (e.g., "B" as in Ref. 1-06) of one of the types (e.g., BWImage) into an instance of the other type (e.g., "(&B)"), where "&" is the "address" operator borrowed from the C language for concreteness. Similarly, the two functionally related types may allow the automatic generation of an inverse transformation. The inverse transformation will convert an instance of a pointer to a BWImage (e.g., "BP") into the BWImage pointed to by BP (e.g., "(*BP)"). BP might be within a different scope altogether from B (e.g., the *BP in the framework scope shown as Ref. 1-05). The automatically generated transformations as a class are called redesign transformations or redesigners for short. This machinery will be used to redesign instances of generated code (e.g., an expression to compute a convolution of an image) so that they can be used to instantiate a partially complete code framework (i.e., a pattern of some code and some receptacles for foreign code). Since the framework may need to use data items that are decorated with design features (e.g., a field containing a pointer to the data) that are not a part of the original data item, the original data item will need to be redesigned to synchronize with the requirements of the framework before it can be used in a context of the framework.

A key problem in using code components developed independently in one context (i.e., one scope) without knowledge of their potential use in and connections to elements of a disparate context (i.e., another scope) is that there is no feasible way to connect the elements of the one context (e.g., a payload context) to the conceptually corresponding elements of the other context (e.g., a framework context) without negating the independence of the two contexts and thereby negating the combinatorial value of pairing many independent contexts. Identifying the correspondences between disparate code components by concrete names is not feasible because the two contexts are developed independently and likely, at different times. Parameter connections are not feasible because like direct naming this would require some a priori coordination of the structure of the two disparate code components, which is not desirable. What the two contexts may know about each other is indirect. It is their domain specific entities, features and topology, which opens the door to a reference protocol that is based on one context searching for known or expected domain specific entities, features and relationships within the other context. This is a key mechanism of this invention. It provides a mechanism for expressing "anaphoric" references (i.e., references that are implied) in one code entity (e.g., the framework) to data items (e.g., an image data item that is being used as the output data item for a computation) in a separate, disparate and as yet undefined code entity (e.g., a computational payload to be used within the framework). This mechanism is called the Anaphoric Reference Protocol for Synchronization (ARPS). The anaphoric reference mechanism expresses references in terms of semantic (and largely domain specific) terms rather than in programming language structural forms or patterns (e.g., loops, code blocks, operators, etc.) or abstractions thereof. For example, a structure field within a framework may need a value from some as yet to be defined computational payload. Semantically, it knows only that that value will be an image that is being used as the input image of the payload computation. ARPS provides a notation whereby that relationship can be expressed in the definition of the field within the framework. ARPS provides machinery such that when a candidate computational payload is eventually identified, that ARPS reference will be used like a search query and will automatically resolve to the specific data item needed by the framework.

Once the ARPS expressions in a framework determine the conceptually corresponding items in the payload, the automated redesigners are invoked to redesign those payload items so that they are consistent with the framework design. Then the payload code (suitably redesigned to synchronize with the framework design) can be directly inserted into the holes of the framework.

BRIEF DESCRIPTION OF THE SEVERAL VIEWS OF THE DRAWINGS

Drawings

Drawing Figures
FIG. 1 Example of design synchronization problem
FIG. 1a Type Constructor Specifications (Part 1)
FIG. 1b Type Constructor Specifications (Part 2)
FIG. 1c Type Constructor Specifications (Part 3)
FIG. 2 Functionally related types, subtypes, instances and redesign transforms
FIG. 3 Specific examples of functionally related types, subtypes, instances and redesign transforms (for a one dimensional array)
FIG. 3a Specific examples of functionally related types, subtypes, instances and redesign transforms (for two dimensional array)
FIG. 4 Conceptual structure of scope specific types, subtypes, instances and redesign transforms
FIG. 4a Types and instances computed by differencing types (for instance C)
FIG. 4b Types and instances computed by differencing types (for instance D)
FIG. 5 Details of type differencing to adapt payload code of concrete example
FIG. 6 FindOrCreateType routine to construct a composite type from functional relation of more primitive types
FIG. 22a: Domain specific specification of a computation and mathematical definition of a convolution operator (S)

KEY REFERENCE NUMERALS IN DRAWINGS

Figure 1:
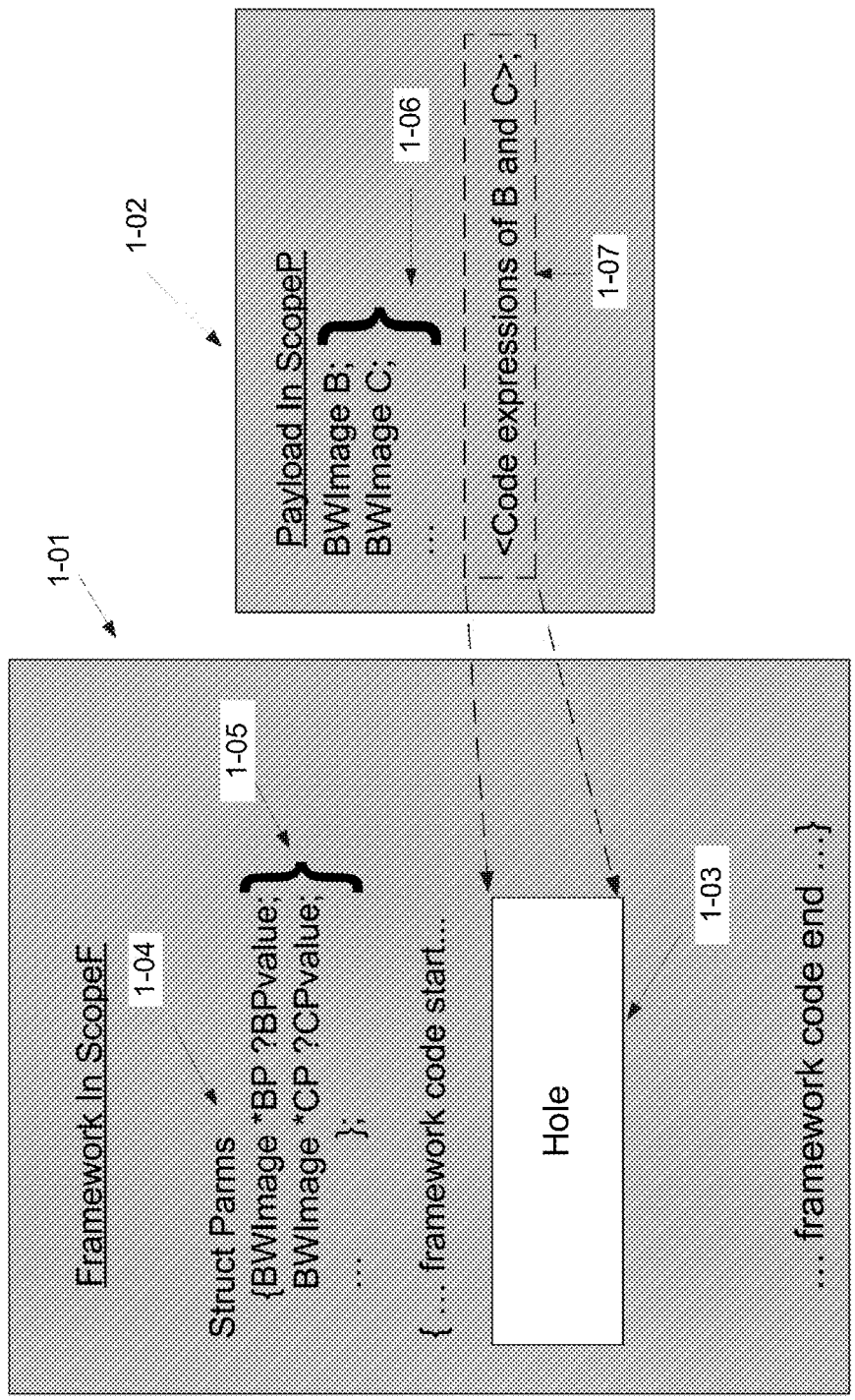

Ref. 1-01: Design framework
Ref. 1-02: Payload of design framework
Ref. 1-03: Hole for payload
Ref. 1-04: Framework data structure definitions with parameters to thread routine
Ref. 1-05: Detailed parameters required by thread routine
Ref. 1-06: Payload data definitions corresponding to detailed parameters required by thread routine
Ref. 1-07: Body of the payload
Ref. 2-01 through 2-06: Redesign transformations
Ref. 2-07 through 2-10: Specific types and their subtypes
Ref. 2-11 through 2-14: Instances of types derived from least specific type
Ref. 2-15 through 2-18: Instances of types derived from most specific type
Ref. 3-01 through 3-06: Redesign transformations
Ref. 3-07 through 3-10: Types and their subtypes
Ref. 3-11 through 3-18: Instances of types
Ref. 3a-01 through 3a-06: Redesign transformations
Ref. 3a-07 through 3a-10: Types and their subtypes
Ref. 3a-11 through 3a-18: Instances of types
Ref. 4-01 through 4-06: Redesign transformations
Ref. 4-07, 4-08a, and 4-09a: Chain of types and subtypes in the payload scope
Ref. 4-08b through 4-10b: Chain of types and subtypes in the framework scope
Ref. 4-11 through 4-13: Instances from payload incrementally specialized by addition of successive design features
Ref. 4-14 through 4-17: Instances from framework incrementally generalized by addition of inverse design features
Ref. 4-18: Cross link relating type of payload to corresponding type from framework
Ref. 4a-01a, 4a-02a: Chain of types and their supertypes for instances of C in payload
Ref. 4a-01b, 4a-02b: Chain of types and their supertypes for analogs of C instances in framework
Ref. 4a-03: Linking type
Ref. 4a-04 through 4a-06: Mapping an instance C (4a-04) in the payload to a composite form (4a-06) by adding design features from types
Ref. 4a-07 through 4a-10: Mapping analogs of instances of C in the design context of a framework by extracting design features from types
Ref. 4a-11 through 4a-12: Specializing transformations X1 and X2 Ref. 4a-13: Linking transformation X3
Ref. 4a-14 through 4a-15 and 4a-17: Generalizing transformations X4, X5 and X6
Ref. 4a-16: Common global type
Ref. 4b-01a, 4b-02b: Chain of types and their supertypes for instances of D in payload
Ref. 4b-01b, 4b-02b: Chain of types and their supertypes for analogs of D instances in framework
Ref. 4b-03: Linking type
Ref. 4b-04 through 4b-06: Mapping an instance D (4b-04) in the payload to a composite form (4b-06) by adding design features from types
Ref. 4b-07 through 4b-10: Mapping analogs of instances of D in the design context of a framework by extracting design features from types
Ref. 4b-11 through 4b-12: Specializing transformations X1 and X2
Ref. 4b-13: Linking transformation X3
Ref. 4b-14 through 4b-15 and 4b-17: Generalizing transformations X4, X5 and X6
Ref. 4b-16: Common global type
Ref. 5-01 through 5-04: Chains of scoped types and their subtypes or cross linked types
Ref. 5-05 through 5-07: Mapping an instance D (5-05) of a scoped type (Ref. 5-01) to a declaration form (5-07) by adding design features from types
Ref. 5-08 through 5-10: Mapping to an instance of C (5-08) of a scoped type (Ref. 5-01) to a declaration form (5-10) by adding design features from types
Ref. 5-11 through 5-12: Specializing transformations X2 and X3 applied to C
Ref. 5-13 through 5-14: Generalizing transformations X2 and X3 applied to D
Ref. 5-17: Defining a new scope specific instance of D (subscript "P" for expository purposes only)
Ref. 5-18 and 5-19: Instances of D and C of global type Bwimage
Ref. 5-20: Defining a new scope specific instance of C (subscript "P" for expository purposes only)
Ref. 5-21: Global type
Ref. 22-01: Partially translated Implementation Neutral Specification (INS) of a computation
Ref. 22-02: Loop constraint abstraction associated with INS
Ref. 22-03: Set of partitioning constraint abstractions associated with loop constraint
Ref. 22-04: Set of domain specific abstractions (neighborhoods) specialized to partitions
Ref. 22a-01: Domain specific definition of "Sobel" edge detection
Ref. 22a-02: Mathematical definition of convolution operator ($\oplus$)
Ref. 23-01: Preferred embodiment architecture browser's (partial) representation of conceptual view of FIG. 22
Ref. 23-02: "loop2D5" constraint object provisionally specifying a loop
Ref. 23-03: A provisional partition (edge11) of loop2D5
Ref. 23-04: The set of domain specific variables specialized to edge11 partition
Ref. 23-05: One of the domain specific variables specialized to edge11 partition
Ref. 23-06: The transforms that will provide code building blocks specialized to edge11
Ref. 23a-01: Internal form of a loop constraint (loop2D5) in preferred embodiment
Ref. 23a-02: Provisional name of first index of 2D loop (Idx1)
Ref. 23a-03: Range of first index, which is (0 99) but could be symbolic expressions
Ref. 23a-04: Provisional name of second index of 2D loop (Idx2)
Ref. 23a-05: Range of second index, which is (0 99) but could be symbolic expressions
Ref. 23a-06: Scope of definition
Ref. 23a-07: Set of partitions partially and provisionally defining logic architecture for loop2D5
Ref. 23a-08: Logical specification of loop2D5, which will determine design features of programming language Ref. 23*b*-01: Internal form of edge11 partition in preferred embodiment Ref. 23*b*-02: Scope of edge11

Ref. 23*b*-03: Partition set containing edge11

Ref. 23*b*-04: Intermediate language form that will resolve to a logical assertion (i.e., the partitioning condition) specific to the eventual edge11 code context Ref. 23*b*-05: A domain specific neighborhood that is specialized to edge11

Ref. 23*b*-06: Precursor edge partitions whose combination resulted in edge11

Ref. 23*c*-01: Internal form of transform w for spart-0-edge11 neighborhood in preferred embodiment Ref. 23*c*-02: Left hand side (lhs) of transform w for spart-0-edge11 neighborhood in preferred embodiment (partially elided by inspector function)

Ref. 23*c*-03: Original (as the user wrote it) lhs of transform w for spart-0-edge11 neighborhood in preferred embodiment (partially elided by inspector function)

Ref. 23*c*-04: Right hand side (rhs) of transform w for spart-0-edge11 neighborhood in preferred embodiment Ref. 23*c*-05: Holder (i.e., home) object for transform w for spart-0-edge11 neighborhood in preferred embodiment Ref. 23*c*-06: Print name of the object defining w for spart-0-edge11 neighborhood in preferred embodiment Ref. 23*d*-01: Internal form of transform w for spart-0-center15 neighborhood in preferred embodiment Ref. 23*d*-02: Left hand side (lhs) of transform w for spart-0-center15 neighborhood in preferred embodiment (partially elided by inspector function)

Ref. 23*d*-03: Original (as the user wrote it) lhs of transform w for spart-0-center15 neighborhood in preferred embodiment (partially elided by inspector function)

Ref. 23*d*-04: Right hand side (rhs) of transform w for spart-0-center15 neighborhood in preferred embodiment Ref. 23*d*-05: Holder (i.e., home) object for transform w for spart-0-center15 neighborhood in preferred embodiment Ref. 23*d*-06: Print name of the object defining w for spart-0-center15 neighborhood in preferred embodiment Ref. 23*e*-01: Human friendly form of transform w for spart-0-edge11 neighborhood in preferred embodiment Ref. 23*e*-02: Left hand side (lhs) of transform w for spart-0-edge11 neighborhood in preferred embodiment (full pattern expression partially elided by size of window)

Ref. 23*e*-03: Right hand side (rhs) of transform w for spart-0-edge11 neighborhood in preferred embodiment Ref. 23*e*-04: Holder (i.e., home) object for transform w for spart-0-edge11 neighborhood in preferred embodiment Ref. 23*e*-05: Print name of the object defining w for spart-0-edge11 neighborhood in preferred embodiment Ref. 23*f*-01: Human friendly form of transform w for spart-0-center15 neighborhood in preferred embodiment Ref. 23*f*-02: Left hand side (lhs) of transform w for spart-0-center15 neighborhood in preferred embodiment (full pattern expression partially elided by size of window)

Ref. 23*f*-03: Right hand side (rhs) of transform w for spart-0-center15 neighborhood in preferred embodiment Ref. 23*f*-04: Holder (i.e., home) object for transform w for spart-0-center15 neighborhood in preferred embodiment Ref. 23*f*-05: Print name of the object defining w for spart-0-center15 neighborhood in preferred embodiment Ref. 24-01: Preferred embodiment browser's (partial) representation of conceptual view of FIG. 22

Ref. 24-02: A provisional partition (center15) of loop2D5 (the hidden, lower part of FIG. 23 elided by FIG. 23 window size)

Ref. 24-03: The set of domain specific variables specialized to center15 partition Ref. 24-04: One of the domain specific variables specialized to center15 partition Ref. 24-05: The transforms that will provide code building blocks specialized to center15

Ref. 25-01: Association of INS to two loop constraints

Ref. 25-02: Partially translated Implementation Neutral Specification of Sobel edge detection computation Ref. 25-03: Loop constraint provisionally defining loop to process a slice of center15

Ref. 25-04: Loop constraint provisionally defining loop to produce slices of center15

Ref. 25-05 through 25-08: Edge partitions of an image

Ref. 25-09: Center partition of an image

Ref. 25-10: Computational neighborhoods of the current pixel specialized for various partitions Ref. 25-12: A synthetic partition representing the set of slices of center15

Ref. 25-13: A synthetic partition representing the any slice from the Ref. 25-13 set

DETAILED DESCRIPTION OF THE INVENTION

The Problem

This invention addresses the problem of integrating two separately derived pieces of code that are conceptually compatible but differ in minor design details that will have to be synchronized. These design differences arise from slightly differing requirements for the differing derivations. For example, consider a code framework Ref. 1-01 as one of those differently derived pieces of code. A framework is a combination of actual code plus holes designed to accept the insertion of foreign, target computation code. Such a framework is likely to introduce some new design elements (e.g., the data structure Ref. 1-04) that do not exist in some computational payload (Ref. 1-02) for that framework. The payload might, for example, be a target computation specification for computing a convolution of a black and white image B of type BWImage. On the other hand, the framework might express a pattern of parallel computation using threads to implement parallel execution of some as yet unspecified target computation (e.g., the convolution of a black and white image). The framework's design might be constrained by the requirements of the thread package it uses. For example, the thread routine for initiating a thread may only allow one user data parameter to be passed to the application programmer's thread routine (along with additional specific parameters required for thread management). If the application programmer's thread routine body (i.e., the payload of the framework), which is to perform the target computation, requires more than a single item of user data to operate (e.g., matrices, the dimensions of the matrices, and perhaps some start and end indexes specific to the algorithm—see Ref. 1-06), then the programmer, as one option, may have to setup global variables to communicate all of that data to the thread routine. Alternatively, the framework could allow a struct (i.e., C-language like data structure) to be defined (Ref. 1-04 and 1-05) that contains all of the data needed by the application programmer defined computation. That programmer defined computation (Ref. 1-07) will become the payload to be inserted into the thread routine within the framework, in which case, the framework would be designed to pass the structure's address to the thread routine. Much of the miniscule detail like the thread routine skeleton, its parameter sequence definition and calls to it, among other things, are elided from this example and only hinted at by the " . . . framework code start . . . " and " . . . framework code end . . . " indicators. This elision is intended to keep the example simple. Moreover, it is not critical to the understanding of the invention in that anyone skilled in the art could easily develop workable architectures for these structures.

Also, in this case, the global declarations of the payload (Ref. 1-06) must be moved to a final scope that is global to the framework scope although this too is elided from the example because the solution would be almost trivially simple for one skilled in the art. Moreover, since the parameter struct (Ref. 1-04) in the framework will be determined by the details of the target computational payload (Ref. 1-02), a fully general solution to the problem would allow for the parameter structure (Ref. 1-04) to be custom generated (at the framework/payload combination time) based on the requirements of the payload Ref. 1-02. However, to make the following examples easier to understand, we will pretend that the declaration of Ref. 1-04 is already completed at the start of the example. But of course, in practice this would not be the most desirable solution since it would reduce the reusability of the framework by limiting it to black and white images, among other limitations.

Most importantly, the expressions (Ref. 1-07) that use B, C, etc. within the payload code that is to be inserted into the framework receptacle (Ref. 1-03), will have to be redesigned when inserted into the Ref. 1-03 receptacle of the framework. For example, in the framework context, B in the executable code within the payload must be redesigned as "(*(BP Parms))". This invention defines how to integrate, synchronize and redesign elements of the framework and its payload (or payloads) such that the two different computational parts become a singular integrated code component that consistently accomplishes the requirements of both pieces of code.

The Invention

There are several major mechanisms in the invention:

Composite type constructor machinery allows the specification of functionally related types and their subtypes or simply functionally related pairs of types (but not type/subtype related), such that the type/subtype structure (or non-subtype relationship) determines the functional relationship of instances of those types and subtypes (FIGS. 1*a-c*).

A Composite type differencing mechanism automatically generates redesign transformations (Refs. 2-01 through 2-06), where the redesign transformations will recode an instance (e.g., P1, Ref. 2-11) of one of the functionally related types (e.g., Ref. 2-07) into a computationally equivalent instance (e.g., P2, Ref. 2-12) of the other functionally related type (e.g., Ref. 2-08), and additionally, will generate type inference rules that relate the differenced types.

Anaphoric Reference Protocol for Synchronizing (ARPS) will allow the establishment of domain specific (conceptual) relationships between entities in different contexts that need to be synchronized, where the relationships in one context are defined in terms of domain specific information (i.e., signposts) from the other context.

Progenitor types within one component (e.g., a framework) allow portions of type definitions to be replaced by parameters whose bindings will come from a different component (e.g., a payload) that is to be used to complete the first component (i.e., the framework). Progenitor types in combination with ARPS conceptual connections distinguish them from conventional parameterized types, which require a human programmer to provide the connection between the parameters and the arguments that are bound to those parameters.

This invention defines a functionally based type constructor mechanism (FIGS. 1*a-c*) that allows one to express composite types (e.g., Refs. 2-07 through 2-10), which are compositions of more primitive types, and to specialize operations on those composite types via operators that express composite types as functional combinations of more primitive types. The structure and properties of the resultant types constructed by these operations lend themselves to automatically inferring how to construct and add design m features that turn an instance of one composite type into an instance of another different but functionally related composite type (see the Redesign Transformations Ref. 2-01 through Ref. 2-06 in FIG. 2). More specialized instances (e.g., P4, Ref. 2-14) may be automatically generated from less specialized instances (e.g., P3, Ref. 2-13) by one or more of the descending transformations (e.g., X3, Ref. 2-03 will transform P3 into P4). Similarly, less specialized instances (e.g., F3, Ref. 2-16) may be automatically generated from more specialized instances (e.g., F4, Ref. 2-15) by the ascending transformations (e.g., X4, Ref. 2-04 will transform F4 into F3). While corresponding instances (e.g., F3 and P3) will be computationally equivalent, they may or may not have the same programmatic forms (i.e., the generated code for each may be different). The reasons for this difference will become apparent as the invention description is further developed.

A complication of these Redesign Transforms is that they are not mathematically pure functions, i.e., functions that require no information beyond their arguments. Rather the Redesign Transformations will need additional information drawn from the context where the derived instance code will reside and possibly information drawn from the context where the ancestor instance resides. The ARPS reference system (not to be confused with the ARP or Address Resolution Protocol from the network world) will be an important mechanism in deriving this information. For example, if F2 (Ref. 3-17 in FIG. 3) is an instance of a single dimensioned array of length M containing elements of type "int" (Ref. 3-07), then F1 will be an expression like "F2[IDX]", where IDX is some index variable that can only be known and derived from that context in which "F2[IDX]" will occur. The transformation X6 (Ref. 3-06), if given only "F2," can only know that the answer is of the form "F2[<the index variable being used for F2 within this context>]". ARPS expressions will be used to represent concepts like "<the index variable being used for F2 within this context>." ARPS allows determination of the concrete target program variable "IDX" to be deferred during a redesign transformation until "IDX" has become known or has been created by the generator. Thus, the ARPS expressions are domain specific expressions that when executed will search through the domain structures specific to the current state of a computational context to find the referent with the desired domain specific properties. The operation of ARPS is similar to anaphoric references in natural language. An example of anaphora in English would be "the tall boy in the blue tennis shoes." Only in a specific context can a concrete referent of "the tall boy in the blue tennis shoes" be possibly determined.

Notice the possibility that the ARPS expression may not resolve to a unique item, e.g., if there are more than one index name used with F2. It is the responsibility of the domain engineer who writes the ARPS expression to write an expression that resolves to a unique referent.

Now let us look at a more concrete, slightly more complex and more relevant example of functionally related types and Redesign Transformations for instances of those types. Let a generator design variable ?BPvalue be bound to an instance of a pointer to some abstract (i.e., but as yet undetermined)

image array name in the context of an uninstantiated program framework (i.e., one with as yet unfilled holes). (By convention in this specification, the form "?vbl" represents a generator design variable, where a generator variable is intended to be bound to pieces of code of the evolving target program or ancestor structures of those pieces of code.) The framework Ref. 1-01 is a specific example of such a framework. Further, let B be an instance of an image array name in the context of some payload code that may potentially occur within code (Ref. 1-07) used to instantiate a hole (e.g., Ref. 1-03) within the program framework. In such a case, ?BPvalue is acting a bit like a parameter to a conventional function in that it does not yet have a concrete value (i.e., a data instance) and B is acting a bit like an argument to a conventional function in the sense that it is a value (i.e., a data instance) available for use. The analogy is not perfect but is close enough to motivate an understanding of the relationships. Unlike true parameters and arguments, there is no formal connection between the plurality of instances of the parameter-like ?BPvalue in the context of a framework and the plurality of instances of the argument-like B in the context of a potential payload for that framework. More specifically, there is no explicit definition of a parameter sequence, nor a corresponding explicit invocation of that parameter sequence that connects the parameter(s) to the actual argument(s). Even if there were, B from the payload context and *BP from the framework context may (and in this example do) have some design differences even though they are "conceptually" referencing the same data. An example of a design difference might be that B is an image and ?BPvalue's data item is a structure field containing a pointer to an image (as in Ref. 1-04). Another way to say this is that the two differing entities are conceptually referencing the same data except that the details of their programming designs differ. More importantly with respect to the invention, they are differently designed but functionally related via their respective programming language types.

Let us assume for the moment, that we can define a mechanism for automatically discovering the correspondence between B and ?BPvalue, where the ARPS protocol will be used in this discovery. However, we are still faced with the problem that B and ?BPvalue's data item are not quite the same kind of programming entity and the code generated for one will be inconsistent with the code generated for the other. How can we fix that problem?

The solution is to express the types of B and ?BPvalue's data item in a type signature form comprising a composition of type building functions (i.e., the type constructor functions of FIGS. 1*a-c*). Then we will define a type differencing mechanism that infers one or more transformations that if applied to an instance of one type, will convert that instance into an instance of the other type. This will work if B and ?BPvalue's data item refer conceptually to instances of the same type of programming data (e.g., both are programming language expressions referring to a graphical image of the same type) and that they differ only by virtue of the fact that their programming language representations access the common data via slightly different computational routes or methods. This requirement manifests itself in the invention by the property that the composite type of one of the two is either a super-type or sub-type of the other or the two composite types have some other functional relationship (e.g., one refers to a specific program data item by one programmatic means within one context and the other refers to the same data item within another scope by a different programmatic means). We will define the second kind of relationship (i.e., the non-subtype/super-type functional relationship) as a functional cross connection between types defined within different scopes. In either case (i.e., super type/subtype or intertype functional relationship), they will eventually have a common ancestor or descendant type. For example, in FIG. 4*a* the BWImage type (Ref. 4*a*-16) is the common ancestor of the BWImage type from scope F (Ref. 4*a*-01*b*) and the BWImage type from scope P (Ref. 4*a*-01*a*). Additionally, for each link on the pathway between the two related types (say types of Ref. 4*a*-01*b* and Ref. 4*a*-01*a*), there exists a transformation that can generate code that will convert an instance of one type on the pathway (which is initially one of the two related types—say Ref. 4*a*-01*a*) into an instance of the next type in the pathway (i.e., Ref. 4*a*-02*a*), where the next type is one link closer to the target type (Ref. 4*a*-01*b*). In the FIG. 4*a* example, the first link would convert $C_P$, which is an instance of the type "BWImage specific to scope P", into the instance "(& $C_P$)", which is an instance of the composite type "pointer to an instance of type BWImage specific to scope P". (Note, "&" represents the C-language like operator that takes the address of its argument. Also, the solid arrows represent super type/subtype relationships and the dotted arrow represents some other functional relationship, in this example the functional relationship is "equivalent to.")

Figure 4:
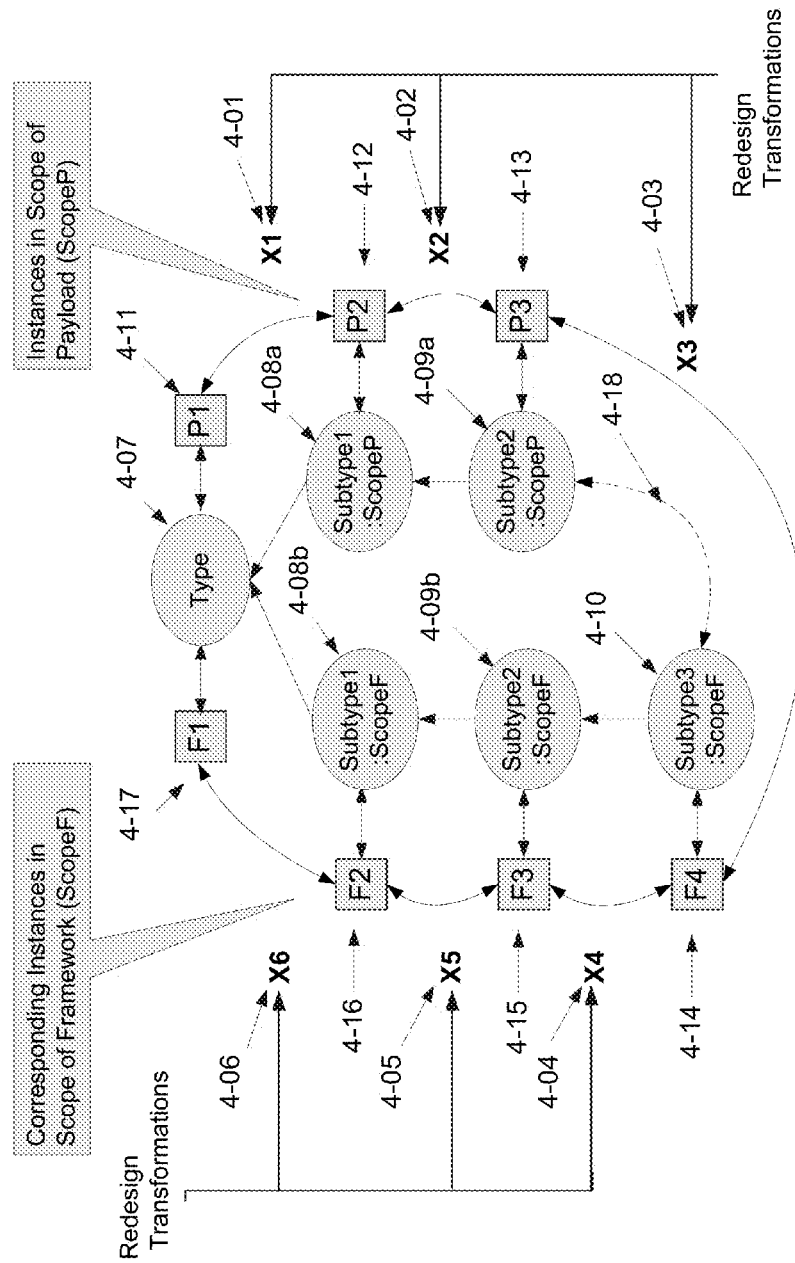

FIG. 4 illustrates the general form of the type structures that will be constructed. In general, there will be a loop of scope specific types that starts and ends at some common generic type (i.e., non-scope specific type). Within scopes, the relationships will express the type/subtype relationship among scope specific types. Between scopes, some functional type to type relationship will close the loop and cross-connect types within the different scopes. Each type to type relationship will imply how to build redesign transformations that convert an instance of one type into an instance of another type. NB: the "instances" in the context of this invention are "instances of target program code to be generated" (e.g., the "name of a variable" whose value at target program execution time will be an array of black and white image pixels). It is important for the reader to clearly distinguish "generator time" from "target program execution time," which are analogous to (but not exactly the same as) "compiler processing time" and "user program run time."

So, let us consider a simple example of two related types that differ only by the addition or subtraction of a set of simple design features.

As an example, let us define the signature of the type of B to be $$(DSDEFARRAY\ (M\ N)\ INT) \qquad [1]$$

which simply says that this is a an M by N array of INT's (i.e., C integers). Expression [1] defines the type Ref. 3*a*-08 in FIG. 3*a*. This signature notation for composite types is weakly inspired by C declarations. In C, a declaration of B of this type would be $$int\ B\ [m]\ [n]; \qquad [2]$$

which uses programming language syntactic forms to express 1) the essence of this type, 2) an instance B of the type and 3) the relationship to two other instances, m and n defined elsewhere (where m and n must be integers). By contrast to C, this invention eschews the use of any programming language syntax as a model for the type machinery of this invention (at least in the early stages of generation) because syntax is an irrelevant complexity during early generation and precludes the inherent generality that this machinery aspires to. Further, it runs counter to design principle of simplicity and generality. Syntax requires excessive complexity in the expression and interpretation of the type information. Furthermore, syntax is designed largely for human use and the machinery of this invention is designed for use by automated machinery. In that context, syntax is just a useless ornament. In this invention, the C like "type" of B in [2] above would be expressed directly by the functional type specification '(DSDefArray (M N) Int) [3a]

The dynamic (i.e., at generator run time) creation of the type of expression [3a] would be effected (in the preferred embodiment) by the Lisp code of expression [3b].

(DefDSLClass '(DSDefArray (M N) Int) nil) [3b]

Figure 6:
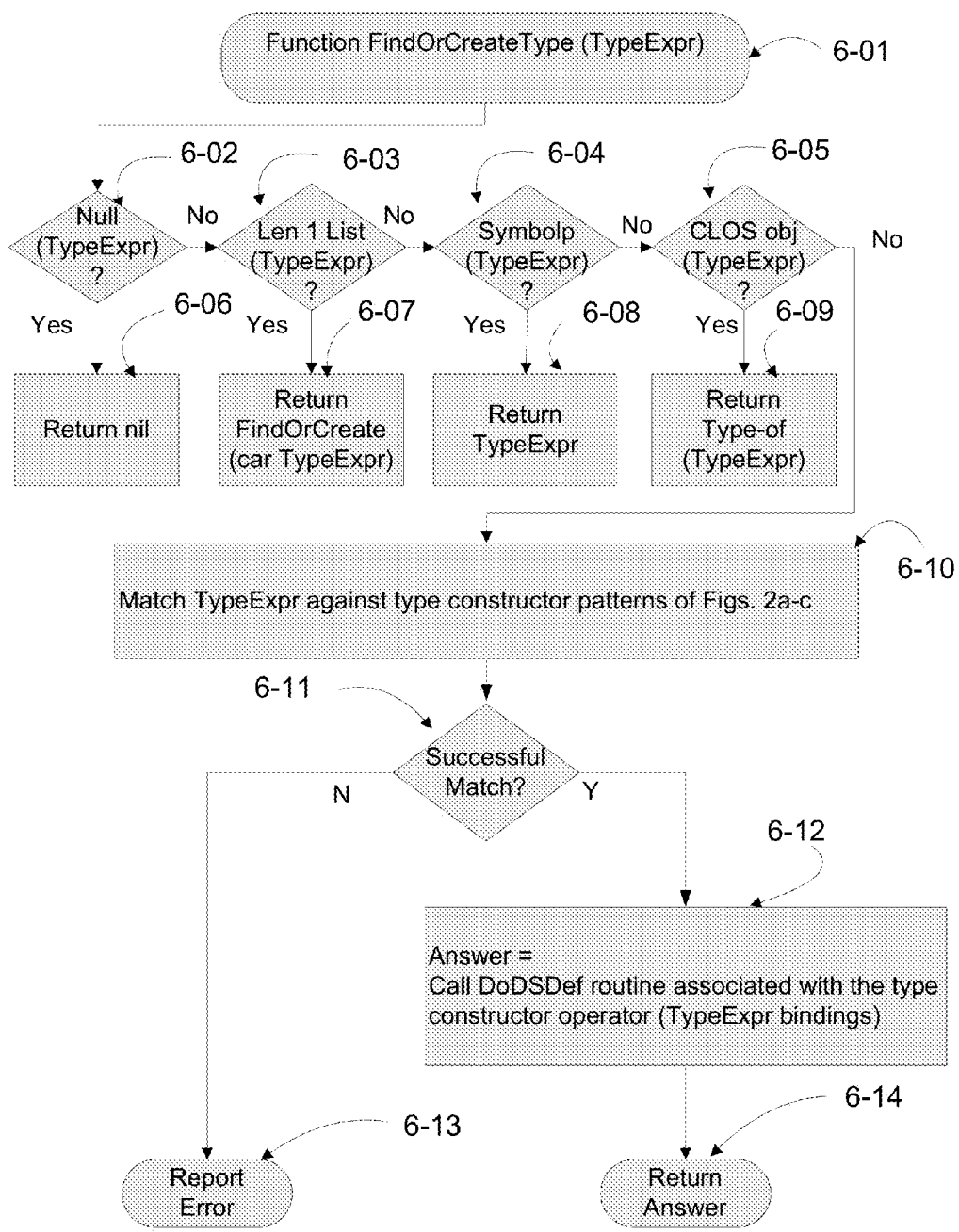
Figure 7:
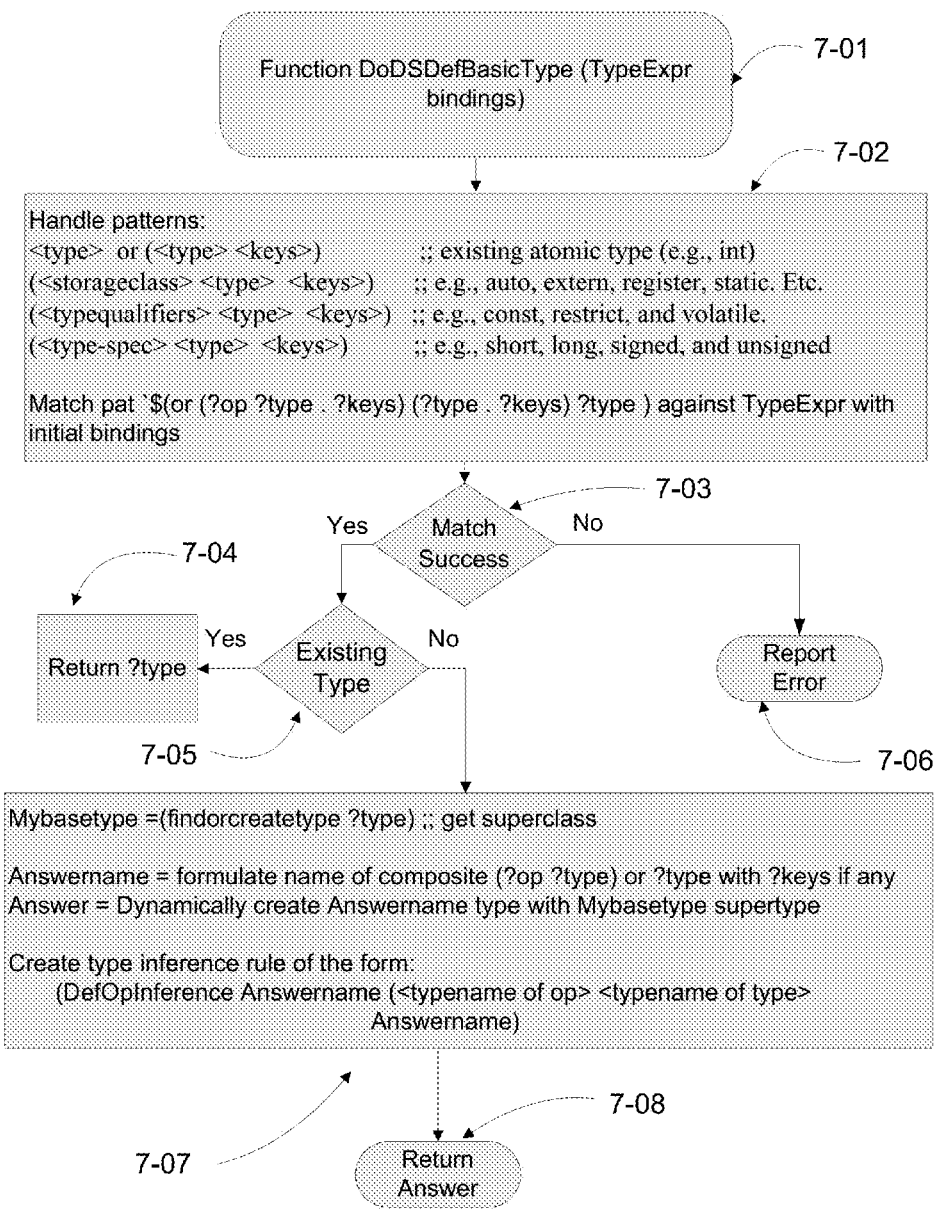
FIG. 7: DoDSDefBasicType routine to construct atomic and modified types
Figure 8:
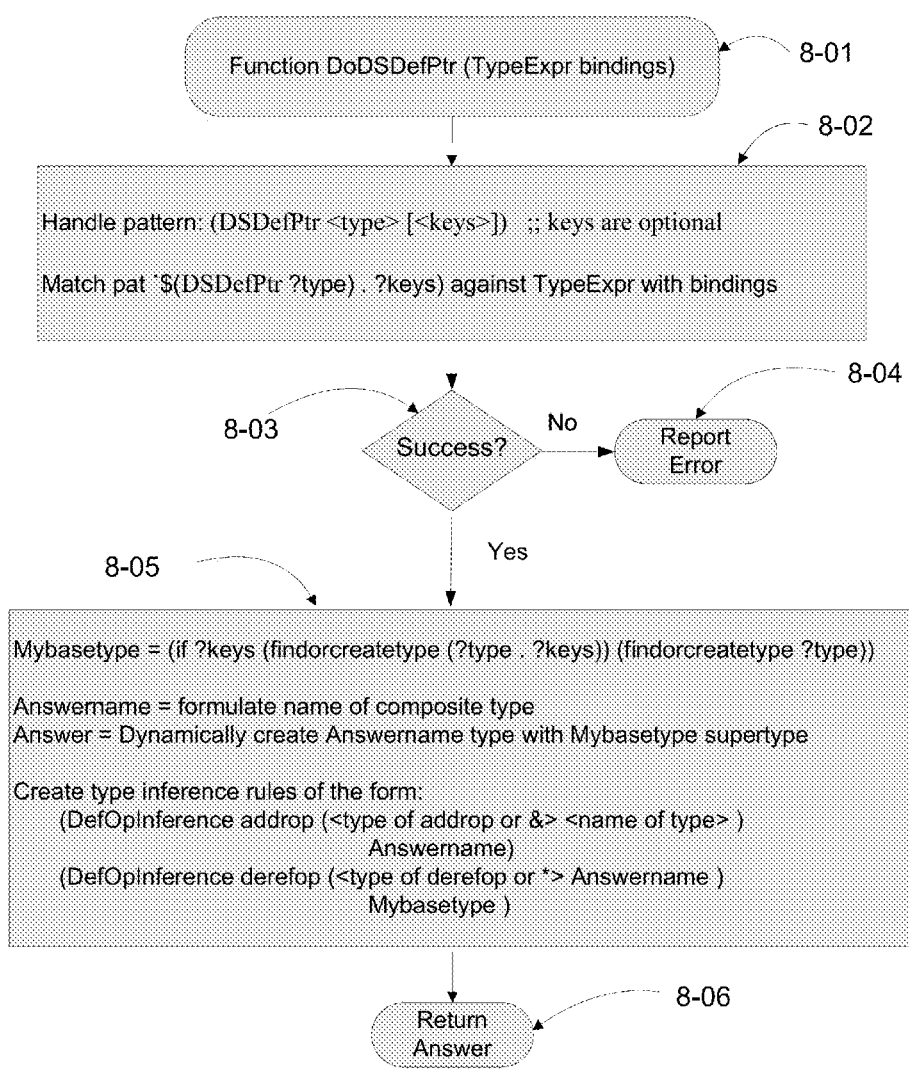
FIG. 8: DoDSDefPtr routine to construct a DSDefPtr related composite type
Figure 9:
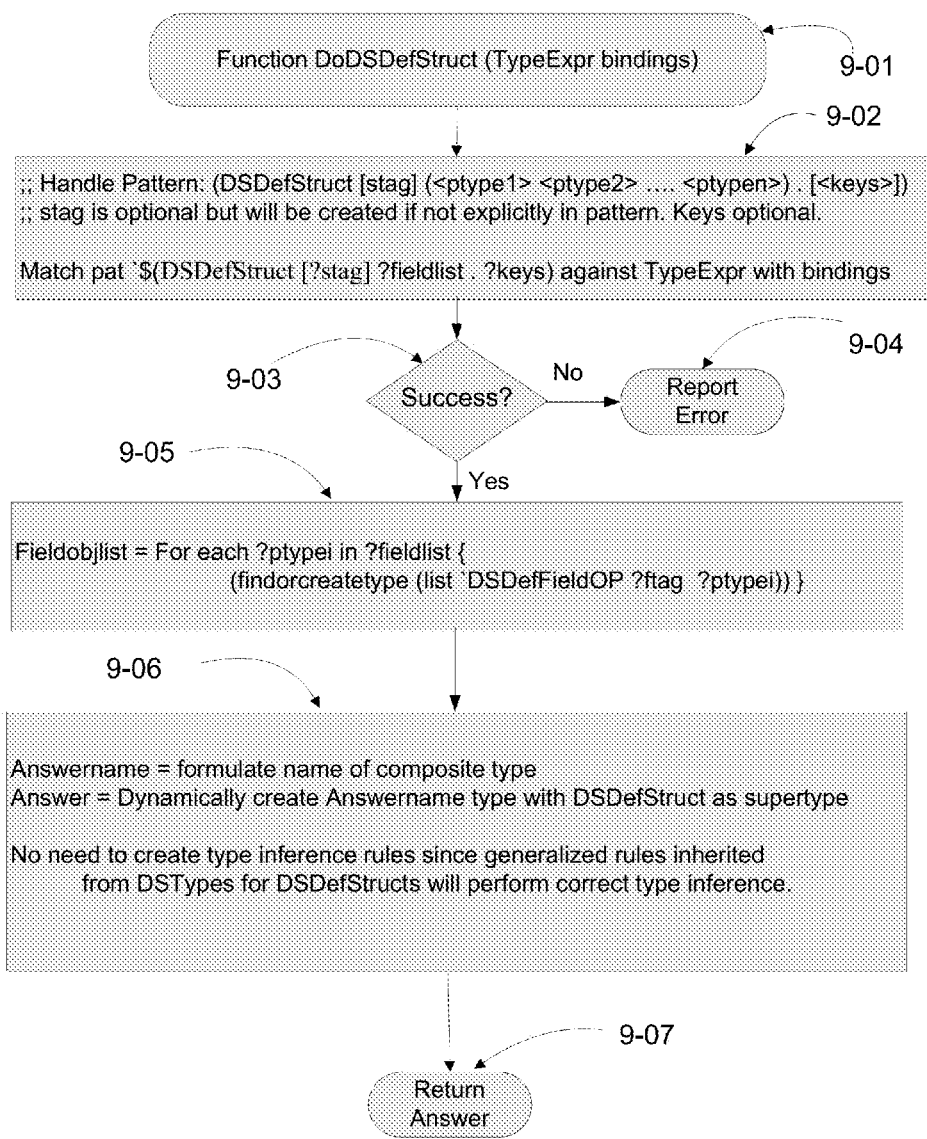
FIG. 9: DoDSDefStruct routine to construct a DSDefStruct related composite type
Figure 10:
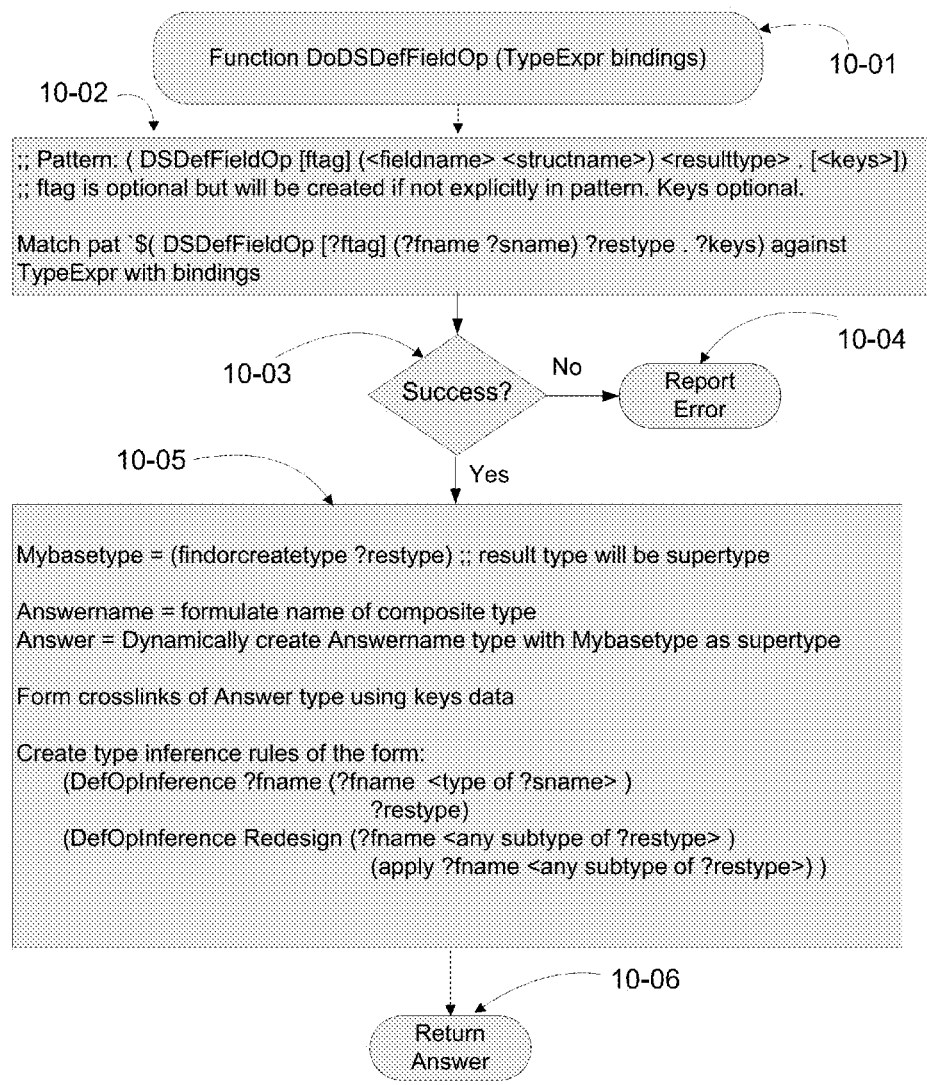
FIG. 10: DoDSDefFieldOp routine to construct a DSDefFieldOp related composite type
Figure 11A:
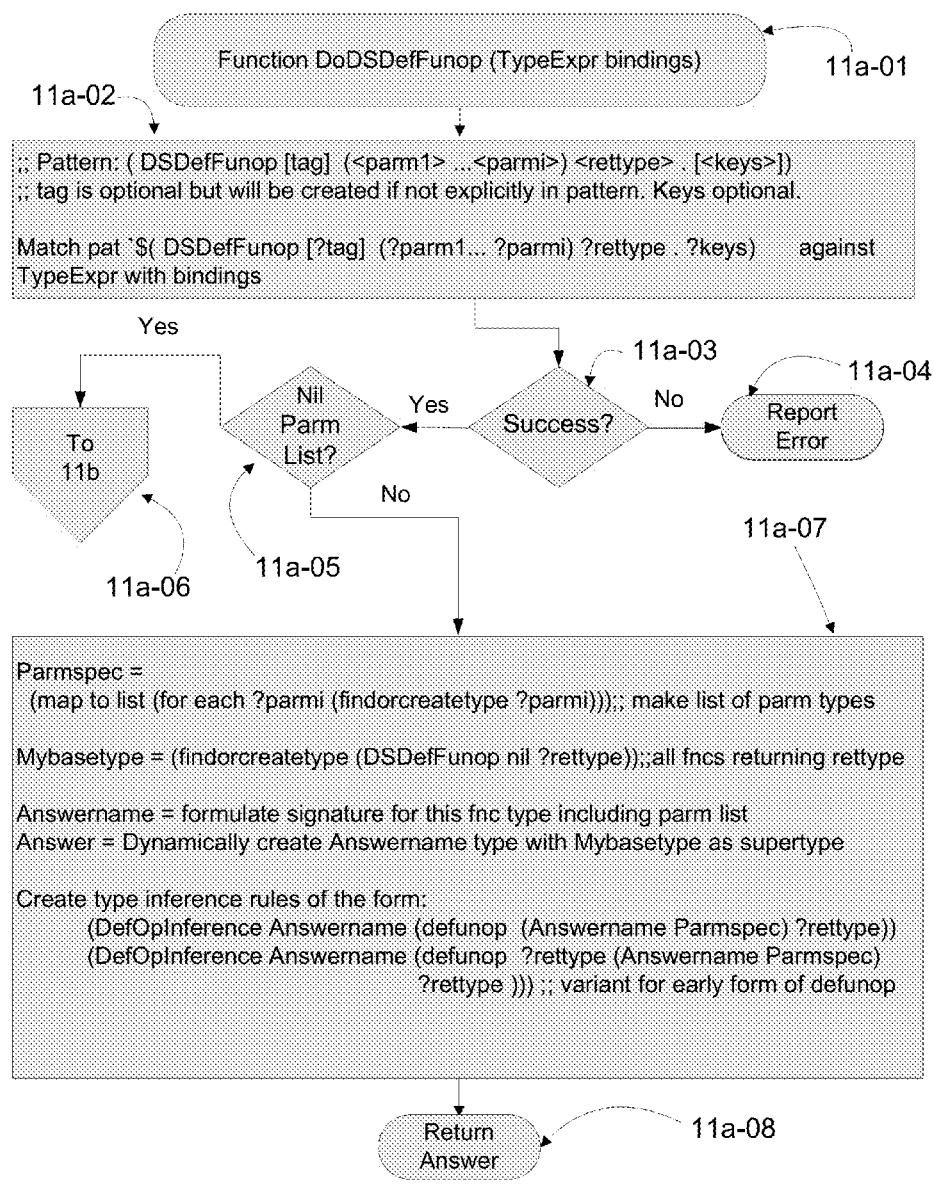
FIG. 11a-b: DoDSDefFunop routine to construct a DSDefFunop related composite type
Figure 11B:
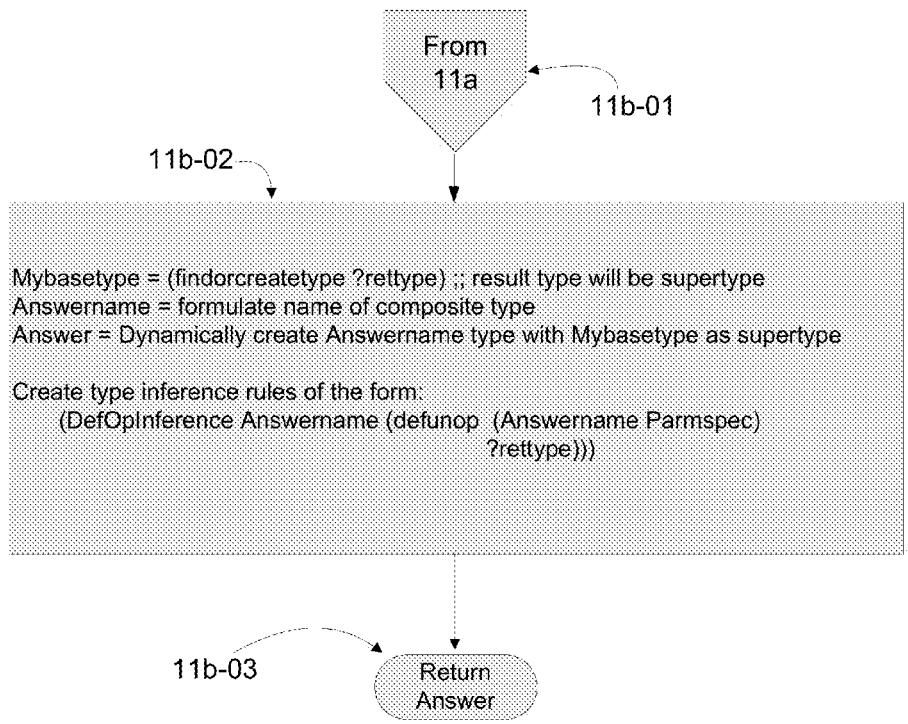
Figure 12:
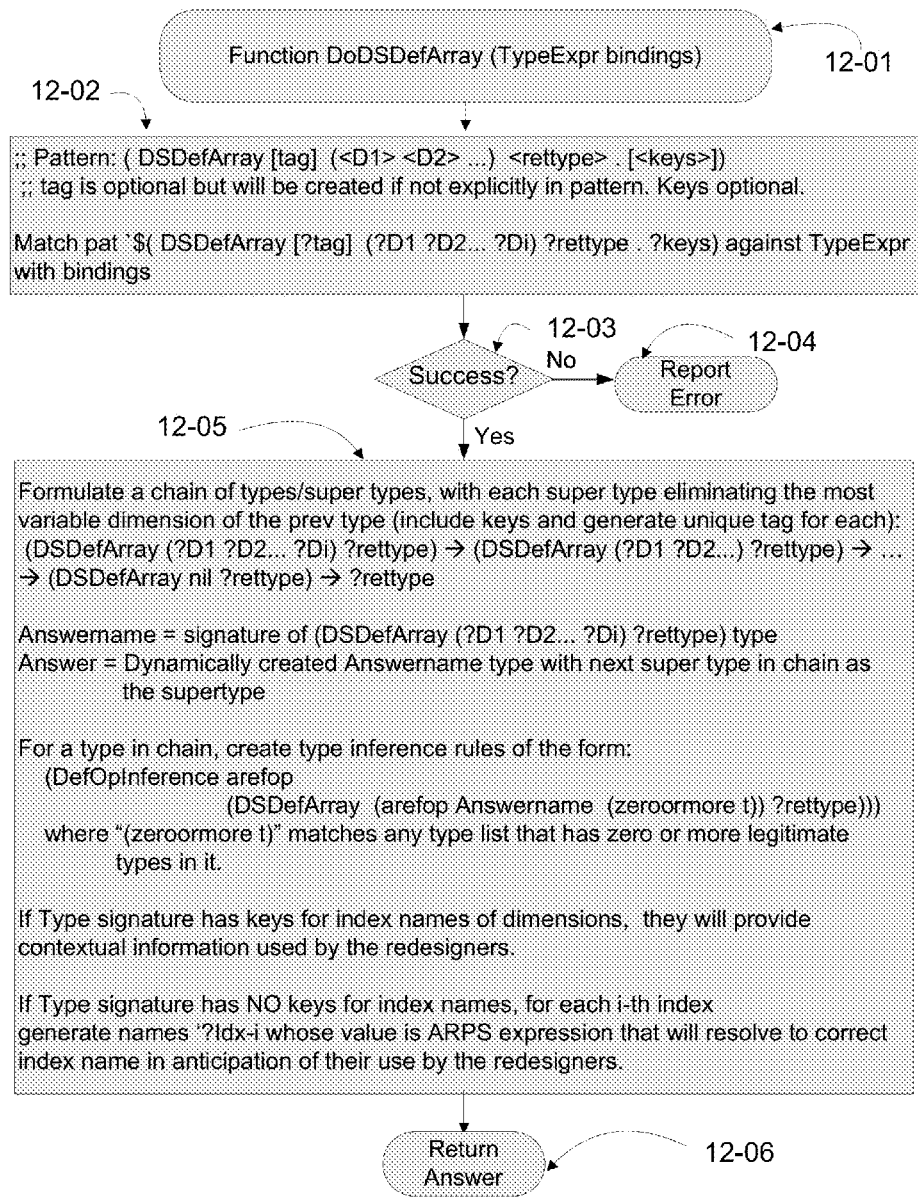
FIG. 12: DoDSDefArray routine to construct a DSDefArray related composite type
Figure 13:
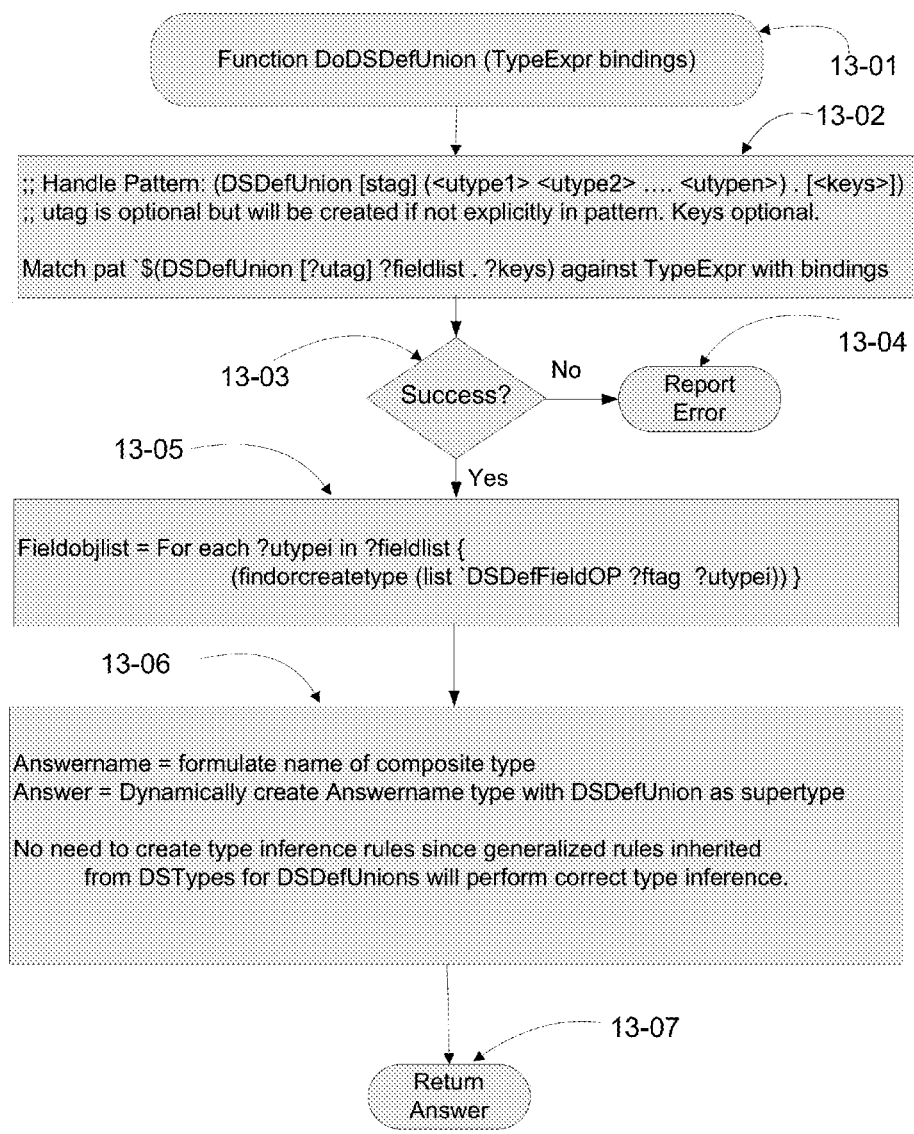
FIG. 13: DoDSDefUnion routine to construct a DSDefUnion related composite type

Execution of expression [3b] will cause the type specified in [1] to be explicitly created. Composite types may also be implicitly created (or found if they already exist) in the course of creating an instance. (See the FindOrCreateType routine of FIG. 6.) For example, the type specified by expression [3a] might be implicitly created in the course of creating a new instance of that type (say "B"). Expression [4] is an example that would trigger implicit type creation (in the preferred embodiment). From this point on in the description, concrete examples will be drawn from the preferred embodiment unless otherwise noted.

(DSRuntimeDeclare '(DSDefArray (M N) Int) 'B). [4]

That is, expression [4] says create an instance B of the type specified by expression [3a]. In the case of expression [4], this type expression would create or find an existing instance the type specified by expression [3a] and then, create an instance B of that type.

Now operationally, we want types to resolve to representational structures that can be operated upon as a singular atomic entity. Thus, in the preferred embodiment, the example type signature above (i.e., expression [3a]) will be converted into an atomic type object whose name is

|(DSDEFARRAY_(M_N)_INT)| [6]

which is a subtype of DSDefArray as well as a subtype of INT. In expression [6], the vertical bars (i.e., "|") are syntactic clues for the human reader (and the Common Lisp parsing system) that delineate the start and finish of the atomic name for this type. The underscores and the full capitalization of alphabetic characters are an accommodation to the machinery of the preferred embodiment, Common Lisp. In the preferred embodiment of this invention, |(DSDEFARRAY_(M_N)_INT)| is implemented as a Lisp symbol, where the Lisp symbol is the "atomic" entity representing the type. The value bound to that Lisp symbol is a CLOS (Common Lisp Object System) object containing the data that is used by the operational machinery of composite types. This object is defined to be the "prototype object" of the type. In the preferred embodiment, the Lisp symbol is also the value of the name slot of the CLOS class that implements the type.

Overall, we want composite types to be built up step by step via composition of type constructor functions like DSDefArray. With that goal in mind, we will define additional constructors for "pointer to", "array of", "struct of", "union of", "enum of", etc. And we will use this same strategy to incorporate modifiers of basic types into this scheme. Modifiers will be become type constructor functions that behave like DSDefArray. These will include modifiers like short, long, signed, and unsigned; type qualifiers like const, restrict, and volatile; and storage class modifiers like auto, extern, register, static and typedef. By this strategy, any programming type in a target language (e.g., C) can be constructed as a composition of constructor functions and primitive types. The constructor system is open ended so that any other programming language that introduces other composite type variants can be accommodated by obvious extensions to the constructor system. See FIGS. 1a-c for a complete list of the constructors available for the output programming language C along with a specification of the formats for those constructors.

Now, let us look at the type of ?BPvalue. Recall that ?BPvalue in the code framework (Ref. 1-01) will (eventually) be bound to the image B in the payload code. The type of ?BPvalue might be "a structure field ?BPvalue that points to an image array" but to keep the example simple and introductory for the moment, let us say the type of ?BPvalue is just a pointer to some image array. In the type notation used by this invention, the type of ?BPvalue would be expressed as '(DSDefPtr (DSDefArray (M N) Int)) [7]

which we have seen earlier and which will create (or find) the composite type

|(DSDEFPTR_(DSDEFARRAY_(M_N)_INT))| [8]

And recall that the type [8] is a subtype of the type DSDefPtr as well as the type |(DSDEFARRAY_(M_N)_INT)|. More about these other supertypes later.

The composite types of interest to this invention are those that capture the difference between types in terms of design features, where design features will correspond directly to the differential type constructor functions. Thus, the type constructor function DSDefPtr in [8] corresponds to a pointer to the array specified by the type constructor function DSDefArray in [8]. The invention defines a non-commutative differencing mechanism (shown hereafter using the operator "<<") that will manufacture code (actually, manufacture a generator transformation) that adds to or subtracts some design feature (e.g., the pointer structure implied by DSDefPtr) for an instance of the left hand operand of <<. The general form that we will use is:

{TargetType<<(StartingType, Instance)} [9a]

which represents a transformation that will convert the code Instance of type StartingType into new instance code of type TargetType. As a concrete example of the [9a] type differencing expression, consider [9b]:

{|(DSDEFPTR_(DSDEFARRAY_(M_N)_INT))|<<

(|(DSDEFARRAY_(M_N)_INT)|, B)} [9b]

Transformation X2 (Ref. 3a-02)—abstractly defined by [9b]—will be code that will take the address of the instance B (corresponding to instance P2, Ref. 3a-12). In other words, X2 would be a transformation that might be formally expressed as ?X=>(& ?X) [9c]

where the left hand side pattern is the pattern variable "?X" which will match some concrete code, "B" in this example. The right hand will be the construction "(& ?X)." Thus, the transformation expression [9c] is the purest expression of the difference between type "|(DSDEFPTR_(DSDEFARRAY_(M_N)_INT))|" and type "|(DSDEFARRAY_(M_N)_INT)|". If this difference (i.e., expression [9c]) is applied to the C language code "B" (abstractly represented by P2 or Ref. 3a-12 in FIG. 3a), the transform represented by [9c] will redesign the code "B" into the code"(& B)" (abstractly represented by P3 or Ref. 3a-13 in FIG. 3a), where "&" is the C operator that constructs a pointer to some data such as B.

On the other hand, the inverse transformation $X2^{-1}$ (inverse of the abstract transform Ref. 3a-02 in FIG. 3a) applied to a different instance "D" (abstractly represented by P3 or Ref. 3a-13 in FIG. 3a) would be defined by the difference operation

{|(DSDEFARRAY_(M_N)_INT)|<<

(|(DSDEFPTR(DSDEFARRAY_(M_N)_INT))|, D)}     [10]

The transformation implied by expression [10] applied to the code "D," an instance of type |(DSDEFPTR (DSDEFARRAY_(M_N)_INT))| will transform the C code "D" into "(*D)", where "*" is the C operator for dereferencing a pointer.

Expression [9a] is just a convenient abstraction for describing the result of a type difference operation applied to a particular code instance. If we want to describe the type differencing transformation independent of any concrete code instance, we will use an expression that is some version of [9c].

Operationally in the invention, such type differences are converted into rewrite Transformations that will rewrite an expression matched by the left side (LHS) pattern of the transformation into an expression specified by the right hand side (RHS) of the transformation. The LHS of the transformation pattern will recognize an instance of the type (i.e., an object of an Object Oriented class that implements the StartingType type) and convert that instance into an instance of the immediate supertype or immediate subtype depending on the operands of the "<<" differencing operator (if the type pair relationship is a type/subtype relationship). If the type pair relationship is a non-type/subtype relationship (i.e., a cross-link relationship), the nature of the functional relation between the type pair dictates the nature of the transformation. For example, in later examples the cross-link relationship will dictate that the starting instance will be replaced by a different instance determined by the target type. However, cross-link related types allow open ended strategies for generation of code. For example, type coercion strategies and complex data structure navigation strategies can be implemented by functionally related types whose differences can generate the needed elemental parts of such computations.

Program transformations such as those illustrated by [9b] and [10] will be applied to the target program code during the generation phase that is adapting the payload code used to instantiate a framework hole from the context of the payload to the context of the framework. In other words, these transformations that are manufactured by the type differencing operation are redesigning from one context (i.e., payload) to another context (i.e., framework) whatever target code (e.g., an image reference like B) they are applied to. FIG. 4 illustrates in general terms the relationships among the types of some payload context (ScopeP) and the related types of some Framework context (ScopeF).

In the preferred embodiment, the actual implementation of these rewrite transformations uses CLOS methods rather than true transformations simply because that implementation scheme can exploit the method inheritance machinery to reduce the amount of implementation code that has to be written and can do so without loss of generality. Nevertheless, the "transformation" abstraction is a convenient conceptual metaphor for documentation.

To specify a differencing operation and identify the code to which it applies, the invention will invoke a CLOS method named "redesigner" to trigger a series of transformations on an instance (e.g., a BWImage "D"). The redesigner methods are the implementation forms of the transformations generated by type differencing. They are multi-methods. That is, in the preferred embodiment, redesigner is a generic method where the specific method definition invoked in a particular case depends on the types of the redesigner's arguments for that case. The form of the redesigner generic function is (redesign fromtype totype instance)     [11a]

The specific redesign method invoked will depend upon:
1) the type of the instance code (which will be the fromtype argument),
2) the totype (e.g., "|(DSDEFPTR_(DSDEFARRAY_(M_N)_INT))|") that should be the type of the redesigned code (i.e., the totype argument) and
3) the specific instance code (e.g., B in the payload) that should be redesigned to the target type.

For example, (redesign|(DSDEFARRAY_(M_N)_INT))|

|(DSDEFPTR_(DSDEFARRAY_(M_N)_INT))|B)     [11b]

will convert "B" of type |(DSDEFARRAY_(M_N)_INT)| into "(& B)" in the payload code that is to be used to instantiate some target framework.

The example shown is intentionally simple and introductory. It uses the DSDefPtr constructor function because the C code implied by this constructor depends only on the DSDefPtr constructor function itself and the type to which it will be applied, i.e., |(DSDEFARRAY_(M_N)_INT)|. While this is a (mathematically) "pure function" (i.e., depends only on its arguments), all constructors are not pure functions and not so simple. The general solution will require more complex machinery. For example, DSDefStruct types are constructions of types and instances specific to a target program currently being generated. The C code implied by the argument types depends upon the types, the instances and possibly even the specifics of the contextual C code in which the result will reside. That is, many if not most redesign transformations will not be pure functions. Non-pure functions use global context ("global variables" in logic terminology) in addition to their arguments. In this invention, that global context will be embedded in the types themselves thereby allowing the redesigners to mimic pure functions.

Note of clarification: the word "context" has two slightly different meanings within this document: 1) a scope more or less in the programming language sense, and 2) the somewhat more amorphous sense of an information arena that is global to (i.e., non-local to) a mathematical function.

The first meaning of "context" comports pretty well with the notion of a scope within a "computer program." The "scopes" within this invention are objects (in the object oriented sense) that eventually will map into a true programming language scopes within the target program produced by the invention's assumed program generation system that hosts the machinery of the invention (e.g., the preferred embodiment). When this document uses context in the first sense, it will usually be clear from sentence context (e.g., it may be used with "payload" "framework" or "program scope").

The second meaning of "context" is closer to the dictionary meaning of the word with a bit of a formal bent because this use of "context" is often used to describe mathematical like functions that are "writing code" or "redesigning code" and the "context" (i.e., the context data) is embedded within the type objects that are used by this invention.

Generating Type Inference Rules as a Service

Since new types are being dynamically constructed, the generator will also manufacture type inference rules specialized to these new types because all type inference is accomplished by such rules in the preferred embodiment. Examples of these type inference rules will be given in the detailed description of the invention. This is a service to the generator (i.e., the preferred embodiment) and not central to the core objective of the invention. But a valuable service nevertheless.

Using Types to Capture and Manipulate Incremental Design Features

Figure 3:
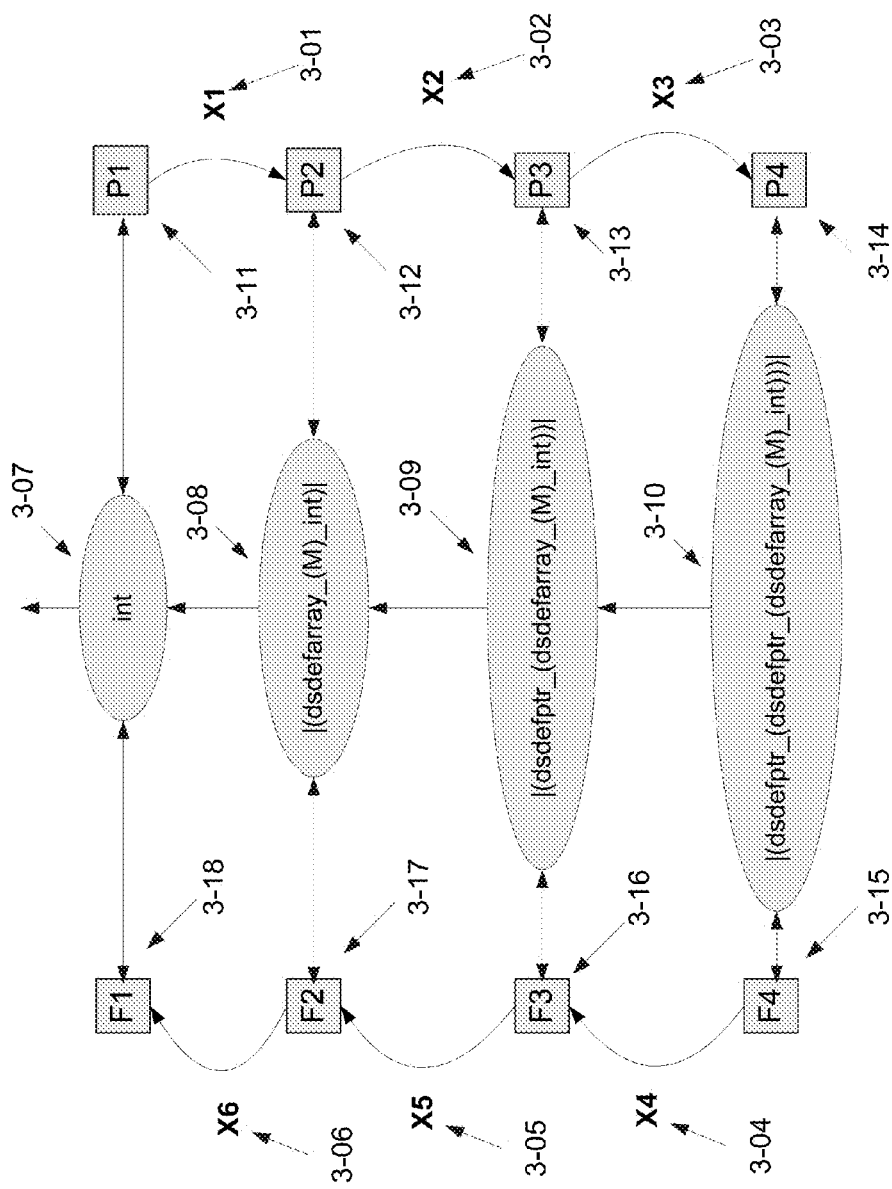

To solve the problem described above, this invention creates a system of types and subtypes (e.g., Refs. 3-07 through 3-10) that are functionally related as illustrated in FIG. 3. Each subtype is defined by a constructor function on its supertype (and optionally, includes contextual information on instances of that supertype along with other types or instances). A constructor function introduces a design feature specific to that subtype/supertype relationship. Furthermore, associated with each related supertype/subtype pair are two (and sometimes more based on the semantics of the type constructor functions) Redesign transformations (e.g., X1 and X6, Refs. 3-01 and 3-06) that can automatically convert an instance of one of the types into an instance of the other type by adding or removing the design features determined by the differences between the types and supertypes. For example, in FIG. 3, the transformation X6 (Ref. 3-06) will convert instance F2 (Ref. 3-17) into F1 (Ref. 3-18). Conversely, in FIG. 3, X1 (Ref. 3-01) will convert P1 (Ref. 3-11), an instance of type int, into P2 (3-12), an instance that is an array of length M containing int types. In this case, X1 is a "generative" operation in the "program generation" sense. That is, X1 will generate new data and code objects for some target program being generated or it will redesign existing data or code objects. In other words, X1 "writes code."

These Redesign transformations often will need to incorporate information from the context in which instances of the types occur. For example, when redesigning a simple 2d (i.e., two dimensional) matrix (e.g., a Black and White Image of domain type BWImage) defined in a computational specification (which is intended to be the payload of a framework) to a field value within a C struct that is defined in the intended framework, the redesign transformation may use Domain Knowledge (DM) to acquire the additional context needed to complete the redesign. More concretely, for example, the redesign transformation may use the correspondence of core domain types (i.e., the BWImage core type but excluding any keyword modifiers of that type) between the payload data item and the framework's field data item. Additional domain knowledge from keyword modifiers of that type (e.g., the role of the data item, which might be "input" or "output") may be required to narrow the selection among several candidates for the correspondence when there are multiple candidates that meet the core domain type correspondence requirement. In general, the methods associated with the framework will use the domain knowledge to establish the correspondence between instances in the two code components (i.e., the framework and its payload). By this mechanism, the results of the domain knowledge based correspondence will be incorporated into the derived subtypes (e.g., Ref. 3-08 through 3-10) and the Redesign transformations (Ref. 3-01 through 3-06). These topics will be discussed in detail later in the course of following through an extended example. The generated transformations are represented by X1, X2, etc. (i.e., Ref. 3-01 through 3-06) in FIG. 3.

In order to get an intuitive understanding of the transformations X1, X2, etc., let us examine concrete examples of these transformations. Suppose that a data item P1, (Ref. 3-11, in FIG. 3) is an instance of the type int. It would be defined and dynamically created in the preferred embodiment by executing expression [11]:

(DSRuntimeDeclare 'int 'P1). [11]

Applying transformation X1 (3-01) to P1 would redesign P1 to be some instance (e.g., with a generated name like "SourceOfP1", corresponding to P2, Ref. 3-12, in FIG. 3) of a singly dimensioned array of the type of P1, i.e., of the type int. The expression [12] could be used (in the preferred embodiment) to create the functional subtype of 'INT—e.g., |(DSDefArray_(M)_INT)| (shown as Ref. 3-08 in FIG. 3)—that is the source the value of P1.

(DSRuntimeDeclare '(DSDefArray '(,M),(type-of P1)) 'SourceOfP1) [12]

It is somewhat unconventional and perhaps controversial to define |(DSDefArray_(M)_INT)| as a subtype of INT because the conventional notion is that a subtype is an equivalent but some narrowly defined specialization of the type. Often, a instance of a subtype can be substituted directly in a programming expression for a instance of its supertype without destroying type correctness of the expression. But an array type cannot be substituted for an INT type without fundamentally changing the meaning of the programming expression. But in this invention's view of the world, a "function" (loosely defined) applied to the array type (e.g., D[i], where D is the array and the subscripting reference "[i]" produces an INT) can be substituted for an INT. That is to say, the function applied to an instance of one of the types that makes that instance substitutable for an instance of the second type (and thereby preserves type correctness of some programming expression) is the function that relates the two types (e.g., represented in FIG. 3 as X6 or Ref. 3-06). Hence, in the system of this invention, type correctness is preserved by the functions that relates types and subtypes. In this invention, specialization and its inverse, generalization, are thought of as generator operations for adding or removing individual design features from data items. The type differences are the specification of these generator operations.

In contrast, a subtype is conventionally a behavioral or structural reduction of the generality of it supertype. Hence, the use of the descriptive word "specialization" for such a reduction. In the object oriented world, such a specialization would likely differ from its super class by adding, removing or specializing the data slots that are central to the more specialized behavior, and additionally, by adding, altering or removing one or more of the methods that operate on that data. Thus, by this conventional viewpoint, the machinery of specialization is narrowly and rigidly defined.

Further criticism of this choice might by based on the fact that much of the required context is unaccounted for in redesigning an instance of type INT into an instance of |(DSDefArray_(M)_INT)|. That is, a Redesigning transform has no obvious way of acquiring the knowledge of the dimensional information of the target redesigned type. However, in the context of program generation, that knowledge is available from the domain knowledge and relationships surrounding the context of some instance P1 of type 'INT. And this invention will take advantage of that domain knowledge to fulfill the knowledge required by Redesigning transformations. While more limited than human programming in this respect, this automated use of domain knowledge in the surrounding context is analogous to the way the human programmer fulfills the knowledge requirements during program construction.

Moreover, viewing these types and subtypes as functionally related (i.e., there are functions—actually method based transformations in the preferred embodiment—that construct an instance of a supertype or subtype from its related type) allows consistent supertype/subtype treatment by the Redesign transformations. That is, the X6 redesign transform (Ref.

3-06) will translate some instance of the type |(DSDefArray_(M)_INT)| (say A) into an array access expression such as (arefop A ?I) [13]

where arefop is the array access operator for the internal form of a programming language operation. When the internal form [13] is finally generated as proper C programming language code, expression [13] would be expressed as the text string A[I] [13a]

if the generator variable "?I" is bound to a target program variable "I." Notice in expression [13] that the transformation created a variable (i.e., "?I") and in [13a] we see that the variable is bound to a target program index name "I". It is not clear where these came from and how ?I gets bound to a piece of the target program. For the moment, we will defer discussion of what "?I" is, how it is produced, and where it comes from. The forthcoming sub-section titled "Progenitor and Parameterized Types" will describe this process in more detail.

Redesign transformations among the remaining types in FIG. 3 (i.e., dsdefptr compositions, Refs. 3-09 and 3-10) are among the simplest redesign transformations because they depend on no outside contextual information (i.e., they are mathematically "pure functions"). Since transformation X2 (Ref. 3-02) and X3 (Ref. 3-03) are respectively equivalent transforms and X4 (Ref. 3-04) and X5 (Ref. 3-05) are also equivalent transforms, it will suffice to describe X2 and X5.

We start by defining an instance (say C) of the type |(DSDefArray_(M)_INT)| with the following expression:

(DSRuntimeDeclare '(DSDefArray (M) INT) 'C) [14]

The Redesigner implemented by the transformation X2 will convert "C" into the code form "(& C)", which is of type |(DSDefPtr_(DSDefArray_(M)_INT))|. (Notice that this reiterates the example of [9b] from the discussion of type differencing.)

Similarly, if D is an instance of type |(DSDefPtr_(DSDefArray_(M)_INT))|, a Redesigner transformation X5 that converts D into an instance of |(DSDefArray_(M)_INT)| will produce the code form "(* D)" as its result. (Notice that this reiterates the example of [10] from the discussion of type differencing.)

The primitive function DSRuntimeDeclare (in the preferred embodiment) is mainly designed to declare instances of types but in the course of doing that, it will also dynamically create composite types if needed. To do so, it calls a deeper primitive routine FindOrCreateType (FIG. 6), whose job is to create composite types if they do not yet exist or find them if they do. In the course of creating a composite type, FindOrCreateType also will create related composite types that are implied by the type it is creating. For example, creating a type |(DSDefArray_(M N)_INT)| will also create its implied supertype |(DSDefArray_(M)_INT)|, which will recursively create its supertype |(DSDefArray_nil_INT)|. (Note: in the name of simplicity, FIG. 3 ignored the array type with nil dimensions.) FindOrCreateType uses support routines (FIGS. 7 through 13) to perform the actual work of type creation. In the course of that, these support routines also create the Redesign transformations (CLOS method definitions in the preferred embodiment) as well as custom type inference rules that will infer the type of any expression that is of the type being created by FindOrCreateType. (See the section titled "Generating Type Inference Rules" for details of type inference rules and their generation.)

The type specifications given to FindOrCreateType are functional expressions of symbolic constructors built by composing the primitive specification forms defined in FIGS. 1a-c. The notation "<entity>" represents abstract descriptions of the legal symbols that may be used in the designated position. The concrete name "Entity" within this notation is some semantically evocative term designating the kind of entity expected (e.g., ptypei might be used to stand for a "the $i^{th}$ parameter type".)

Most of these specifications provide a method for giving a shorthand name to the type for use elsewhere in other type specifications. The name entity is designated by some variation of "tag". A <tag> allows the user to provide a name for the construction that can be used to represent the expression within other specifications without having to repeat the expression in its entirety. The terminology (i.e., "tag") is motivated by C programming language terminology for the name of the entity being defined. <tag> fields are optional and if not explicitly given, FindOrCreateType or one of its support routines (in the preferred embodiment) will generate a unique tag name for the item.

Progenitor and Parameterized Types

A program framework (also sometimes referred to as a "design pattern framework" depending on what is being emphasized) is a partially specified design pattern in which some parts are concrete programming language structures and some are "holes" with a few, limited constraints on what programming language structures can be legally substituted for those holes. A problem arises with how to specify elements of that framework that are not yet determined or only partially known. Some of the knowledge needed to fulfill such partial specifications will come from the specification of the payload that will be used to instantiate that framework. For example, when writing a thread routine to perform an execution of some part a user's computation (i.e., the payload), the thread machinery for starting a user written thread routine restricts the user's thread routine to a single user parameter. This restriction is easily handled by a human programmer using various strategies, such as, the user packaging up into a single structure (e.g., a C struct) all of the data items the user's computation will need (e.g., pointer to input matrix, pointer to output matrix, starting and ending index values, etc.) and then using a pointer to that struct as the value of that single parameter of the user's thread routine. The problem is that most of these data items are specified in the computational specification of the payload, which does not reflect the framework's design feature of packaging them in a structure in the context of the framework. Furthermore, the conceptually corresponding data items in the payload code are likely to be straightforward types such as simple matrices for the input and output data items whereas the conceptually corresponding data items within the framework are based on a custom structure with pointers to the input and output data items from custom specified fields within that structure. The framework does not know the name or type of the input and output data items in the payload and the payload does not know about the design variations of the custom structure with custom fields in the framework. So, how can one establish correspondence between elements of the framework and elements of the payload? Furthermore, when the framework is defined, how can one specify incomplete, non-concrete types (e.g., a composite type that is a pointer to an as yet unspecified input item type, such as an input matrix) and then evolve those specifications into concrete types (e.g., a composite type such as "(DSDefPtr BWImage)") when full information becomes known? Once these questions are answered, how do we use the solutions to redesign the payload to be consistent with the design features of the framework? These are all closely related questions.

The short answer to the first question is that correspondence may be established in a plurality of ways. The simplest (but highly restrictive) way is that semantically appropriate, shared global meta-names can be established that the Redesigners can exploit (e.g., "?in" or "?out"). But this approach means that all possible frameworks and all possible payloads must share a common global notation and each element of that global notation must provide a unique name for a large variety of modifications of meaning (e.g., each variant of every possible kind and interrelation of data structure) and of contexts with high degrees of variation. This is not really a feasible approach for any significantly complex programming task. A more general and utilitarian system would be one that, like natural language, allowed specificity to be created by composing atomic units of meaning. It could specify that the entity referred to is an "input" and then modify that with the further specification that it is an "image array." The ARPS synchronization protocol based on a meta-language or intermediate language (IL) is the mechanism of this invention that accomplishes this kind of referencing. ARPS has been developed to refer to unknown entities in terms of domain knowledge of the solution structure (e.g., referencing the "input image from the payload") rather than in terms of programming language structures or abstraction (e.g., referencing the "array of type Image that appears on the left hand side of an assignment operator in the payload specification"). The role of this IL is analogous to the role of anaphoric references in natural language (e.g., pronouns like "her" or indefinite references like "that tree" or "the man in the blue shirt"). It allows a reference to an object that was not known or did not exist at the time the IL was specified. One can think of the ARPS synchronization protocol IL as little search expressions that will find specific data items in a yet to be identified code component (e.g., the framework or the payload) based on their domain characteristics, properties, relationships with other data items or contents. Additionally, the ARPS IL is used to create data items for use in the generated code (e.g., new variable names that will be unique to the composition of a framework and a payload). For example, the protocol will allow expressions that capture the domain notion of "an input or read-only matrix to the computation." In the fullness of time, that expression might resolve to the concrete data item "B" from the payload. A further example of IL might be an expression that captures the domain notion of "the index names of the matrix loops for B". In both cases, the IL allows the generator to navigate within a payload to identify concrete items (e.g., to navigate to the target program data item "B" from the payload in the first case and perhaps to the target program index data items "I" and "J" in the second case). In short, the IL allows the specification of data types and items from within the framework that are as yet undefined and defer the refinement of those data types and items until their concrete referents are determined and available (i.e., when a candidate payload is available for instantiating the framework).

The ARPS synchronization protocol is an open ended language that may be extended and evolved as the technology and applications evolve. New domains (e.g., the data structures domain) may be introduced. New machine architectures may arise that extended or redefine the machine architecture domain. New implementation patterns may arise to handle these new computational domains and new machine architectures. In these and other such cases, the synchronization protocol will grow and evolve to address such evolution. Since the ARPS protocol is open ended, any domain engineer who needs to add or extend domains may extend the protocol to the needs of those additions or extensions.

We will consider the details of the ARPS synchronization protocol IL and its functioning via an extended example which will let us illustrate a few important issues in adapting payloads to frameworks and describe the role of the ARPS synchronization protocol IL informally. For describing how partially specified types can be dealt with within a framework, we can use the notion of global meta-names (e.g., the generator design variable ?AnInputImage) as place holders in some yet to be completed solution. Eventually (i.e., when a payload is used to instantiate a framework), the system will use ARPS to find the values that will be bound to the ?vbl variables and thereby convert the partially specified type into a completely specified type. Simply put, we are going to define a Progenitor Type as a partial type that has embedded parameters. In this invention, the parameters will comprise generator design variables (i.e., generator variables are used in pattern matching to hold pieces of the evolving program, where these generator variables have the form "?name"). So, using this design, the domain engineer who creates the framework might specify a structure type of the form shown in expression [15]. In a fully general solution, the design engineer could invoke a tool that would analyze a payload at generation time to generate [15] for runtime insertion into the framework thereby allowing the framework to be far more general in the sense that it could handle many different and more widely varying payloads. However, in either case the resulting structure within the framework will be a structure like [15]. The phrases following the double semi-colons are CommonLisp comments and are included to aid the reader of this document in understanding the intent of the structure and the fields of [15].

```
'(DSDefStruct ?RSParms;; Input data to thread rou-
    tine (((DSDefPtr ?AnInputImage) (& ?In));; Pointer to
    input matrix to routine ((DSDefPtr ?AnOutputImage) (& ?Out));; Pointer to
    output matrix to routine ((DSDefList ?DimOfIn));; Variable bound to list of
    In's dimensions ((DSDefList ?DimOfOut))))));; Variable bound to list
    of Out's dimensions                              [15]
```

Expression [15] partially specifies a data item from the payload that will be bound to the parameter "?In" once the payload is identified. Notice that the type of "?In" is partially concrete (i.e., we know that it will be a pointer to a type) and partially unspecified (i.e., the type pointed to will be bound to the variable "?AnInputImage"). So, how does this invention process expression [15]?

If FindOrCreateType is applied to expression [15] as is, it would produce a legitimate but incomplete type specification. Parts of the specification are parameters and would have to be further processed at a later time. However, once the payload has been determined, a complete (and concrete) type can be generated. What is more at that time, the initial values (i.e., ?In and ?Out) can also be determined from the payload and thereby complete the specification of the ?RSParms type. Specifically, the bindings for all of the ?vbls variables (i.e., ?AnInputImage, ?In, ?Out, ?DimOfIn, etc.) can be determined and a set of concrete types and instances can be generated for use in the framework that is to be instantiated with the payload. This instantiation and type generation process will produce the kinds of type structures shown earlier. (See FIGS. 2 through 5.)

The remainder of this section will follow this example through the process. Since the detailed structure of the framework that contains expression [15] is not relevant to this invention, we will ignore it. (A more detailed example of such a framework but excluding the machinery of this invention is contained in U.S. Pat. No. 8,327,321, Titled "Synthetic Partitioning for Imposing Implementation Design Patterns onto Logical Architectures of Computations," Ted J. Biggerstaff, Dec. 4, 2012.)

The ARPS framework synchronization protocol requires that each framework (i.e., an abstract design pattern) supply a context. A context is a binding list consisting of pairs comprising a design variable and the ARPS expression that indirectly specifies the concrete data item in the payload (e.g., the image "C") that should replace the design variable in the payload's specification (e.g., the image "?In"). The context is a kind of parameter list for the whole framework and like a parameter list, it will assist in associating elements of the payload with variables of the framework. For example, an example of a context binding list is given by the expression:

(((?RSParms (CreateUniqueVbl RSPARMS));; unique
  name for each instance (?In (Input 'payload 'matrix 'image));; find some
  image matrix used as input (?Out (Output 'payload 'matrix 'image));; find some
  image matrix used as output (?AnInputImage (type-of ?In))

(?AnOutputImage (type-of ?Out))

(?DimOfIn (CreateVblWithVal 'Dim (DimenOf ?In)))

(?DimOfOut (CreateVblWithVal 'Dim (DimenOf
  ?Out))) ... <etc>... )                                    [16]

where the ARPS IL is shown in italic font. Once the IL is processed, [16] becomes:

((?RSParms RSParms9))

(?In C)

(?Out D)

(?AnInputImage BWImage)

(?AnOutputImage BWImage)

(?DimOfIn (Dim10:dsvalue (M N)))

(?DimOfOut (Dim11:dsvalue (M N))) ... <other
  bindings>... )                                            [17]

where the dynamically created field name objects Dim10 and Dim11 both have the initial value of the list "(M N)" and thus represent a description of a matrix of dimensions (M by N), where M and N are target program variables defined within the payload.

So, how are these bindings in [17] determined? When the ARPS IL is executed, what is it doing? The short answer is that it is 1) creating new, unique variable names where needed (e.g., RSParms9, Dim10 and Dim11), and/or 2) analyzing the payload specification, which will be bound to the globally shared design variable ?INS (i.e., the Implementation Neutral Specification), to find domain specific information such as the name of the image matrix that is acting as input to the computation and the name of the matrix that is output to the computation. Consider, the IL expressions (Input 'payload 'matrix 'image) and (Output 'payload 'matrix 'image). These will resolve respectively to "C" and "D," which are both of type BWImage, a subtype of Image. What domain knowledge does the generator use to make this resolution? There are multiple ways to do this. We will mention two, one that is partially manual/partially automated and one that is fully automated. In the partially manual approach, we will allow the application programmer to add domain information describing to the generator the "role" of the images at the time the images are defined. For example, in the preferred embodiment, an instance of a BWImage would be declared as in [18].

(dsdeclare BWimage C :form (DSDefArray (M N)
  BWPixel))                                                  [18]

The ":form" keyword pair is optional but when provided by the user, C will be a subtype of both the domain specific type BWImage and also of the programming language oriented type |(DSDefArray_(M_N)_BWPixel)|. The user is free to add an arbitrary property list to C via the ":tags" keyword. (Note, "tags" is an overloaded term. In this context, it serves to indicate a property list whereas in the context of the type constructors of FIGS. 1a-c, it indicates a C programming language like tag name for an extended specification.) A tags property list may be useful to define a domain specific role for the BWImage C such as its role as "Input" data. Such property lists are shown in [19a-b].

(dsdeclare BWimage C :form (DSDefArray (M N)
  BWPixel)

:tags ((Role Input))                                         [19a]

Similarly, the BWImage that is serving as the output data item would be defined in [19b].

(dsdeclare BWimage D :form (DSDefArray (M N)
  BWPixel)

:tags ((Role Output))                                        [19b]

Given the tags information from the user, it is obvious how the IL expressions (Input 'payload 'matrix) and (Output 'payload 'matrix) operate. They search for instances of matrices in the payload and anything that is a subtype of the domain specific type Image or a subtype of Matrix and an instance of |(DSDefArray_(M_N)_BWPixel)| (i.e., C or D) would qualify. They then examine the tags of those items for properties of Input and Output, respectively, and thereby determine the values C and D. These are added to the binding list [17] as the values of ?In and ?Out, respectively.

In the fully automatic mode, the preferred embodiment of the generation system will add the Role tags to C and D by identifying their usage context. If D occurs on the left hand side of an assignment operator, it would get tagged with the (Role Output) property. Similarly, C's occurrence within an expression on the right hand side of an assignment would cause it to be tagged with the (Role Input) property.

Once ?In and ?Out have binding values, executing IL expressions like (CreateVblWithVal 'Dim (DimenOf ?In)) is just a matter of retrieving the dimension structures of C and D that were generated by the :form keyword in [18] and [19a-b], i.e., (M N); creating some unique variable names (i.e., Dim10 and Dim 11) for use within the framework; and formatting the variable names with their keyword expressions (i.e., ":dsvalue") to indicate the values of Dim10 and Dim11.

When expression [15] is instantiated with binding list [17], it becomes the fully concrete expression [20]:

'(DSDefStruct RSParms9

(((DSDefPtr BWimage) CP :dsvalue (& C))

((DSDefPtr BWimage) DP :dsvalue (& D))

((DSDefList Dim10:dsvalue (M N)))

((DSDefList Dim11 :dsvalue (M N)))))  [20]

Figure 2:
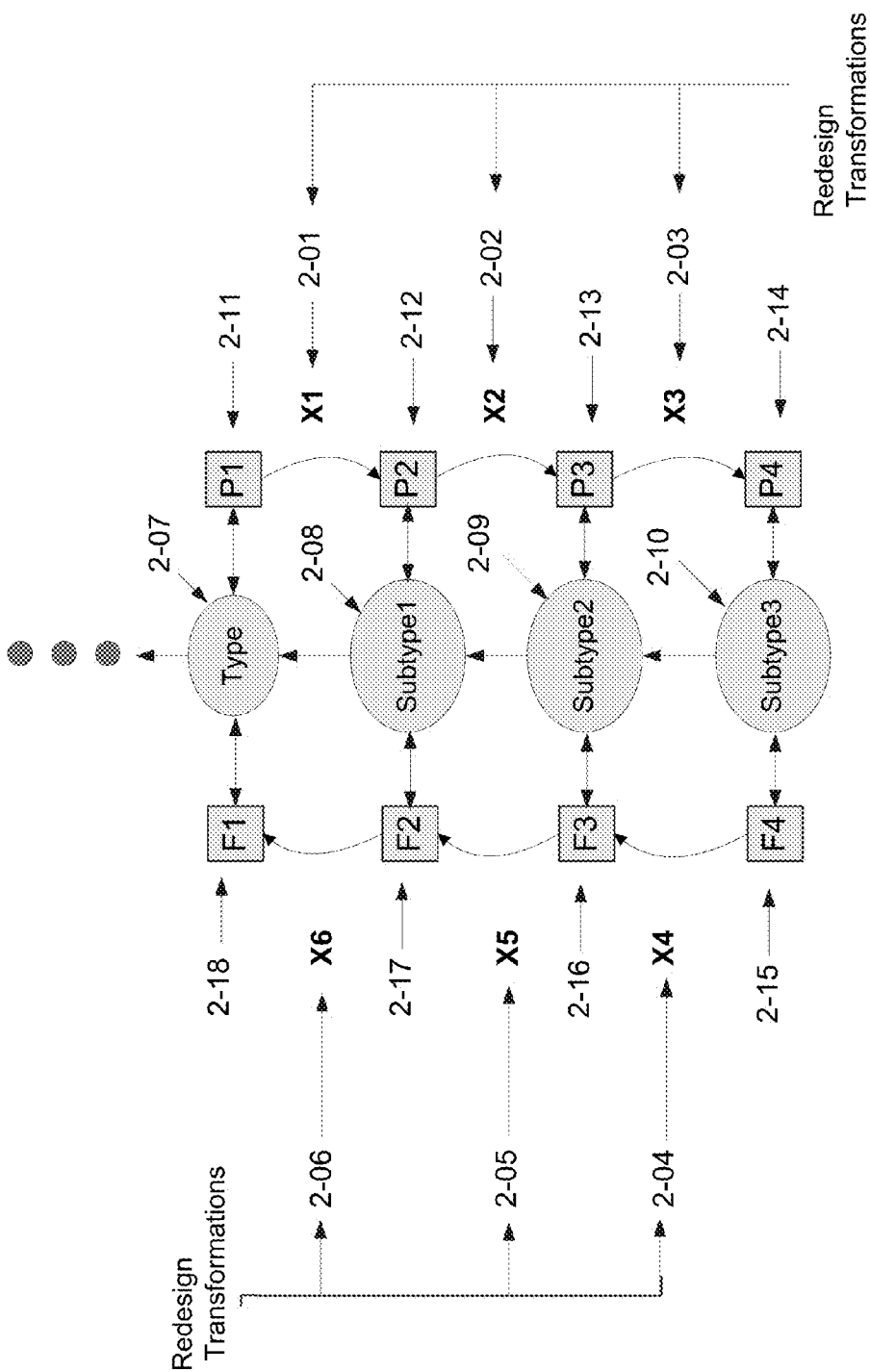
Figure 3A:
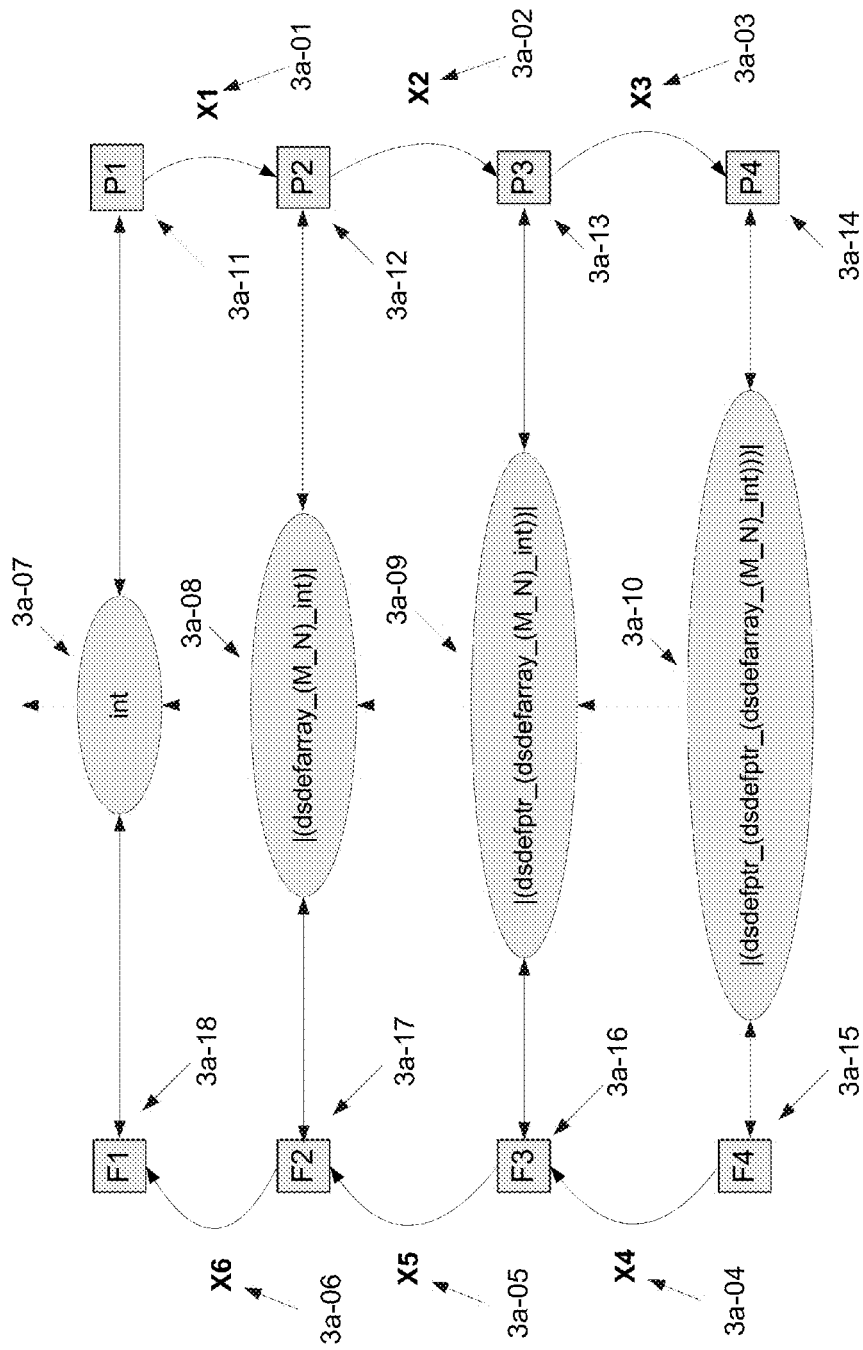

Before we explore the types that will be created by the type specification of [20], we need to introduce some new concepts and structures: scopes and cross links between scopes. In FIGS. 2, 3 and 3a, we have talked about types in a global context. However, in the generation system of this invention, types may be scope specific. Each code block within the target program will have a scope object, which keeps track of what is defined within that block. Composite types may be defined within a block of code (i.e., be recorded in a block's scope object) and therefore be undefined outside of that block. For example, in FIG. 1, the composite type "(Struct parms . . . )" (Ref. 1-04) is defined in the framework block (Ref. 1-01). Similarly, the "(BWImage*BP)" (Ref. 1-05) field is defined in the framework block as are the remaining fields of the Struct type. By contrast, the type Bwimage used in the payload (in Ref. 1-06) is known within the scope of the Payload (Ref. 1-02) but probably defined more globally (e.g., the global type BWImage of Ref. 4a-16) because it is not built out of type constructor functions of FIGS. 1a-c. Eventually, the scope of the payload (or a clone of the payload) will become a sub-scope of the framework scope. Instances of the same globally defined core types (e.g., BWImage of Ref. 4a-16), where the instances are defined within different scopes, are instances of the global types specialized to the scope of their definition (e.g., |(BWImage_:myscope_ScopeP)| of Ref. 4a-01a) by virtue of their scope location. That is to say, instance "B" of Ref. 1-06 will be an instance of a BWImage type that is specific to ScopeP (Ref. 4a-01a), which in turn is a subtype of the global BWImage (Ref. 4a-16). This scope specific difference is effected by including the scope name as a ":myscope" field within the type specification. That is to say, (in the preferred embodiment) if one eval-ed the type symbol to get at the prototype CLOS object associated with that type symbol and examined that object's slots, one would find a "myscope" slot whose value is the scope object in which that type is defined. For global types, that slot will be nil.

The relationships between types in different but related scopes are shown abstractly in FIG. 4. When a type in one scope refers to a type in another scope (e.g., the CP field in the framework in [20] relates the BWImage C defined in the payload scope), the two types are related via a cross link relationship (Ref. 4-18) shown as a dashed line in the figures. The redesigner transformations are aware of cross links and will handle them as special cases. For example, in FIG. 4a (one of the structures created by the declaration of [20]) when redesigning the "(& C)" object (Ref. 4a-06) from type 4a-02a (i.e., a pointer to a BWImage in the payload scope) to type 4a-03 (i.e., the CP field type), the cross link 4a-09 will cause the instance "(& C)" (Ref. 4a-06) in the payload scope to be replaced with 4a-07 in the framework scope.

When [20] is fully processed by FindOrCreateType, it creates the following set of types:

|(dsdefstruct_rsparms9_

(((dsdefptr_bwimage)_cp_:dsvalue_(&_C))_

((dsdefptr_bwimage)_dp_:dsvalue_(&_D))_

(dslist_dim10_:dsvalue_(m_n))_

(dslist_dim11_:dsvalue_(m_n)))

_:myscope_ScopeF)|  [21]

|dsdeffieldop_field2_(cp_rsparms9_:dsvalue_(&_C)_:
  myscope_ScopeF)

_(dsdefptr_bwimage))|  [22]

|(dsdeffieldop_field3_(dp_rsparms9_:dsvalue_(&_D)
  _:myscope_ScopeF)

_(dsdefptr_bwimage))|  [23]

|(dsdeffieldop_field4_(dim10_rsparms9_:myscope_
  ScopeF)_dslist)|  [24]

|(dsdeffieldop_field5_(dim11_rsparms9_:myscope_
  ScopeF)_dslist)|  [25]

That is to say, the type of expression [21] is a composite comprising the types [22] through [25]. In the preferred embodiment, declaring type [21] will cause its components to be declared as well (or found if they already exist).

Figure 4A:
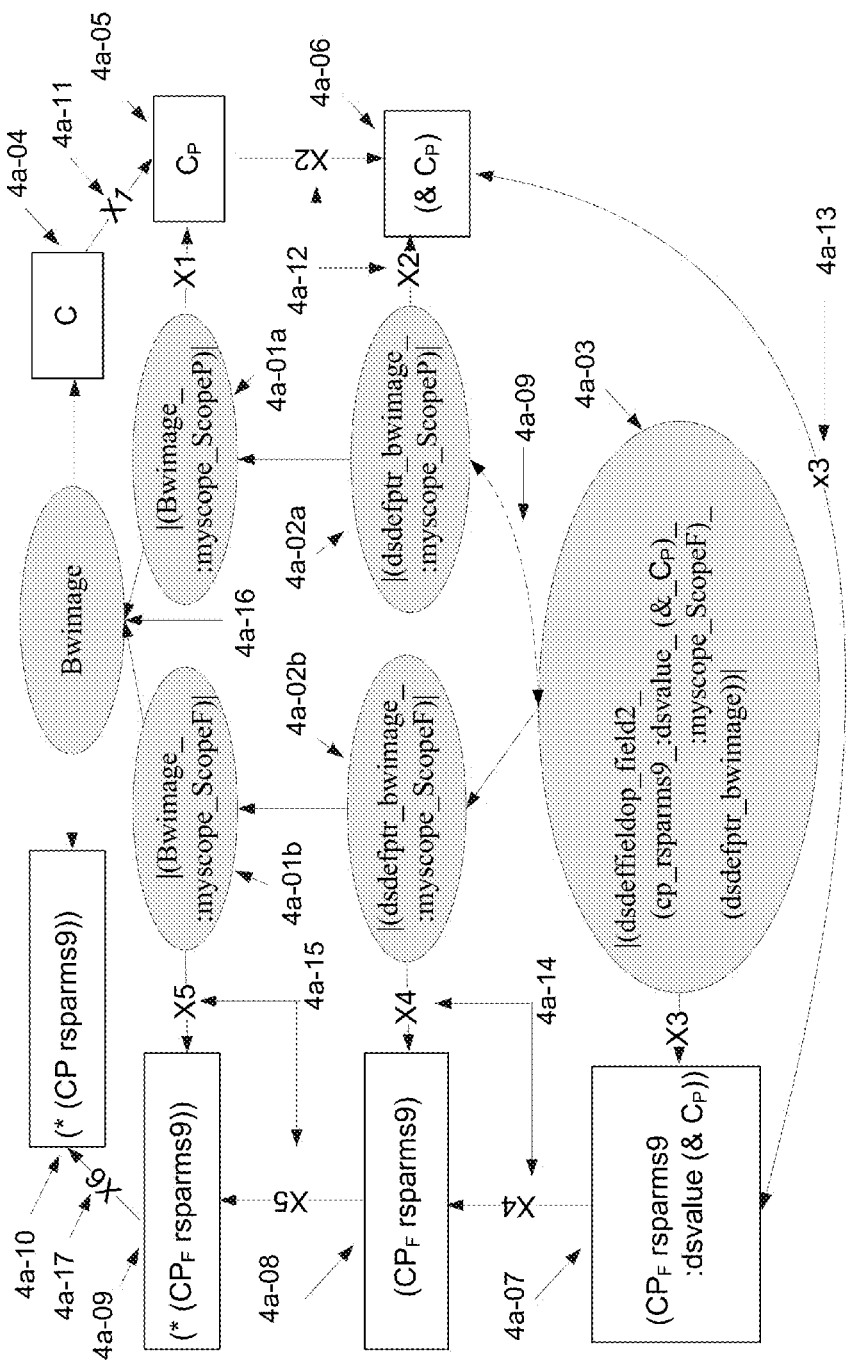
Figure 4B:
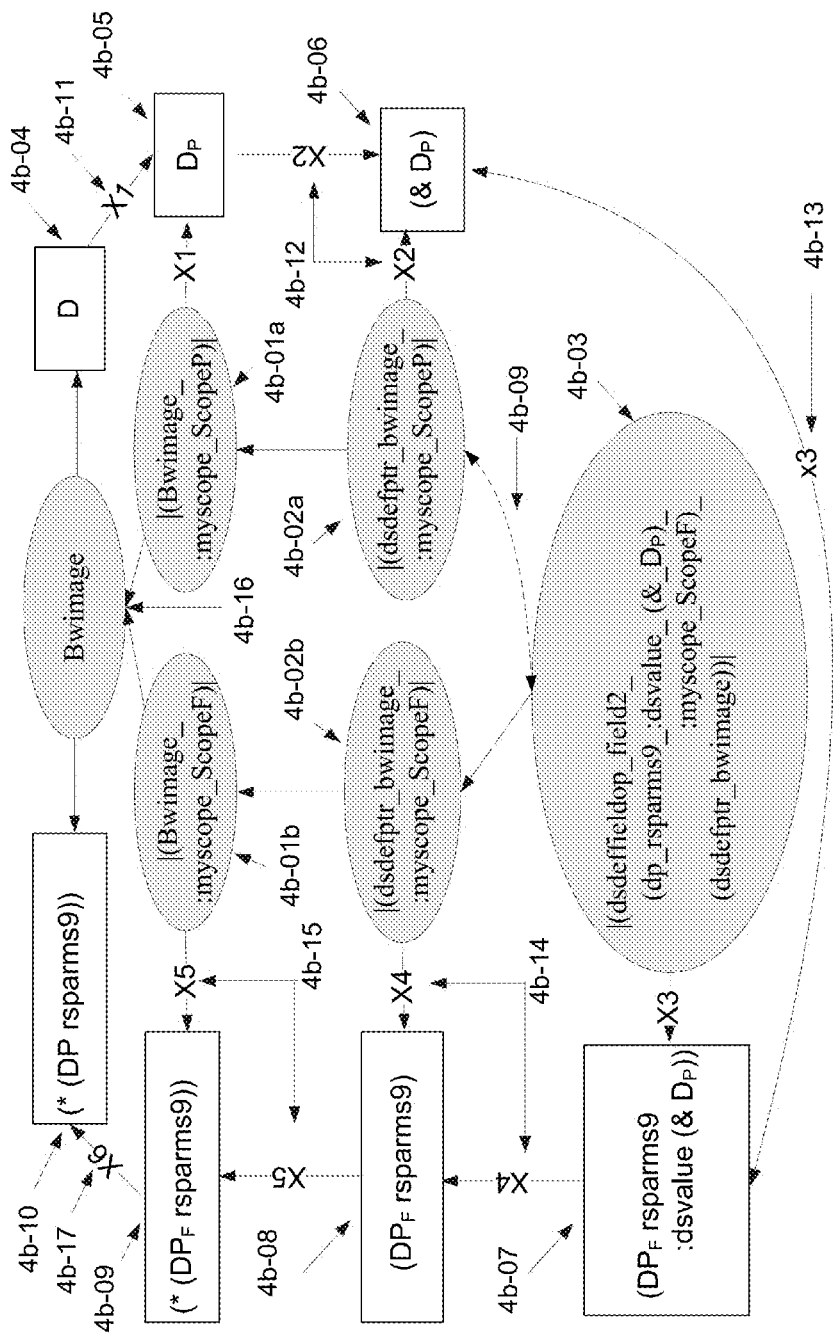

FIG. 4a shows the relationships among the types and subtypes relative to the BWImage C. BWImage D has an analogous pattern of relationships as shown in FIG. 4b. FIGS. 4a and 4b also show the redesign transformations that will redesign an instance of one type in one design context (e.g., a payload context) into an instance of a related type within a second design context (e.g., a framework context). Additionally, FIGS. 4a and 4b show the detailed behavior of transformations X2 (Ref. 4a-12 and Ref. 4b-12), X3 (Ref. 4a-13 and Ref. 4b-13), X4 (Ref. 4a-14 and Ref. 4b-14) and X5 (Ref. 4a-15 and Ref. 4b-15). From FIG. 4a, it is seen that X2 and X3 re-express the instance C of type BWImage from the payload design context, as the declaration or cross link instance (CP rsparms9:dsvalue (& C)) from the framework design context (shown as Ref. 4a-07), which is a dsdeffieldop type (shown as Ref. 4a-03).

Note: The instance Ref. 4a-07 takes the form it does and declares or advertises itself as a cross linking instance because of the pattern within its type (Ref. 4a-03), which references two instances from different scopes. That pattern (i.e., a field declaration paired with an initial value for that field) "declares" or advertises a functional "equivalence" relationship. An equivalence relationship means that a redesigner can substitute one for the other and which direction the substitution takes depends on the order of the Redesigner's arguments. Other different crosslink patterns (e.g., a function type definition) can declare or advertise different relationships (e.g., functional mappings like mapping an array to a list or like explicit type coercions). Transformation X4, Ref. 4a-14, will create code that references an instance of the field name in Ref. 4a-07.

From a more global point of view, it should also be obvious that the composite transformation (X5°X4°X3°X2) would redesign the code "C" in the payload context into the code "(*(CP RSParms9))" in the framework context.

For our example redesigned types from [20], we will use an example computation to illustrate the effects of transformations X2 and X3 (Ref. Items 4a-12 and 4a-13) and transformations X4 and X5 (Ref. Items 4a-14 and 4a-15). The X2 and X3 transformations produce a declarative or cross linking form whereas the X4 and X5 transformations produce an execution form. As we described above, the transformations X2 and X3 represent how an instance C of BWImage is mapped from the design context of the computational payload to the form required by a declaration within the design context of a framework. We will not explicitly need to perform this mapping for the example computation because the framework set up process has already created the composite type from expression [20], which in turn created the required subtype (i.e., [22]) among others. And in the course of that, the framework set up process also incorporated into the type name the detailed relationships among the various items within the framework design context (e.g., the field operator CP, the structure name tag Rsparms9, and the value "(& C)" of the CP field). Additionally, that setup process also added the value ScopeF to the myscope slot of the prototype instance object associated with the 4a-03 type and included the myscope value as a part of the external name of the CP field type. Once expression [20] has been derived from expression [15] with the help of the ARPS protocol, all of this creation will happen automatically the first time expression [20] is explicitly declared as a type and that declaration of [20] will happen automatically as a part of instantiating the framework with it payload.

Figure 14:
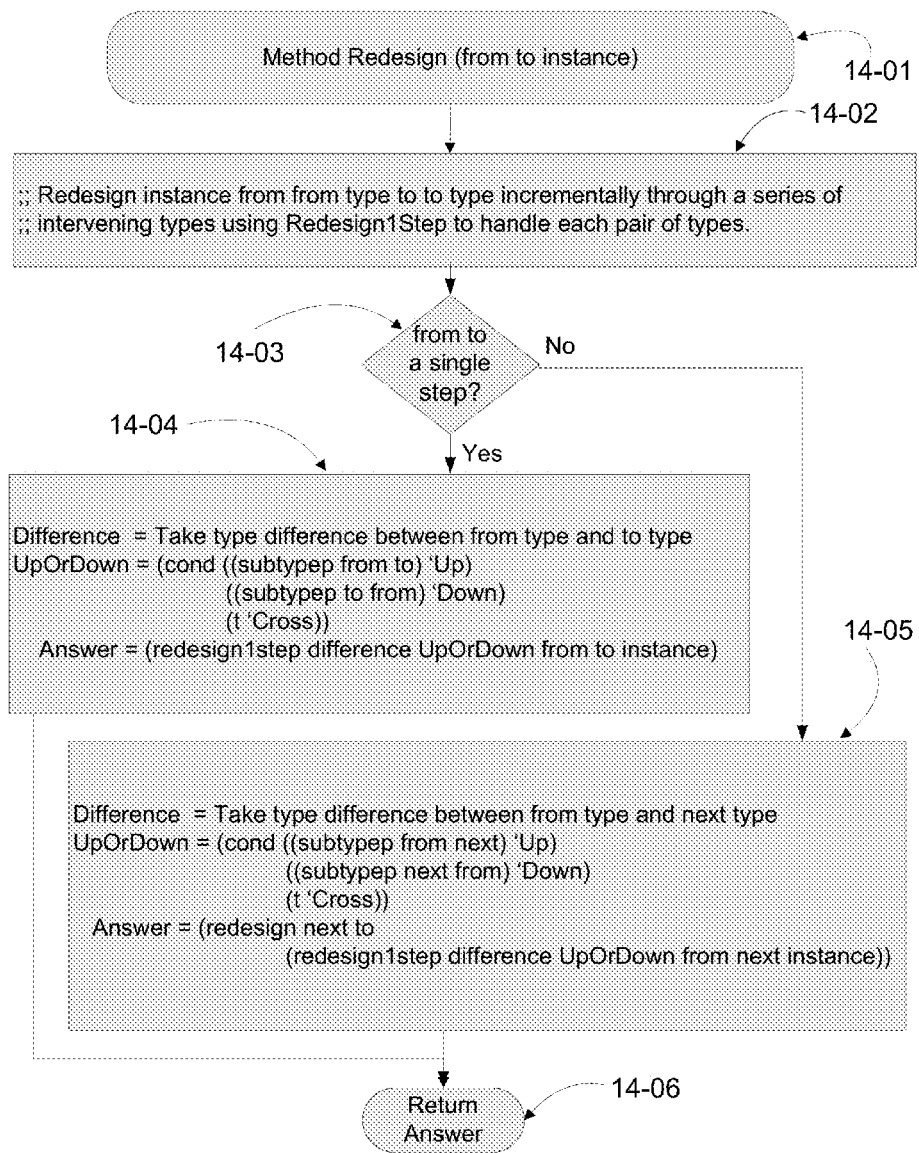
FIG. 14: Redesign Method to redesign an instance between types from and to
FIG. 15: Method Redesign1Step to redesign an instance between DSDefPtr related types
Figure 15:
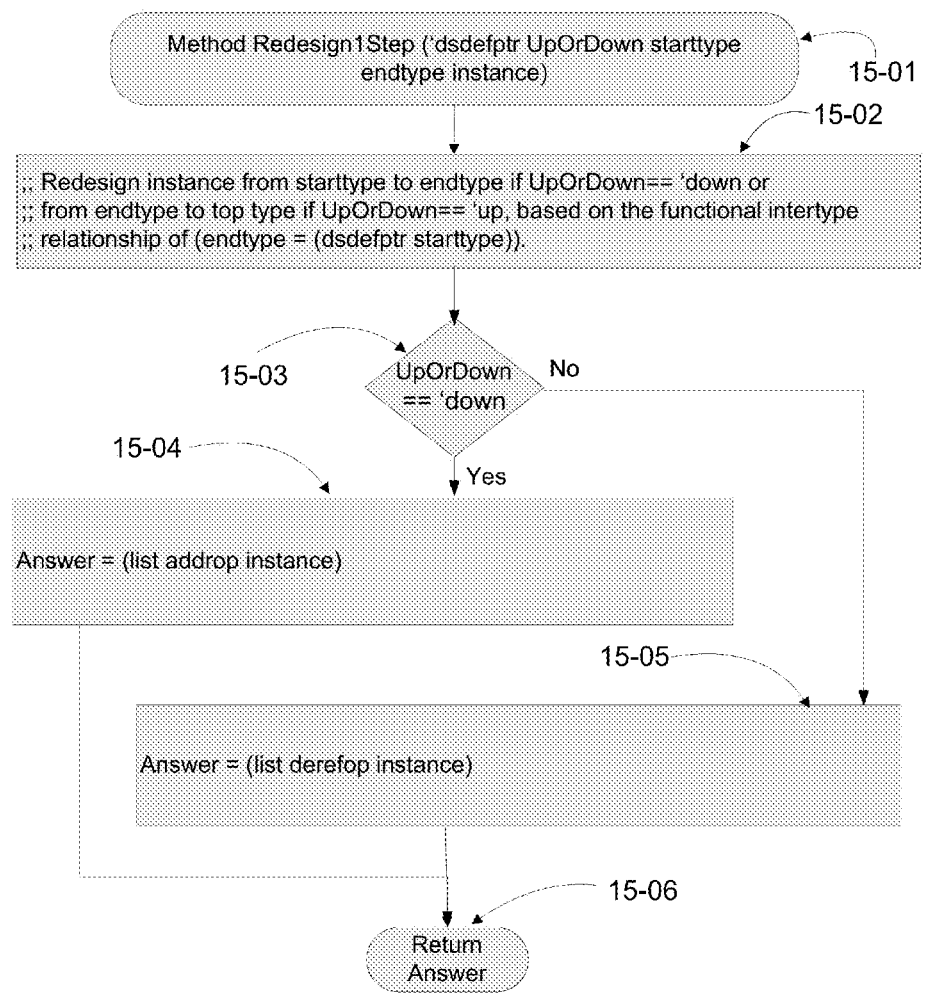
Figure 16:
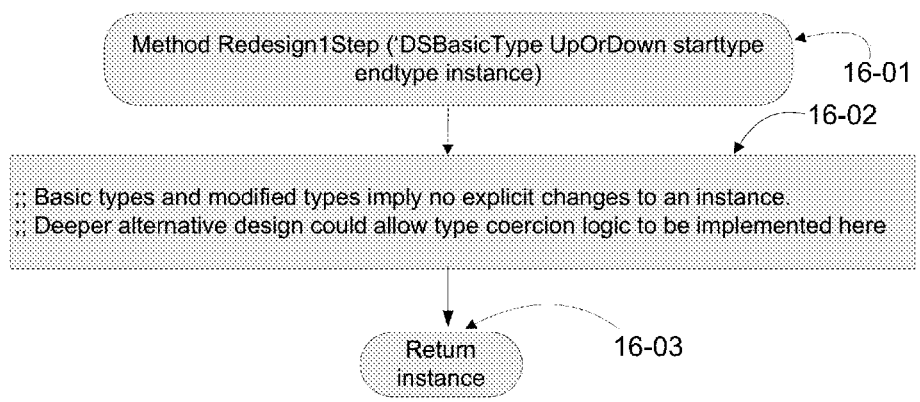
FIG. 16: Method Redesign1Step for basic and modified basic types
Figure 17:
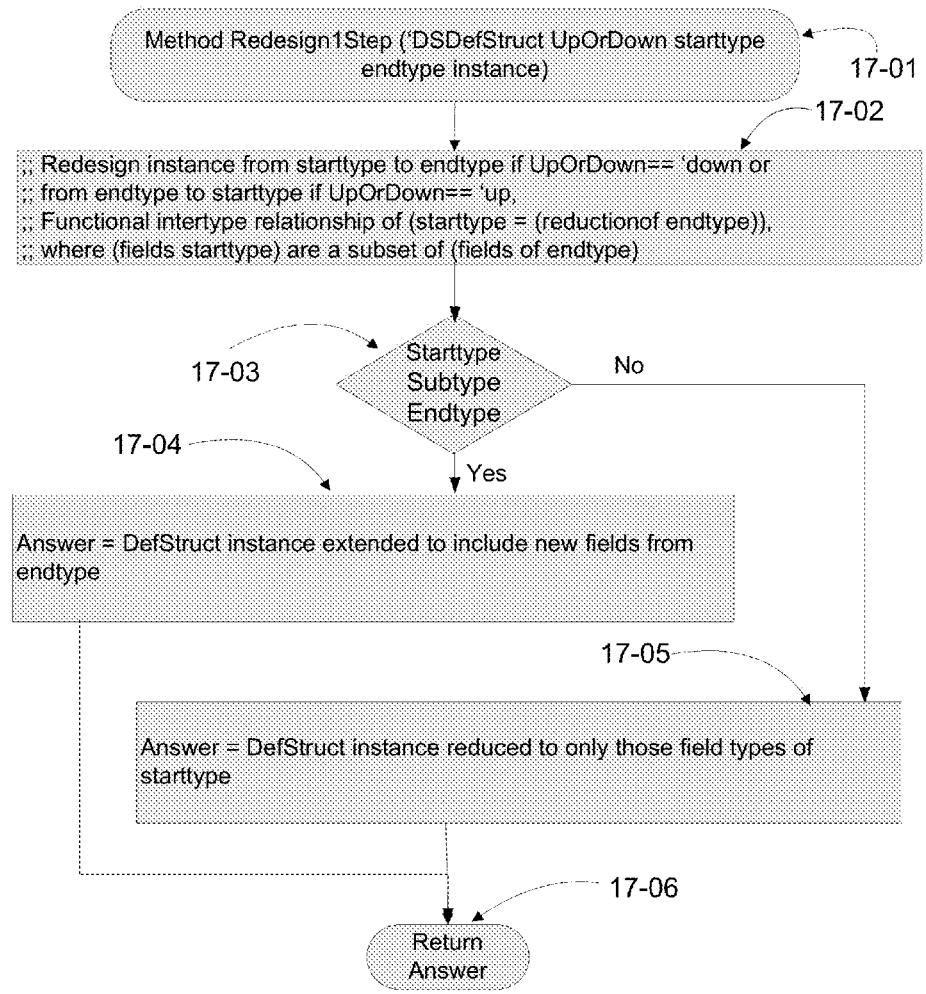
FIG. 17: Method Redesign1Step an instance between DSDefStruct related types

Once the type and relationships of FIGS. 4a and 4b have been created, the framework instantiation process must determine how to redesign C, D, Dim10, Dim11 as well as other data items from the payload into the redesigned versions that will be needed within the framework. For each such payload data item, the framework instantiation process will call a redesigner (FIG. 14) to determine how to express C, D, etc. in the context of the framework. For example, (redesign '|(Bwimage_myscope_ScopeP)|'|(Bwimage_myscope_ScopeF)|'C) [26]

will return the expression [27].

(*(CP RSParms9)) [27]

Expression [26] is asking to transform data item 'C of type BWImage in ScopeP to an instance of a BWImage in ScopeF. The Redesigner (FIG. 14) will recursively break the expression into steps that invoke a redesign method on a single link between types, either a supertype/subtype link or a scope to scope cross link. The final result of all of the single step redesigns will be equivalent to the macro transformation that is the composite of all of the individual single link methods. In the preferred embodiment, these redesigners are implemented as CLOS methods. The redesign methods between composite types are implied by the generated types and their functional interrelationships. If there is no specialized redesigner method whose argument types match directly or through inheritance the "to" and "from" types of some redesign method, then method inheritance will select the default redesigner that will generate an error message on the history list in the preferred embodiment. (FIG. 18) Such a case indicates a design error in the transformations, frameworks, etc. created by a domain engineer, which is analogous to a bug in a conventional compiler. Once the domain engineer has correctly fixed the transformation model, this situation should never happen.

Figure 5:
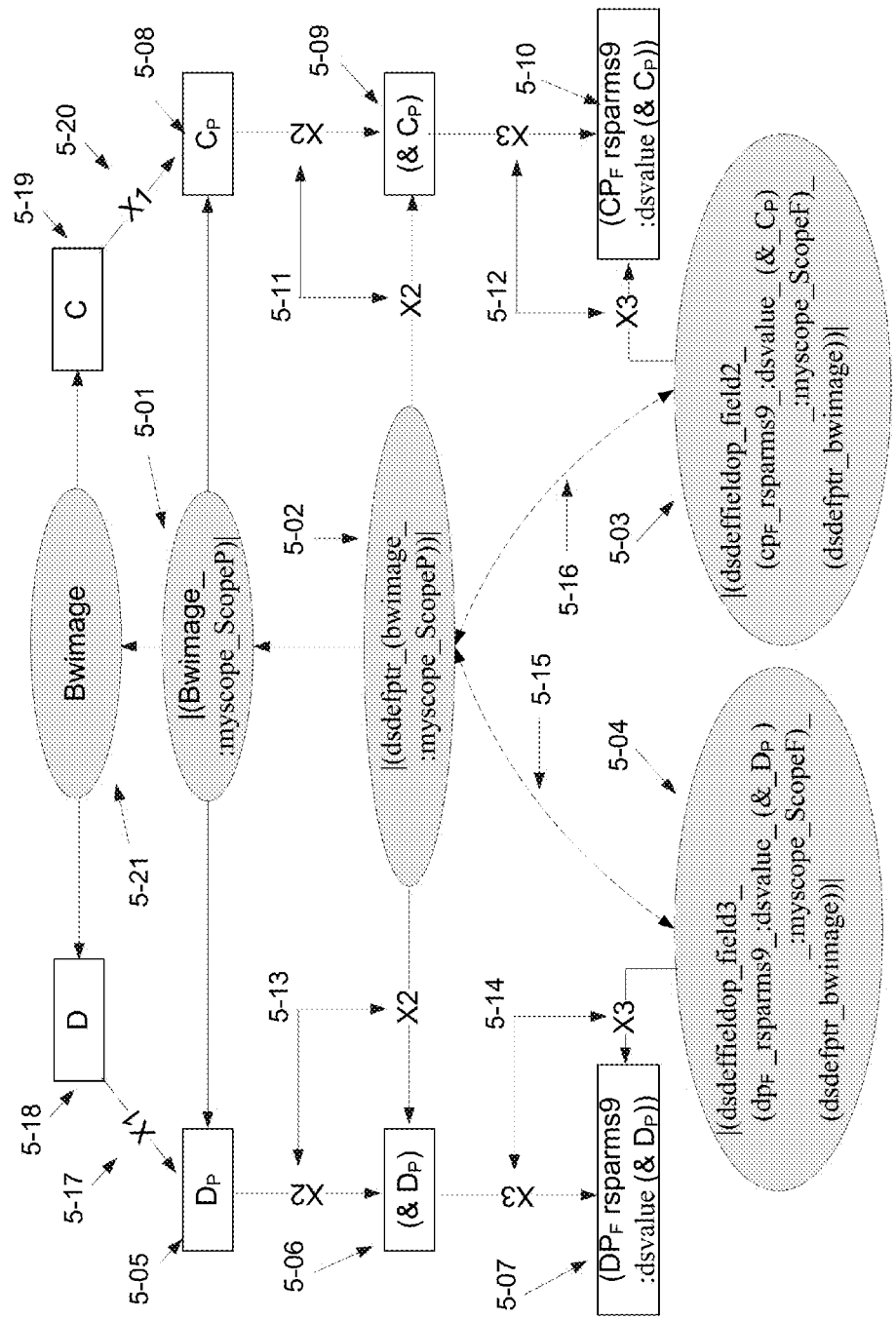

Before we follow the example through to show how the redesigners are used on a concrete problem, let us make one last point about transformations X2 and X3 (FIGS. 4a-b). The framework set up process that constructed expression [20], by introducing the :dsvalue of "(&C)" for the CP field, has uniquely determined the correspondence between the payload and framework design contexts (i.e., C will correspond to the CP field of expression [20]) and therefore, uniquely determined the target type (Ref. 4a-03). As a consequence of this, the result of transformation X3 (i.e., Ref. 4a-07) is also uniquely determined. The :dsvalue field is important as a disambiguator because there may be several payload instances to deal with, e.g., C and D, among others and therefore, several candidate cross scope types of the |(dsdefptr_bwimage_:myscope_ScopeP))| type. And in fact, expression [23] is one of those competing cross scope types. This case is illustrated in FIG. 5 when the invention is dealing with the two BWimages C and D. (Note, because of space limitations, FIG. 5 only shows the payload context and the cross links to the first framework context type, Refs. 5-03 and 5-04.) Since the invention has chosen to incorporate problem specific instances in these highly custom type expressions, the values (& C) and (& D) can be used to disambiguate the starting type for transformations X4 and X5. Given this determinacy, C will correspond to "(*(CP Rsparms9))" and D will correspond to "(*(DP Rsparms9))". It should be obvious from FIG. 5 how X4 and X5 from the framework context (not shown in FIG. 5) would work for the redesign of D as it progresses within the framework context. The full behaviors for both C and D in both contexts are shown respectively in FIGS. 4a and 4b. Now, let us follow an example through the redesign process for C and illustrate how the payload is redesigned to synchronize with the framework. From this example, it will be obvious that the redesign of D is completely analogous to that of C.

The following derivation will illustrate synchronizing an example payload (i.e., the implementation neutral specification shown in expression [28]) to a framework form that is consistent with a context (i.e., a thread routine skeleton within the framework) for starting up threads that execute the code that will be derived from that payload.

(:=(aref d idx13 idx14)

(sqrt (+(expt (aref c idx13 idx14) 2)

(expt (aref c idx13 idx14) 2)))) [28]

Expression [28] is the core of a computation to perform Sobel edge detection in an image (omitting the neighborhood loops to keep the example simple and narrowly focused on the redesigner machinery). (For full details of Sobel edge detection generation, see the following patents: U.S. Pat. No. 8,060,857, Titled "Automated Partitioning of a Computation for Parallel or Other High Capability Architecture," Ted J. Biggerstaff, Application Jan. 31, 2009, Issued Nov. 15, 2011; and U.S. Pat. No. 8,327,321, Titled "Synthetic Partitioning for Imposing Implementation Design Patterns onto Logical Architectures of Computations," Ted J. Biggerstaff, Application Aug. 27, 2011, Issued Dec. 4, 2012.)

In the framework setup process, executing expression [26] will produce the correspondence between C in the payload context and (*(CP rsparms9)) in the framework context. Similarly, executing an analogous redesigner expression for D will produce the analogous expression (*(DP rsparms9)). These two pairs will be the starting values for building a substitution list. The framework setup process continues producing similar substitution pairs for all of the data items from the payload that will be needed in the thread routine. Once all needed data items have been so processed, the substitution list can be applied to the payload (i.e., a cloned copy of the payload) to synchronize it to the framework context. This results in expression [29].

(:=(aref (*(dp rsparms9)) idx13 idx14)

(sqrt (+(expt (aref (*(cp rsparms9)) idx13 idx14) 2)

(expt (aref (*(cp rsparms9)) idx13 idx14) 2)))) [29]

Notice that [29] could equivalently be expressed as [30].

(:=(aref (rsparms9→dp) idx13 idx14)

(sqrt (+(expt (aref (rsparms9→cp) idx13 idx14) 2)

(expt (aref (rsparms9→cp) idx13 idx14) 2)))) [30]

That is to say, the there is a shortcut that is operationally equivalent to the composition of X3 and X2 (which we express formally as X3°X2). In general, most modern compilers will often simplify results like (*(rsparms9.c)), so we illustrate this ability to point out that the machinery of this invention easily allows the opportunity for the generator to directly simplify or optimize expressions during generation. Additionally, such short cuts allow the opportunity to eliminate redundancies that are common in automatically generated code. Redundancies like creating a pointer that is then immediately dereferenced is likely in generated code, i.e., (*(& ... )). A shortcut redesigner can recognize this case and eliminate the redundancy before it is even generated.

Execution of Redesigners

Redesign transformations are specific to a scope of a specific instance of the payload, which will be a cloned form of the INS payload that is specialized to some specific partition of the computation and in this case more specifically, to a synthetic partition. A partition is a logical representation of one decomposed part of an overall computation. More concretely, a set of partitions are a set of constraint objects that represent a method of decomposing an overall computation (e.g., the INS payload) into pieces of the overall computation. A partition will cause its associated expression (say, [28] for example) to be re-expressed (i.e. cloned and redesigned) so that only a part of the overall computation is computed by the re-expressed expression. For example, a set of edge pixels in an image might be an "edge" partition, which along with the other edges and a center of an image will comprise the overall computation. A synthetic partition is a partition that introduces new design structures. For example, the center partition of an image could be re-partitioned into a set of slices each of which will compute a portion of the center of the image and do so in parallel. Thus, the slices would be synthetic partitions that would require new design structures (e.g., the loops over the center partition would have to be reformed into dynamically created and separately executed loops among other implied design structures that express the implied supporting design structures). Typically, the supporting design structures for synthetic partitions are provided by a framework that may include such structures as newly created routines (e.g., for initiating a thread for each slice partition), new data structures (e.g., expression [15]), a coordinated pattern of synchronization structures and so forth. ("Partition" is used here as it is defined and developed in U.S. Pat. Nos. 8,060,257 and 8,327,321.)

It is possible that each synthetic partition could have a set of composite types and redesign transformations that are different from the composite types and transformations for the other synthetic partitions. That is, each differing synthetic partition could have its own distinct scope with its own types and redesign transformations. This is not the case in the example that we are illustrating here because the partitioning arises strictly due to topological subdivision of the image matrices so that the partitioning conditions involve only the indexes of the matrix. So, the data structures introduced by the framework are global to the scope of the overall computation even though parts (i.e., partitions) of that computation may be distributed over separate routines and scopes within that framework. Nevertheless, the general machinery must allow for the possibility of differing scopes for the differing synthetic partitions in the general case.

The other complexity that must be dealt with is the generation time at which the redesign transformations are applied. The generator must have refined the computation to the point where the matrix domain structures have become manifest. That is, redesign must be deferred until the generator has mapped the abstract operators and operands that deal with abstract images into concrete operators and operands that deal with programming language domain matrices. It is possible that in some generation situations, this is not a fixed, known time within the generation process that can be planned for but rather may be triggered by conditions that must be dynamically recognized.

Both the scoping problem and the generation timing problems are solved by dynamically inventing a new generator phase that is unique to the specific scope and time requirements of the specific types, subtypes and redesign requirements. Thus, the generator initiates a sub-phase operation for each specific scope and time situation. A sub-phase is analogous to a routine call. That is, the current generation phase is temporarily suspended and the sub-phase is run thereby altering the Abstract Syntax Tree (AST)—the generator's internal representation of the evolving program—by redesigning the data items to the specification of the framework holes in which they are to be installed. Once all redesign is complete, the framework is instantiated with redesigned clones of the INS payload. The redesigned clones are fully synchronized with the design requirements of the framework and each separate clone has been specialized to the partitioning conditions of its intended framework position.

Redesign Methods

Redesign methods are specific to functionally related types and are pre-defined as CLOS methods in the preferred embodiment. FIGS. 6-13 define the routines that dynamically (i.e., at run time) generate the functionally related types. The type difference between one type and another functionally related type will determine which redesign method instance will be invoked. This machinery takes advantage of the CLOS method's invocation based on multi-method style inheritance. An alternative design for the redesign methods could be based on generating actual transformations (in the preferred embodiment sense) at type definition time. However, this would require more programming, would duplicate the inheritance facilities of CLOS methods and would produce a large set of redundant definitions since a single one step redesign CLOS method (given the rather simple processing of redesigners) can perform the same set of redesigns as many individual transformations.

Figure 21:
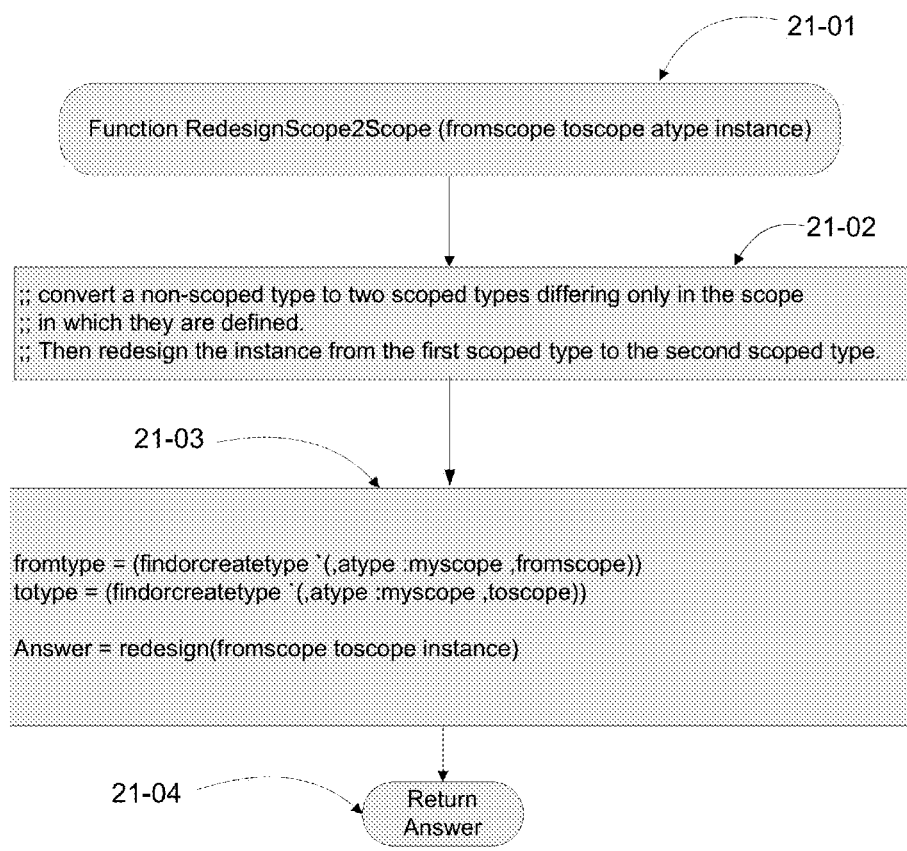
FIG. 21: ReDesignScope2Scope function to redesign an instance of the fromscope of atype to the toscope of atype

The redesign methods are defined in FIGS. 14-20. A highly useful utility function RedesignScope2Scope (FIG. 21) is designed to take advantage of the fact that corresponding types between scopes will be the same type except for a difference in the :myscope key. This allows dealing with the scope portion of a type and the non-scope portion of the type separately. The generator can step through instances that may need redesigning for the target scope (e.g., a design framework) and do the redesign without having "to find" the specific target type. This is a significant convenience. This function will find the corresponding types within the two scopes and call the redesign methods to generate the target instance.

The generic redesign method (FIG. 14) is always the first method invoked, which in turn calls one or more Redesign1Step methods (FIGS. 15-20) to do the step by step redesign for the various type pairs in the type chain (i.e., the set of types linked by subtype/supertype or cross scope links). The redesign method determines the first (or possibly only)

type difference and the kind of the first (or possibly only) type link (i.e., whether it is "up" if linking a subtype to its supertype, "down" if linking a supertype to its subtype or "cross" if linking functionally related types in different scopes). (See Refs. 14-04 and 14-05.) If there is only one type to type link in total, redesign calls a redesign1step method (where the value of difference causes the correct instance of redesign1step to be invoked). See Ref. 14-04. On the other hand, if there are multiple links to be processed, redesign invokes a redesign1step method on the first link and then recursively calls itself to further process the instance returned for the remaining links. See 14-05.

Figure 18:
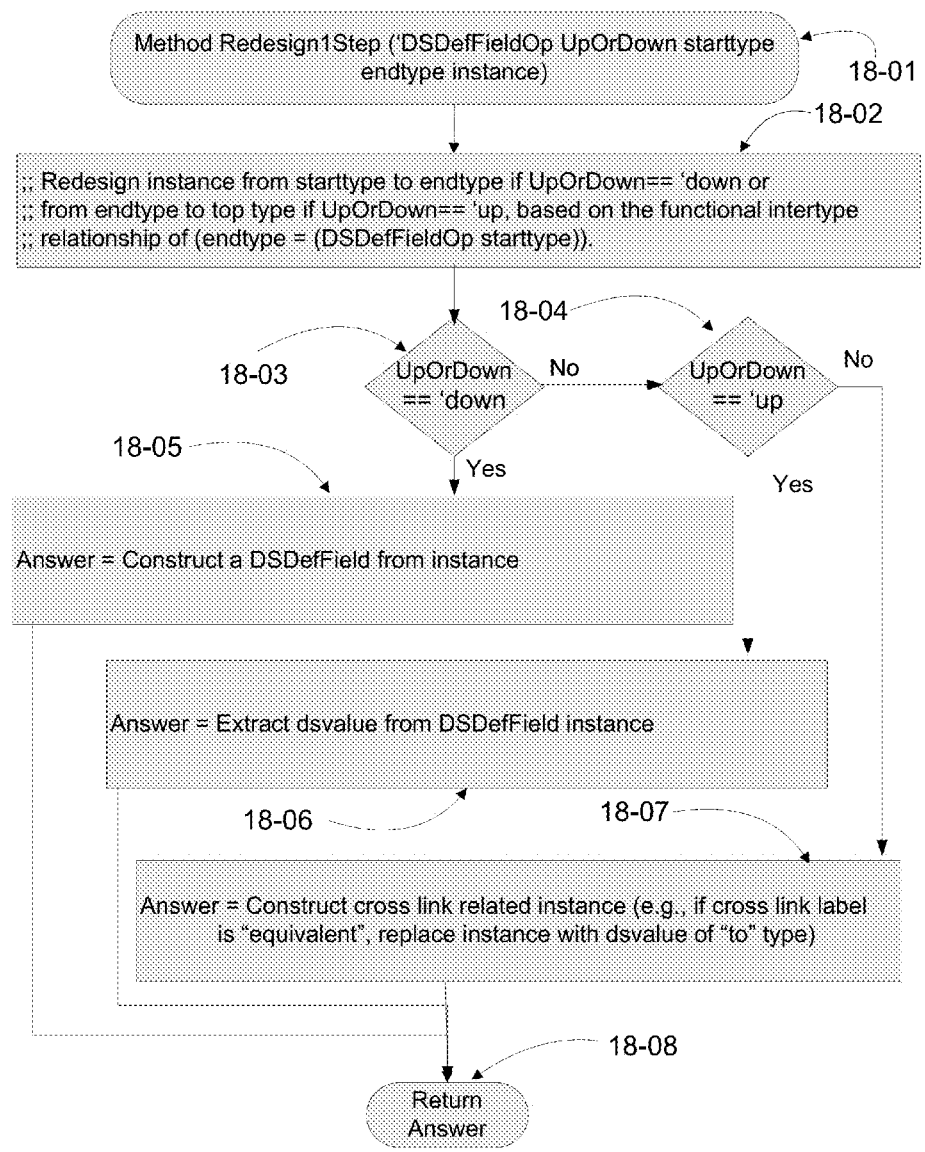
FIG. 18: Method Redesign1Step an instance between DSDefFieldOp related types
Figure 18A:
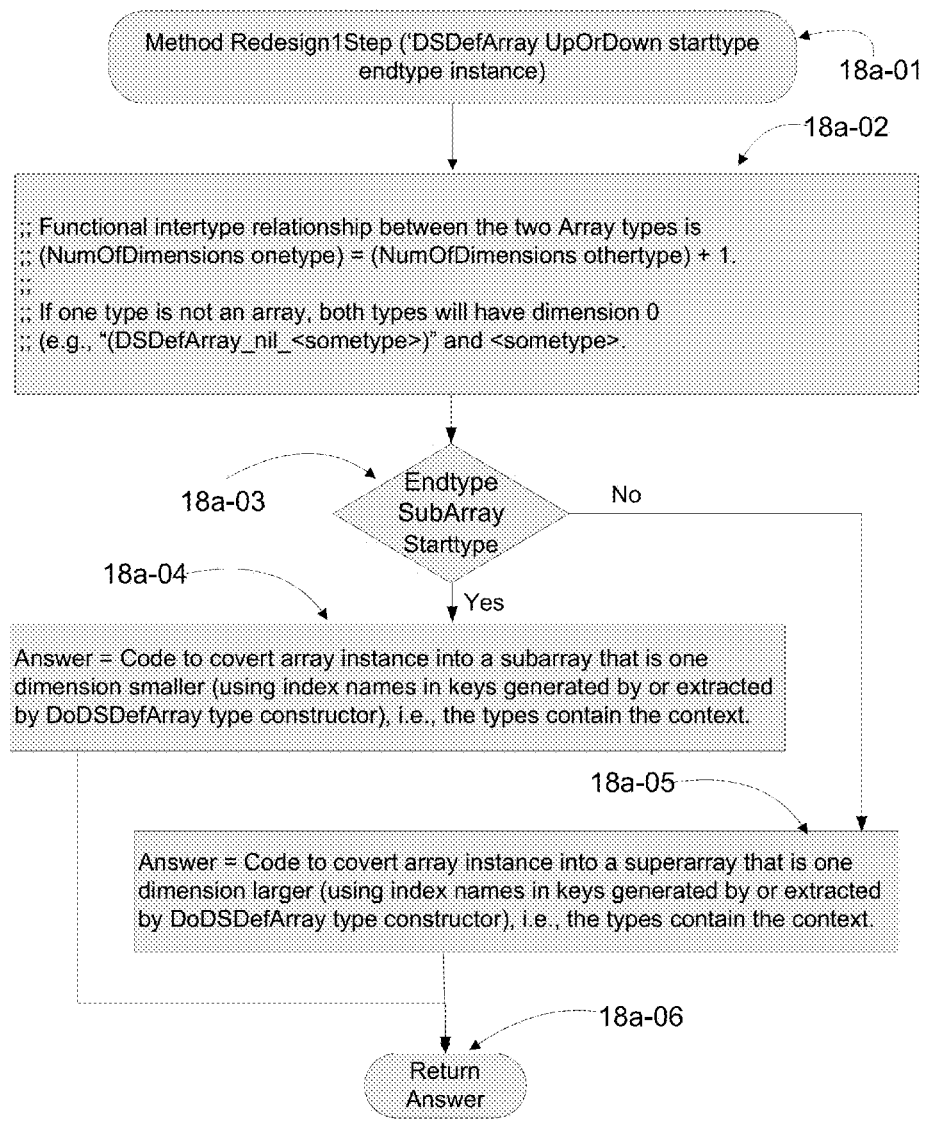
FIG. 18a: Method Redesign1Step an instance between DSDefArray related types
Figure 19:
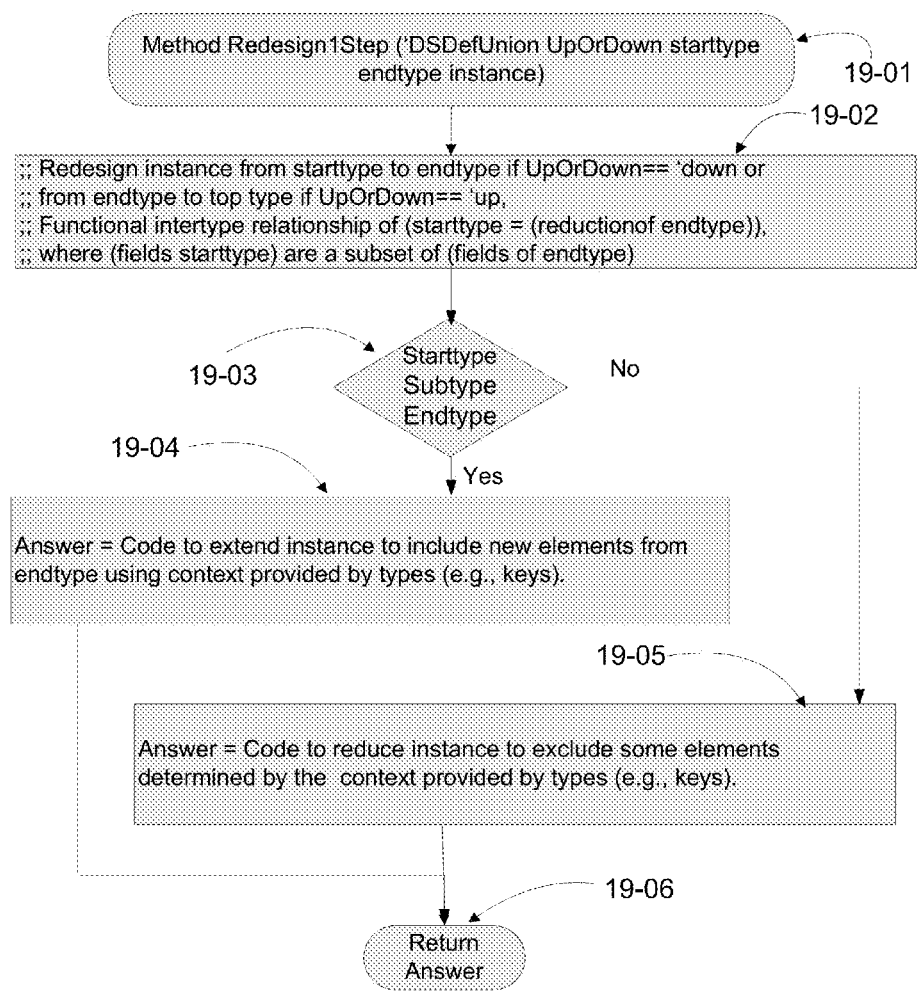
FIG. 19: Method Redesign1Step an instance between DSDefUnion related types
Figure 20:
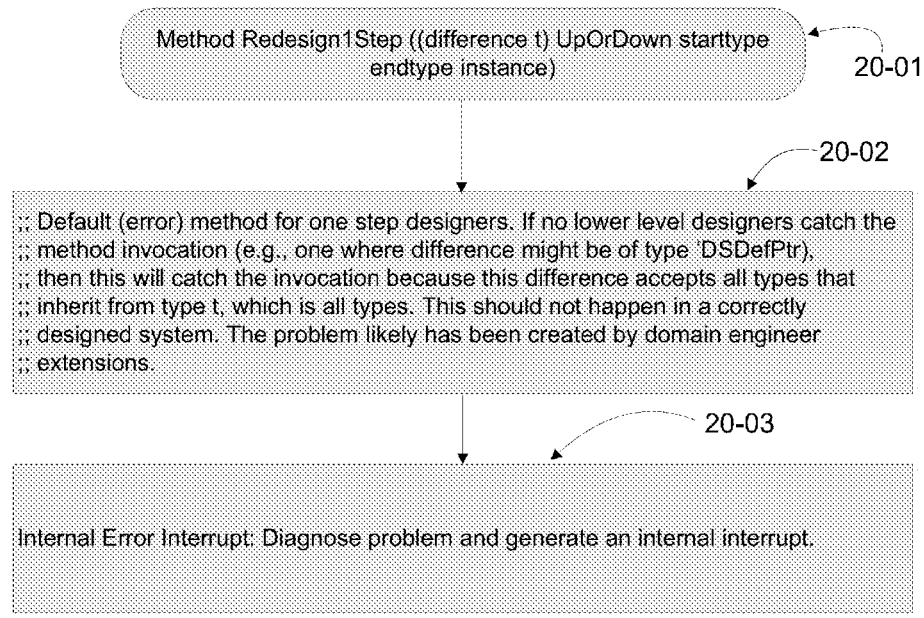
FIG. 20: ReDesign1Step default (error) method

The redesign1step that is the most relevant for the example discussed above and probably one of the most common usages of design feature induction for synchronizing code between disparate scopes is shown in FIG. 18. In Ref. 18-07, it is handling a cross link of computationally "equivalent" though representationally distinct pieces of code.

This kind of cross link (i.e., equivalence) is common but it is not the only kind of cross link that this invention includes. In general, there are a large plurality of (and possibly infinite number of) useful functional cross links but because of the vastness of this number and because once the invention method and mechanism is understood the extension to include other cross links is relatively easy to envision, this invention specification has made no effort to elucidate all such possible cases (which are probably impossible to elucidate in any case). Given an example mechanism (e.g., the equivalence crosslink), introducing a plurality of other crosslink types is straightforward. However, to suggest the nature of some of the possibilities, we will offer further examples. These examples should make extending the mechanism in relatively easy for one skilled in the art of domain specific program generation.

In the example given (i.e., Ref. 4a-13, which is the X3 transformation of FIG. 4a), the corresponding instances between scopes represented computationally equivalent code in two different scopes. Redesigning an instance of code from one scope to the computationally equivalent instance in the related scope only requires substitution of one form for the other form. Only the design feature of the computational pathway to the data instances varied between the two scopes and that variance was encoded in the type chain linking the two. The equivalence cross link connected the two dissimilar data pathways. By contrast, suppose that the underlying data structures are different but there is a set of functions that provide a one to one mapping between the objects and operations of the two distinct data structures. This is one of a possibly infinite set of redesign systems, i.e., systems that link one set of data structure designs to a different but functionally related set of data structure designs. One of the simplest concrete examples is the functional relation between a list and an array. In this case, only the concrete form of the data structures and the operations are different. Abstractly, they are the same. Such a functional relationship would require redesigners to produce code to convert from one form into the other and from operations on one form into operations on the other. This would be the kind of code that would be generated by a redesigner for a list/array relation. Relating this to the "equivalence" cross link example used earlier to illustrate the invention machinery, the code for the list/array example is the analog of the earlier example's redesign of the access code for use within one scope into computationally equivalent access code for use within the other scope.

However, the application of this machinery can be carried even further by a coordinated set of type chains that taken together can reorganize the code but more importantly, the design that precedes the code. That is, one could build a fully automated refactoring system based on this machinery. (See http://en.wikipedia.org/wiki/Code_refactoring for an overview of refactoring of only "code".) There are a host of systems to refactor or aid refactoring of "code." However, the true novelty and real value of using this machinery for refactoring is in the refactoring not of code but of the logical and physical architectures that are precursors to the eventual code representation. (The distinction between the logical and physical architectures can be loosely thought of as the respective representations before and after partitions have been applied to a specification. That said, the reader should be aware that the transition is not really a singular, sharp boundary but rather an incremental series of changes that transform a logical architecture into a physical architecture, where the details of these transitions are not important at this level of discussion.) For an example of refactoring logical and physical architectures, consider revising a computational expression that is doing a sum of products calculation by modifying it with a logical architecture consisting of a set of partitions of vector operations (i.e., pack, unpack, sum vector and sum of product of vector instructions all of which apply to vectors of limited length—and more specifically, instructions such as the Intel's PADD and PMADD instructions) could be conceived of as refactoring the architecture of an expression in advance of actual reformulation of the expression. This produces a completely new kind of use and meaning for the term "refactoring." It extends the meaning of the term to a completely different realm and thereby significantly enhances the power and utility of refactoring. While the notion of refactoring of designs as it has been used in the past has been a semi-formal system in which most of the insight, changes and revisions have by necessity been performed by a human in the loop. Automation of past systems has been virtually all in the visual presentation and editing facilities because there was no way in which the automated systems could "understand" anything much beyond syntactically oriented forms and structures. By contrast, the revision of "refactoring" invented above would be fully automated with no human in the loop. The human programmer's only job would be to specify the frameworks, the progenitor types and the ARPS anaphoric references. Automation would bring the frameworks and design components together and automatically perform the "refactoring" operations.

Notice also that this machinery can easily subsume and handle the kind of type coercion currently handled in an ad hoc manner within existing compilers. In this context, type coercion is a trivially simple kind of sub-machinery within the machinery of this invention. It is obvious, however, that type coercion as currently defined and used in compilers and elsewhere is a trivial operation (in the context of this invention) and a conventional system of type coercion would be unable to solve the kind of general problems that this invention solves.

Another kind of crosslink application is presented when the generation system of the preferred embodiment needs to create answer structures to support loops producing multiple values from input structures (e.g., loops over a pixel structure contain Red-Green-Blue fields). The differing "scopes" in this case are the different contexts set up by the high level operators as related to those required to be set up by the general programming language code. That is, if a convolution $C_f$ is defined on a type pixel and a type neighborhood, and returns the type pixel, then $C_f$ defines an abstract relationship between the input and output data structures of $C_f$. Any concrete answer structure for that pixel abstraction must be "similar" in number and types of the fields of some user-defined concrete input structure (which in this case will be the concrete pixel structure rather than a concrete neighborhood abstraction because $C_f$'s abstract output type is defined to be an abstract pixel). However, the convolution can be implemented in a variety of concrete ways (e.g., using sets of global variables or C-language like structs) and the definitions of the lower level operators that define $C_f$ are not restricted to one concrete definition of the input and output data structures. They are defined in terms of the abstract components of a pixel. At some point, those abstract data structures need to be pinned down to concrete data structures (e.g., a C language-like struct with int fields named Red, Green and Blue, respectively). Typically, the user will pin the concrete definition down by defining a concrete input struct and by implication, pin down the output structure of the other low level operator definitions used to define convolution. Concurrently and importantly, any intermediate concrete data holders (e.g., the concrete answer structure invented by the generator) will thereby also be pinned down by implication. The abstract functional relation between the input and output pixels used by the convolution and its lower level implementation operators will determine the concrete redesign code that will link the each concrete computational result (e.g., a formula to compute the red value of a pixel) to a concrete answer variable (e.g., the "Red" slot of the newly invented answer struct).

More specifically, what this means is that there is a functional cross link between the abstract input pixels and abstract output pixel used by the abstract definition of $C_f$ that maps between the corresponding types of their components. Thus, in that functional cross link mapping, the abstract Red input component maps to and from the abstract Red output component, and similarly for the Green and Blue components. Any concrete subtypes of the abstract input and output pixels (e.g., a C-language like struct) must inherit that cross link. The concrete answer construct will be a subtype of the output pixel abstraction and thereby will be cross linked to the concrete input pixel abstraction. Thus, we have a very simple example of the kind of type chain seen in FIGS. 4 through 5.

Another kind of extension can be made by replacing data structures by mathematical abstractions and this produces another possibly infinite set of redesign systems.

Each such extension may engender extensions to the existing redesign methods as well as the addition of new redesign methods.

Generating Type Inference Rules

The preferred embodiment provides a pattern building function for type inference rules that infer the types of expressions. This is required because each revision of an Abstract Syntax Tree (AST) subtree requires a recomputation of the (possibly altered) type of that new subtree. Since the type inference process is rule driven, the addition of new composite types implies the need for new rules that determine how the types of subtrees containing these new types are to be computed.

The form created by this pattern building function is:

(defOPInference<holder type>(<operator type><arg type1>... <arg typeN>)

<inferred type designation>) [31]

The <holder type> is the home type of the rule pattern. That is, a slot of the holder type prototype instance (i.e., the prototype is a CLOS object) will contain the rule pattern. If the <holder type> is home to several different rules, they will be composed as a larger rule that OR-s them together in reverse order of their definition. This means that the type inference process will try each rule in turn (within a single holder and on holders up the inheritance tree) and the first one to succeed will return a binding with the resultant type of the inference. The list "(<operator type><arg type1> ... <arg typeN>)" from [31] is the pattern of types that if successfully matched against some target expression will cause the <inferred type designation> to be returned as the inferred type.

A few concrete examples from the preferred embodiment are shown in expressions [32] through [35].

(defOPInference DSTypes (DSDeclare (oneormore t))
    DSDeclare) [32]

(defOPInference AOperators (AOperators Number
    Number) DSNumber) [33]

(defOPInference ImageOperators (ImageOperators
    image iatemplate) 1) [34]

(defOPInference ElseOp (ElseOp (oneormore t))
    last) [35]

From these examples, the reader will notice that often the home of the rule is the type of the operator but not always, e.g., [32]. Since the rules obey inheritance, some rules live higher in the inheritance hierarchy and therefore, cover a greater span of subtypes. "DSTypes" is the top type of the preferred embodiment and "t" is the top type of the Common-Lisp system, which hosts the preferred embodiment. When "t" is used as a type, it means that any type either Common-Lisp type (e.g., a number) or a DSLGen (i.e., the preferred embodiment's name) type is acceptable.

Other useful options allow, for example, a sequence of types of indefinite length, as illustrated in [32] and [35]. "(oneormore t)" matches one or more of any type (i.e., "t"). There is also a zeroormore sequence matcher. The <inferred type designation> can take several forms:

an explicit type as in [32] and [33];
    an integer indicating the position in the pattern (i.e., 0
        through n), which allows a more specialized type than
        the one specified in the pattern to be returned (e.g., rule
        [34] might return the type "colorimage," which is a
        subtype of the "image" type);
    "last" to indicate the last type in a sequence of indefinite
        length; and
    other useful forms.

The type constructor functions (FIGS. 7-13) may (and sometimes may not) create specialized type inference rules that are particular to the functional relationship between the types they are constructing and the supertypes of those constructed types. For specific examples, see FIGS. 7, 8, 10, 11*a-b* and 12.

The Anaphoric Reference Protocol for Synchronization (ARPS): Using Domain Knowledge to Acquire Context The Problem: A key problem in using "programming language based code" components developed independently in one context (e.g., context X) without knowledge of their potential use in and connections to elements of a disparate context (e.g., context Y) is that there has been no feasible way to connect the elements of one of the code components from context X to the conceptually corresponding elements of a second code component from context Y without negating the independence of the two contexts and thereby negating the combinatorial value of pairing many, mostly independent contexts. Identifying the correspondences between disparate code components by concrete names is not feasible because the two contexts are developed independently and likely at different times. And using parameters to communicate compromises the desired independence of the independently developed components.

The Solution: The key to solving this problem while maintaining a large degree of independence of the potentially combinable code components is the recognition that the kind of abstractions chosen to represent these components will determine how difficult or easy the combination will be. This section will show that using representational abstractions based on programming languages (the conventional approach to generation problems) makes the problem very difficult and in most cases infeasible. On the other hand, using representational abstractions based on "domain specific structures" vastly simplifies the synchronization problem and allows feasible solutions for most if not all context synchronization problems. The domains underlying this solution will factor integrated programming abstractions into separable, atomic domain concepts and structures, thereby introducing the opportunity for a reference system (ARPS) that allows indirect connections between the two disparate contexts using the domain abstractions as the indirect connectors.

For example, a set of thread routines that cooperate to perform a large computation in parallel and that are represented in program language based abstractions requires sophisticated analysis to determine the nominal loop that underlies the thread based iterations. If that nominal loop is broken into parts that are scattered across several routines, very difficult analysis would be necessary to determine those parts. The overall pattern of thread synchronization would require yet more and deeper analysis. For example, elements of the code such as C-language structs may exist because of implicit restrictions of library routines (e.g., a thread library routine that will host a user written computation may allow only a single user parameter to be passed to that computation). Much of the knowledge that would be required to determine these elements of the computation is implied by the details, interplay and juxtaposition of the scattered programming structures within the representation or in the case of the earlier example, by human based knowledge that is not formally a part of the code. In general, determination of such elements from programming language representations is infeasible in all but the simplest of cases.

Let us make this abstract argument more concrete. Consider the segments of code [36], [37] and [38].

```
void Sobel Edges9( )
    {
        {for (int j=0; j<=(n-1);++j) b [0,j= 0;}
        {for (int i=0; i<=(m-1);++i) b [i,0]= 0;}
        {for (int j=0; j<=(n-1);++j) b [(m-1),j]= 0;}
        {for (int i=0; i<=(m-1);++i) b [i, (n-1)]= 0; }
        _endthread( ); }
void SobelCenterSlice10 (int *h)
    {long ANS45; long ANS46;
        for (int i=h; i<=(h+ 4); ++i) {
            for (int j=1; j<=(n-2); ++j) {
            ANS45 = 0;
            ANS46 = 0;
            for (int P15=0; P15<=2; ++P15) {
                for (int Q16=0; Q16<=2; ++Q16) {
                    ANS45 +=
                        (((*((*(B + ((i + (P15 + −1)))) + (j + (Q16 + −1))))) *
                        ((((P15 − 1) != 0) && ((Q16 − 1) != 0)) ? (P15 − 1):
                        ((((P15 − 1) != 0) && ((Q16 − 1) == 0)) ?
                        (2 * (P15 − 1)): 0)));
                    ANS46 +=
                        (((*((*(B + ((i + (P15 + −1)))) + (j + (Q16 + −1))))) *
                        ((((P15 − 1) != 0) && ((Q16 − 1) != 0)) ? (Q16 − 1):
                        ((((P15 − 1) == 0) && ((Q16 − 1) != 0)) ? (2 *
                        (Q16 − 1)): 0)));
            }}
        int i1 = ISQRT ((pow ((ANS46),2) + pow ((ANS45),2)));
```

```
        i1 = (i1 < 0) ? 0 : ((i1 > 0xFFFF) ? 0xFFFF : i1);
            ((*((*(A + (i))) + j))) = (BWPIXEL) i1; }}
    _endthread( ); }
void SobelThreads8 ( )
    { HANDLE threadPtrs[200];
      HANDLE handle;
      handle = (HANDLE)_beginthread(& SobelEdges9, 0, (void*)0);
      DuplicateHandle(GetCurrentProcess( ), handle,
          GetCurrentProcess( ),&threadPtrs [0],
          0, FALSE, DUPLICATE_SAME_ACCESS);
      for ( int h=0; h<=(m−1);h=h+5)
      {handle = (HANDLE)_beginthread(& SobelCenterSlice10, 0,
        (void*) h);
          DuplicateHandle(GetCurrentProcess( ), handle,
          GetCurrentProcess( ),&threadPtrs [tc],
          0, FALSE, DUPLICATE_SAME_ACCESS);
      tc++; }
      long result = WaitForMultipleObjects(tc, threadPtrs, true,
        INFINITE); }
```

What is this computation doing? How would one analyze these segments of code to understand what it is doing and what are the elemental parts? Without any clues, understanding this code is exceedingly difficult even for an intelligent and informed human programmer let alone for an automated system. In short, these three elements are computing a Sobel edge detection algorithm (as defined in FIG. 22a) on a black and white image using thread based partitions of the computation. [36] is performing the degenerate part of the computation, which by default simply puts zeros in the edge pixels of the output image B because there is no meaningful interpretation of Sobel edge detection for edge pixels. One instance of [36] is running as a thread, where that thread is initiated by line 4 of expression [38]. Expression [37] is computing a slice of the non-edge (i.e., center) pixels comprising five rows of pixels of an image per slice. Many instances of [37] will be running in parallel. Each one of these instances is initiated by line 9 in [38].

There is a very simple synchronization pattern for the parallel threads. Upon completion, each thread routine will implicitly signal its completion by the _endthread( ) call as its last line. The last line of [38] performs the synchronization by waiting until all threads have completed. What happens if one or more threads fail to complete? The code of this example does not specify what happens in that case. A slightly more sophisticated version of these routines might include some behavior for this case such as a timeout that would diagnose the problem and probably halt.

The casual reader can be forgiven for not being able to understand this code without great intellectual effort and even then, absolutely certain understanding would probably require additional knowledge that falls outside of that which the code communicates (e.g., hypothetical test executions to confirm or refute various hypotheses). The goal of this example is to make the point that code based representation systems are difficult to understand even when they are a self consistent set of routines that are carefully designed to work correctly together. And further, when one is attempting to understand and synchronize two disparate code components that are not quite consistent with each other, automation in the programming language domain is simply infeasible in all but the most trivial cases. So, how can we alter the problem to make synchronization possible? Perhaps choosing a representation system that is not code based might provide a glimmer of hope. And indeed it does.

In contrast to a code based representation, let us consider a domain based representation system. Such a domain specific representation might contain direct but separable objects for domain oriented entities (e.g., an image or a domain specific convolution operator such as ⊕) and constraints upon those entities (e.g., a domain specific nominal loop, a partitioning object that implies how to break the loop into partial computations and a design framework that supplies the architectural superstructure of the overall computation, incorporates implicit knowledge like parameter restrictions on user written thread routines, and synchronization patterns for parallel computation parts). In this domain representation, the integrated programming language structure is implied but not yet formulated by the generation system.

Figure 22:
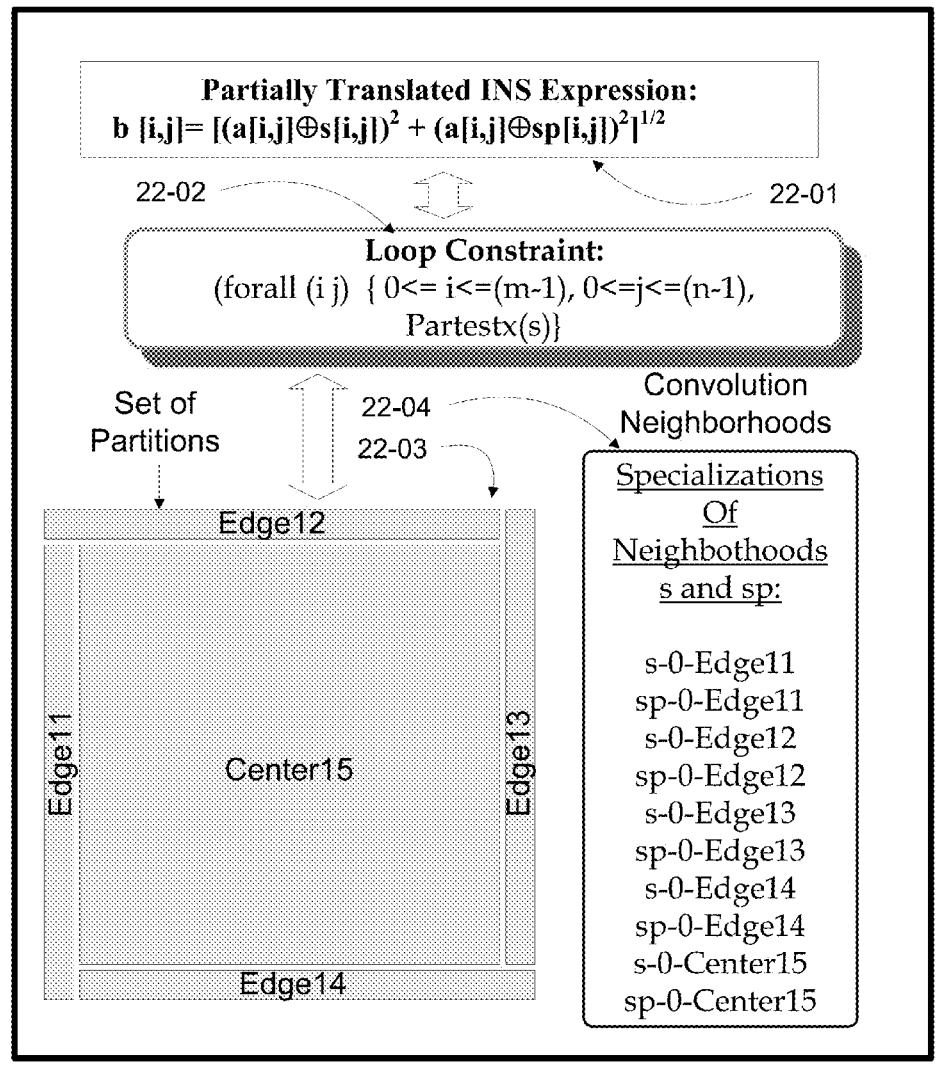
FIG. 22: Conceptual view of domain specific logical architecture

FIG. 22 is a conceptual view of a domain specific representation (i.e., a logical architecture) of the computation, where that computation was realized by the (generated) code of expressions [36], [37] and [38]. The Implementation Neutral Specification (INS) of the computation has been translated from the domain specific input form expressed by the application programmer (Ref. 22a-01) into the partially translated representation (Ref. 22-01) using the convolution definition of Ref. 22a-02. Associated with (and thereby modifying) the INS is a 2D loop constraint (i.e., a domain specific partial and provisional representation of the nominal loops over the image A, Ref. 22-02). The loop constraint provisionally specifies the indexes (i.e., "i" and "j"), the provisional ranges for those loops, and a logical assertion (i.e., "Partestx (Spart)") that will eventually resolve to a concrete partitioning condition (different for each partition) that will be used to specialize code for each of the various natural partitions (Ref. 22-03). Associated with the loop constraint (Ref. 22-02) are a set of "partitions" that partially and provisionally specify a natural partitioning for the nominal loop. It is referred to as "natural" because it is specific to the particular computation being specified and will vary from computation to computation. For example, other kinds of computations such as image averaging, fast Fourier transforms, unsharp mask computations, etc. will each have a different set of natural partitions. For example, image averaging computation will have nine natural partitions. This set of partitions (Ref. 22-03) represents a first provisional design of the logical architecture of the computation. The architecture is logical because it will likely change, its final physical manifestation will likely be quite different because other design features will likely be added to realize a final physical manifestation. For example, the logical architecture of FIG. 22 specifies nothing about parallel computation, nothing about the physical forms of the loop partitions or their context, nothing about the physical architecture of the context of the computation (e.g., the physical architecture of expressions [36], [37] and [38]), and a plethora of other design features that have not yet been pinned down. Potentially, a number of new architectural design features will be added before a physical architecture is completely specified.

Figure 23:
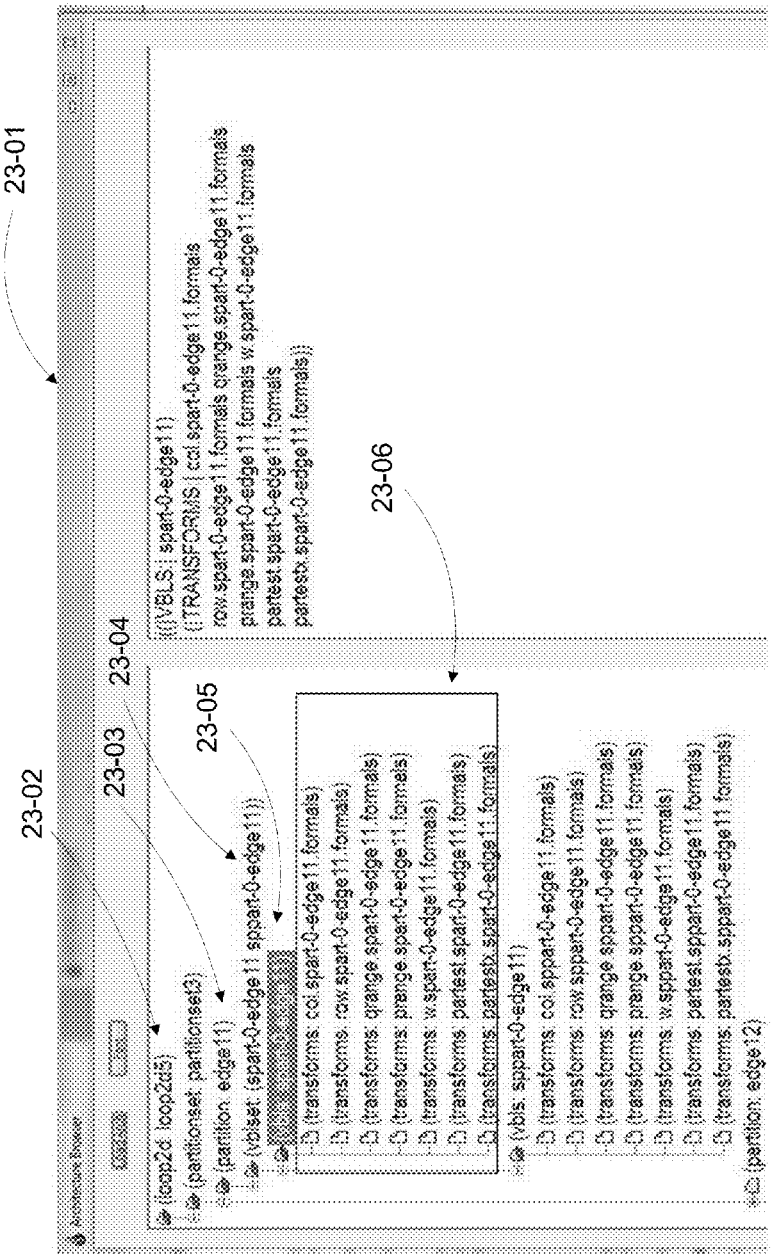
FIG. 23: Screen shot of browsing an edge partition of a logical architecture in a human friendly (i.e., Architecture Browser) form in the preferred embodiment
Figure 24:
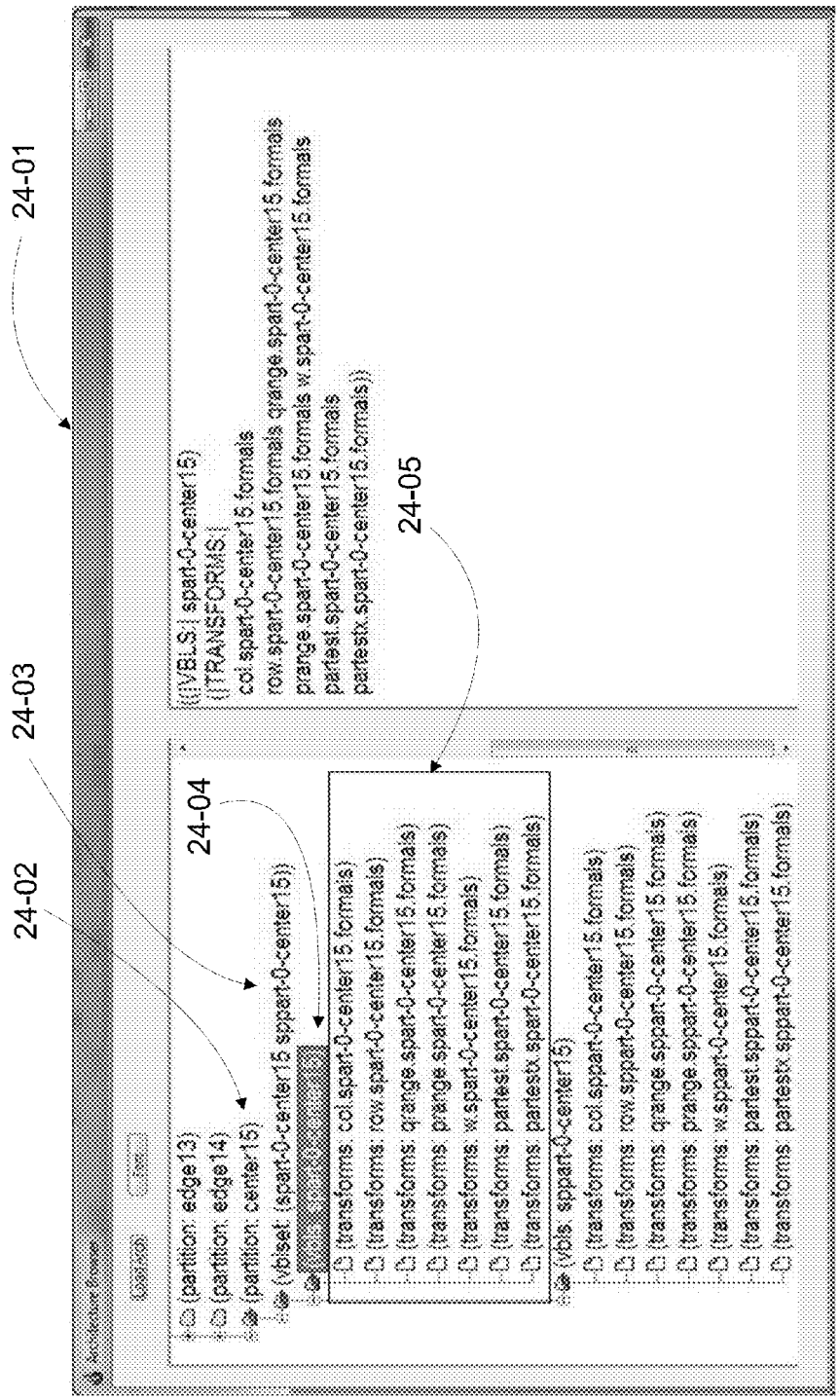
FIG. 24: Browsing a center partition of a logical architecture in the preferred embodiment

To ground FIG. 22 a bit more in concrete reality, FIGS. 23 and 24 exhibit an example of a logical architecture as displayed by the Architecture Browser tool of the preferred embodiment, where s and sp from the conceptual view correspond to span and sppart, respectively, in the actual case shown in these figures. The left window displays the m overall logical architecture in outline form and the right window displays the details of the item selected in the left window. In this case, the selected item (Ref. 23-05) is a domain specific variable "spart-0-edge11", which is an object representing the spart neighborhood (specialized to the edge11 partition). A neighborhood is defined as the set of pixels bounding some "current" pixel being processed by the INS expression (i.e., the pixel a[i,j] for this example). Associated with the spart-0-edge11 neighborhood is a set of transformations (Ref. 23-06) specialized to edge11 and to the spart-0-edge11 neighborhood. These transformations define the version of the code that will be generated for the edge11 context. They will generate code that will compute among other things 1) the neighborhood loop ranges, 2) the neighborhood indexes relocated to image matrix coordinates, 3) a convolution weight function (w) used in the definition of the convolution operator (i.e., CI, see Ref. 22a-02 in FIGS. 22a), and 4) the partitioning condition (i.e., Partestx) specific to edge11 (e.g., which will eventually resolve to "(i==0)" for this example). For the convenience of the domain engineer, who might be debugging some extension to the preferred embodiment, all of the items shown in the Architecture Browser may be selected and opened to inspect the contents of the underlying objects.

Figure 23A:
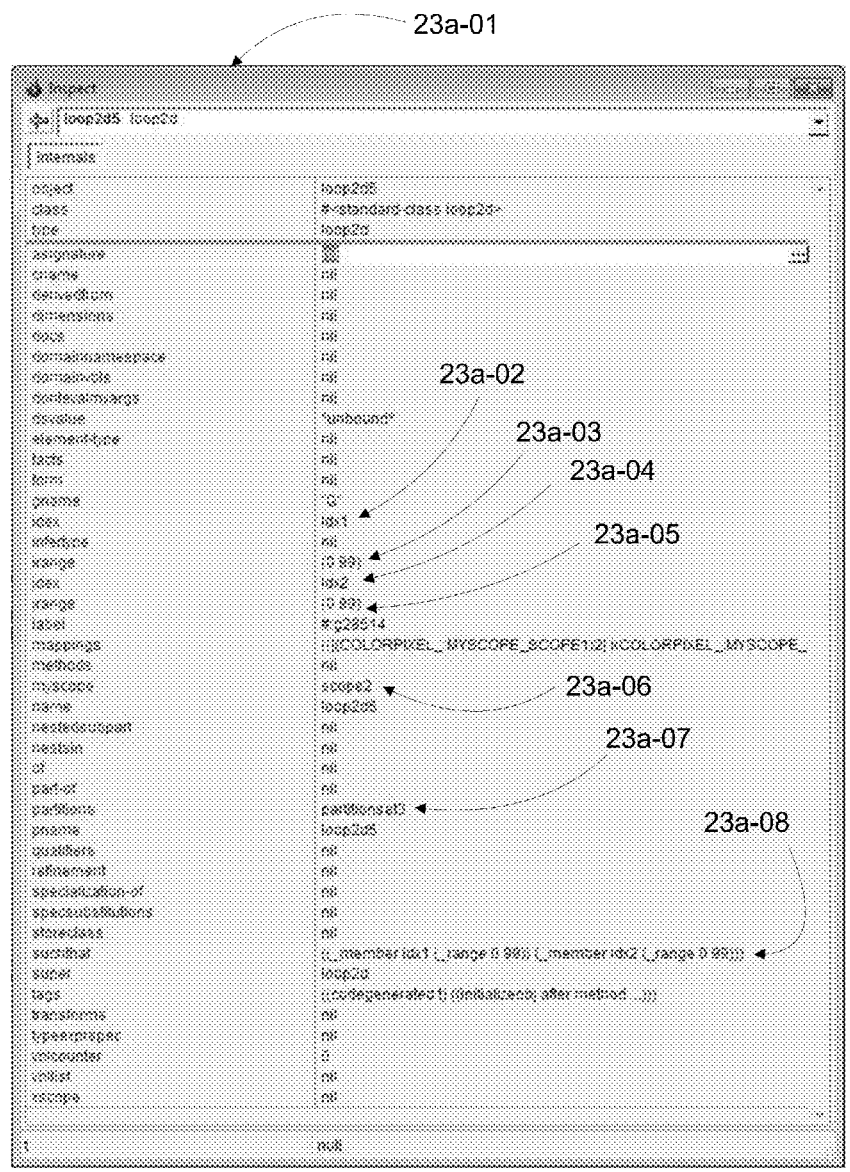
FIG. 23a: Screen shot of internal form of the loop5D2 constraint in the preferred embodiment
Figure 23B:
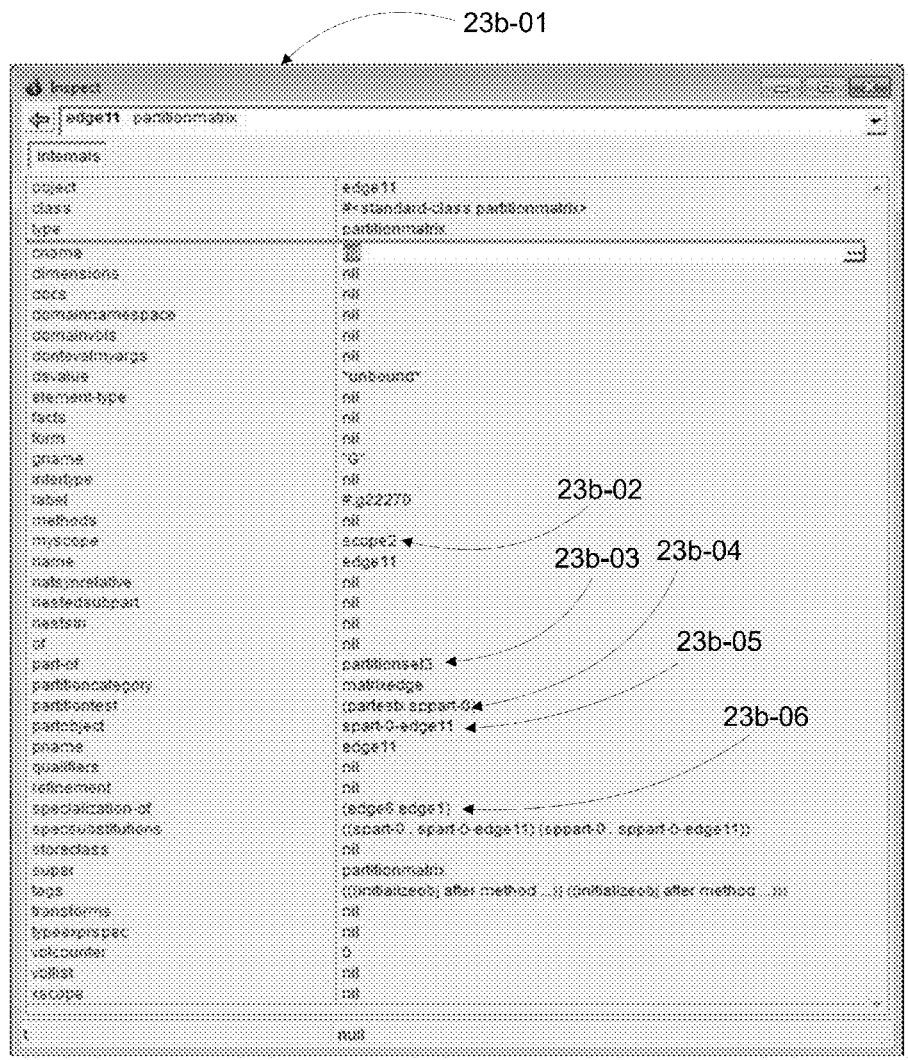
FIG. 23b: Screen shot of internal form of the edge11 partition of a logical architecture in the preferred embodiment
Figure 23C:
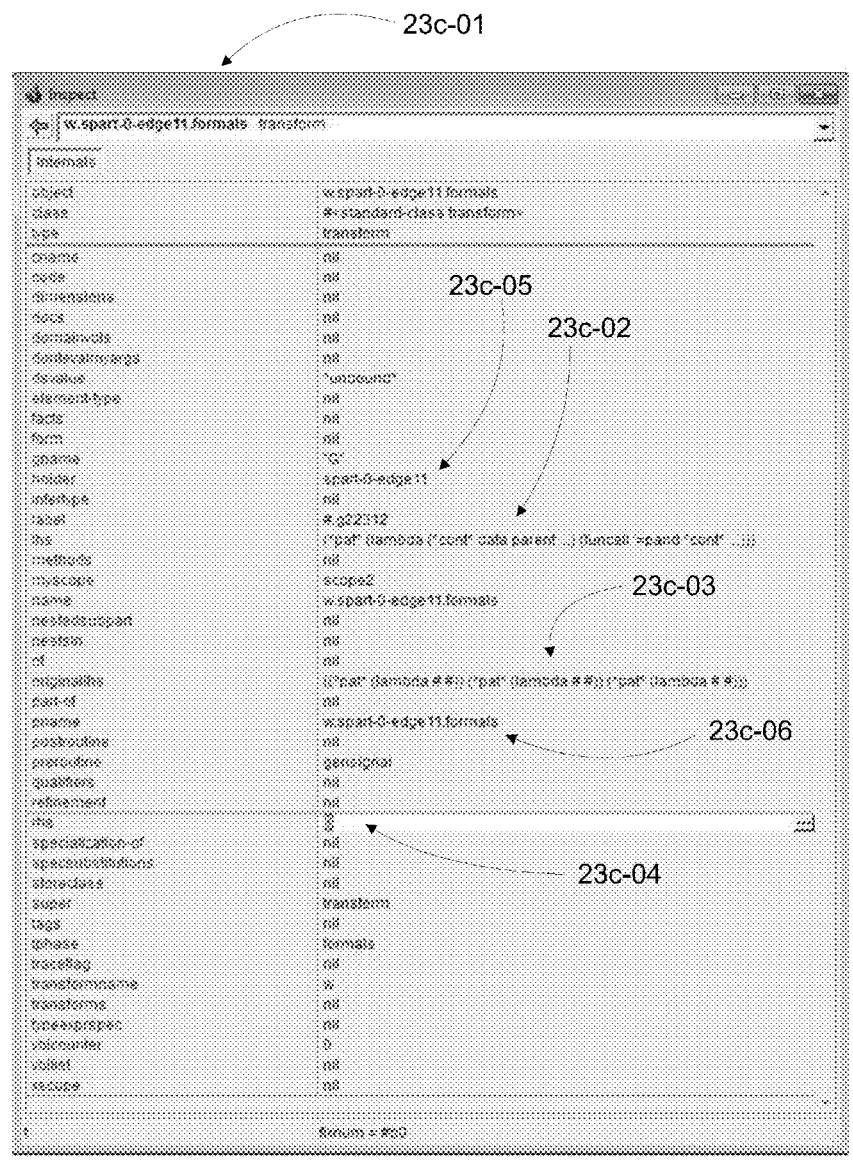
FIG. 23c: Screen shot of internal form of transformation definition of w of spart specialized to edge11 in the preferred embodiment
Figure 23D:
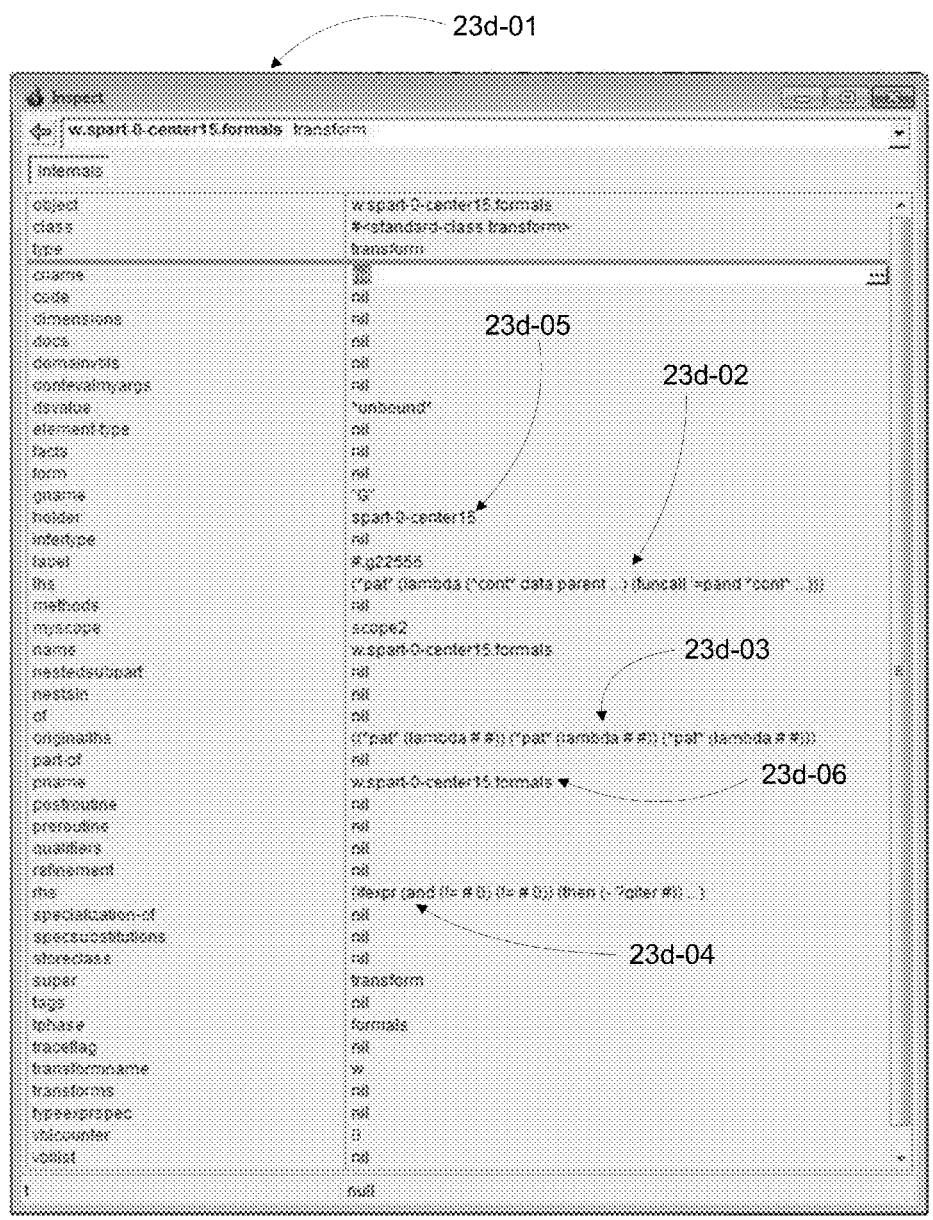
FIG. 23d: Screen shot of internal form of transformation definition of w of spart specialized to center15 in the preferred embodiment
Figure 23E:
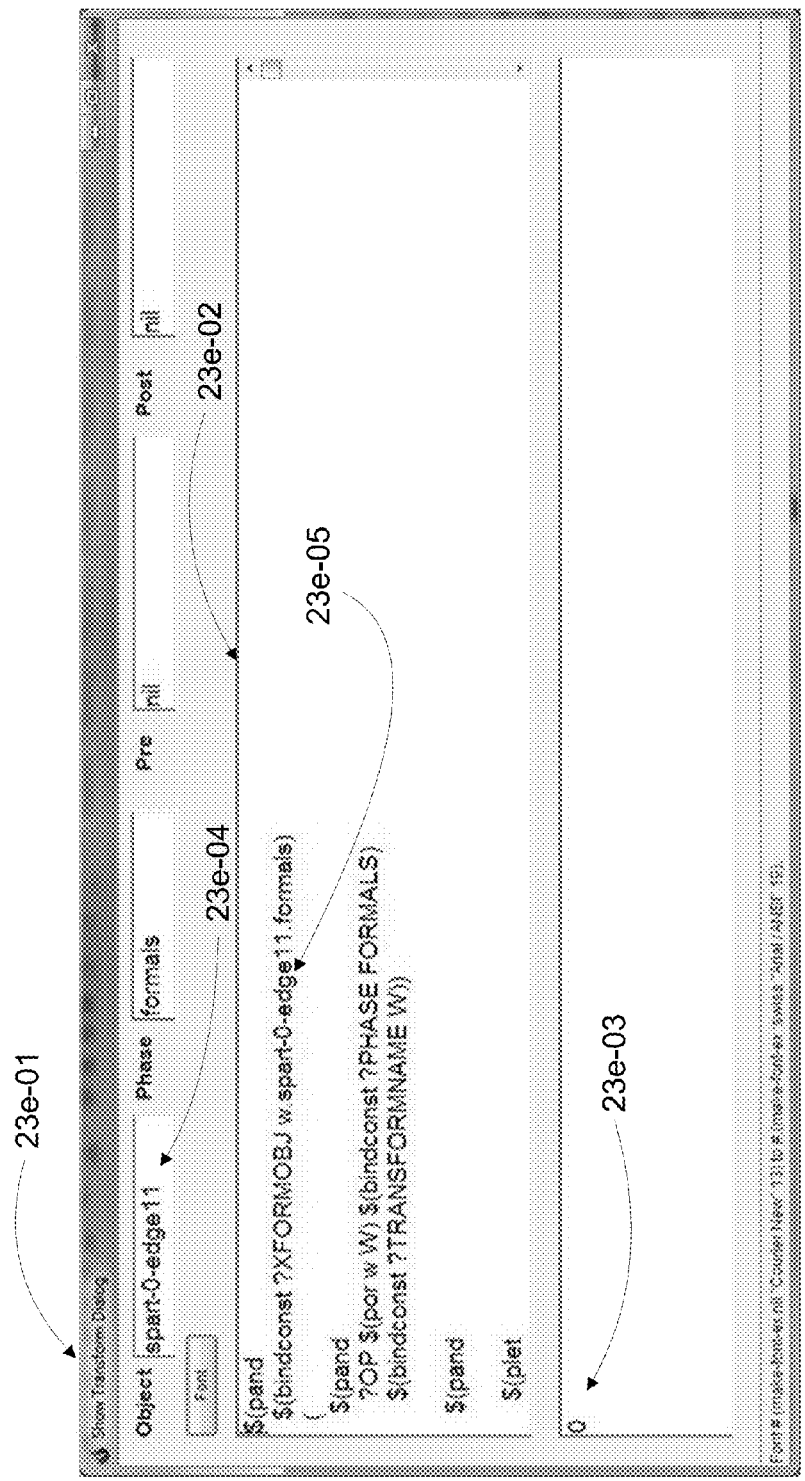
FIG. 23e: Screen shot of human friendly inspector of transformation definition of w of spart specialized to edge11 in the preferred embodiment
Figure 23F:
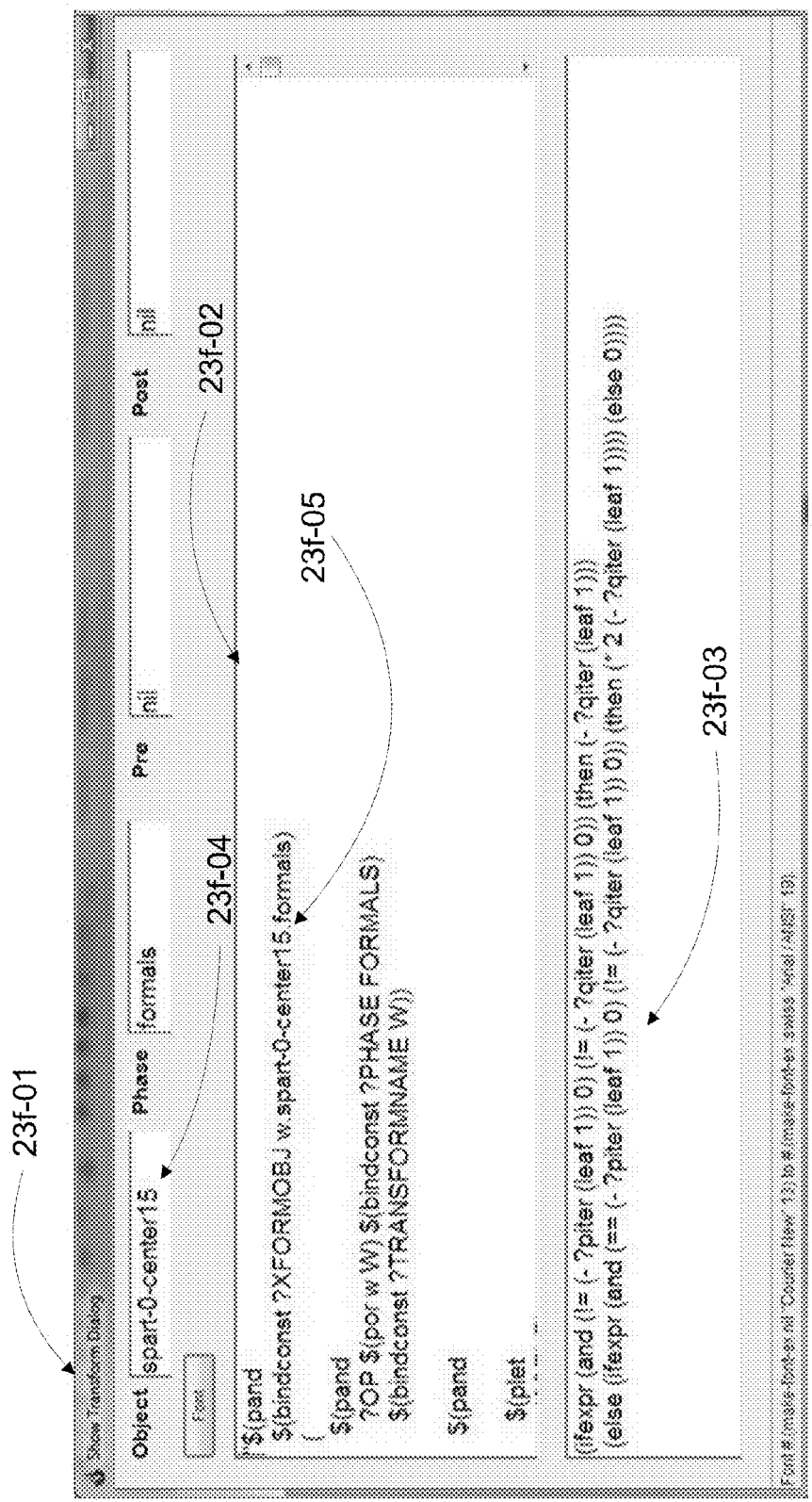
FIG. 23f: Screen shot of human friendly inspector of transformation definition of w of spart specialized to center15 in the preferred embodiment

FIG. 24 shows the same logical architecture but in this case focused on the center15 partition (Ref. 24-02) and more specifically, on the spart-0-center15 neighborhood (Ref. 24-04) associated with that partition. Except for the name of the partition object, this display looks virtually the same as FIG. 23. That is deceiving though. If one examined the underlying objects the differences induced by specialization would become obvious. For example, the definitions of the transformations "w.spart-0-center15.formals" (defining a convolution weight function) and "Partestx. spart-0-center15.formals" (defining the partitioning condition for the center15 partition) would differ significantly from their counterparts associated with edge11. The screen shots in FIGS. 23a through 23f illustrate some of these detail differences as well as different inspection forms available in the preferred embodiment. FIG. 23a shows a CommonLisp inspector tool examining the details of the loop2D5 constraint object. For example, Refs. 23a-02 through 23a-05 are the slots containing the provisional target program index variable names and ranges for the loop. These slots will often be the referents of ARPS expressions within design frameworks that may use part or all of the loops to manufacture target program code analogous to the application within expressions [36], [37] and [38]. Similarly, the screen shot of FIG. 23b illustrates the internal forms in the preferred embodiment of a partition object, in this case "edge11." Much of this information is bookkeeping information that defines structural relationships (e.g., Ref. 23b-03 defines the partition set to which this partition belongs); provides a record of edge11's progenitors, in this case edge6 and edge1 as shown in the Ref. 23b-06 slot; defines the progenitor of the partitioning test (Ref. 23b-04); and so forth. Similarly, the details of the various transformations are available for examination by the domain engineer in FIGS. 23c through 23f. FIGS. 23c and 23e show screen shots in the preferred embodiment of the w transform of the spart-0-edge11 neighborhood in two forms, a CommonLisp inspector of the internal record (FIG. 23c) and a human friendly viewer (FIG. 23e). Similarly, FIGS. 23d and 23f show screen shots in the preferred embodiment of the w transform of the spart-0-center15 neighborhood in two forms, an inspector of the internal record (FIG. 23d) and a human friendly viewer (FIG. 23f). The partition based differential specialization of these transformations is seen by the differences in the right hand sides of Ref. 23e-03 and Ref. 23f-03, respectively representing the definition of w for a neighborhood in the edge11 partition and the definition of w for a neighborhood in the center15 partition. Because the rhs of Ref. 23e-03 is zero, expression [36] degenerates to a simple assignment of a pixel value to zero and one of the C loops evaporates leaving only one loop to traverse each edge. However, because Ref. 23f-03 (specialized to the center15 partition) is a set of conditional expressions, the forms in expression [37] do not degenerate. In fact, the pattern of the conditional expressions in Ref. 23/-03 manifests itself as "x?a:c" forms in expression [37].

The whole point of formulating the logical architecture (LA) distinct from the programming expressions that it will eventually be applied to is to defer the application of the LA to the code and thereby allow the LA to be manipulated and evolved to incorporate more design features without having to deal with the complexities introduced by programming language structures. For example, if one requests the preferred embodiment to implement the computation using thread base parallelism on a multicore architecture, it will need to adapt the LA to take full advantage of the possible parallelism. The domain knowledge will be used to adapt the LA. For example, an "edge" partition is a domain object, one domain oriented property of which is that an edge partition is generally a lightweight computation. So, running an edge partition in its own thread is probably a losing proposition. The thread set up overhead is likely to reduce performance more than (or at least as much as) gathering a set of edge partitions into a batch and running them sequentially as a single thread. Similarly, the domain properties of "center" partitions include the knowledge that they are heavyweight computations and therefore, candidates for being sliced up and run in parallel threads, if the computation allows it. And in the example, it does. Moreover, these design decisions can be made fully automatically based only on known domain information (i.e., the properties of the two classes of partitions). Thus, the preferred embodiment is able to automatically adapt of the LA to take advantage of the parallelism opportunities of multicore machines without have to analyze and manipulate the programming language forms that would be derived from that LA.

Figure 25:
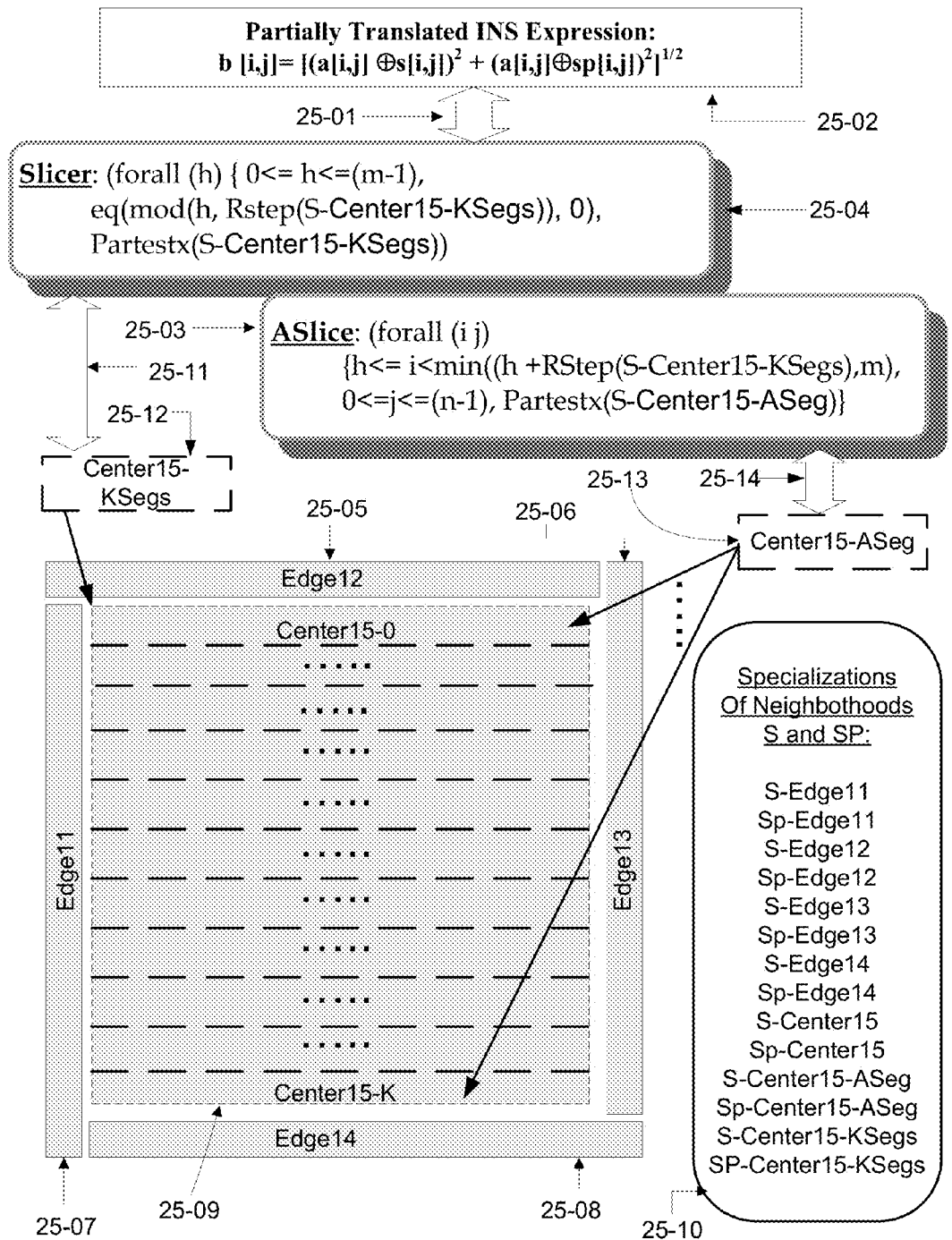
FIG. 25: Conceptual view of logical architecture revised for parallel computation using a slicer-slicee design
Figure 27:
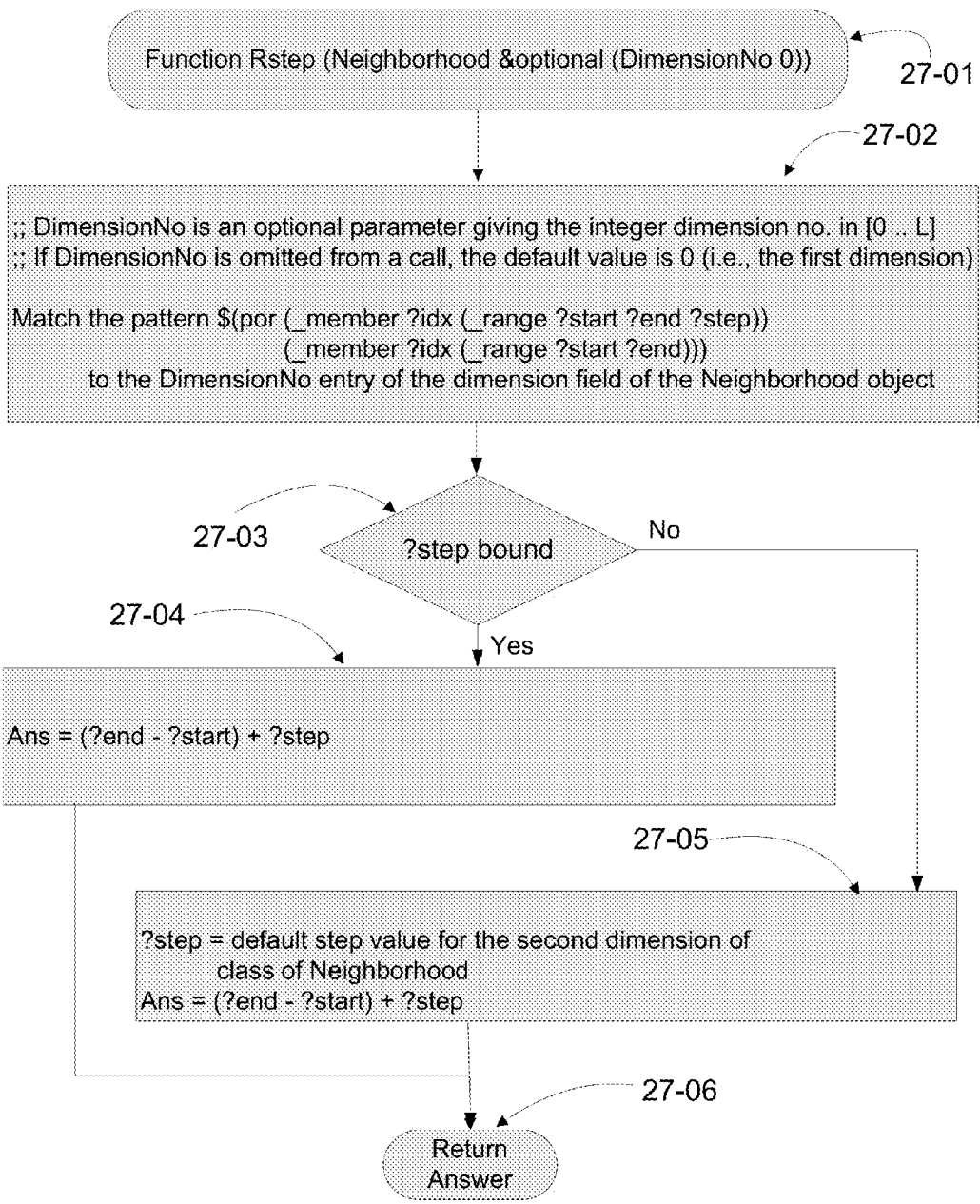
FIG. 27: ARPS function to get loop step value of a neighborhood domain object

The adapted LA is conceptually (but only partially) represented in FIG. 25. This is called a slicer-slicee design because the center partition is sliced into pieces that can be computed in parallel. The loop constraint that is associated with the edge partitions is omitted to save diagram space but it is exactly the same as in FIG. 22 except for the fact that it is no longer associated with the center partition. In FIG. 25, two new loop constraints have been manufactured from the loop constraint of FIG. 22. Taken together, they will iterate over the same set that the original loop did for the center partition except that the profile of that iteration will be segmented into groups of rows (i.e., each group is a slice of the center partition). The Ref. 25-04 loop constraint (Slicer) slices up the center partition into segments, each containing "Rstep(S-Center15-Ksegs)" rows, where Rstep is a function that will retrieve the number of rows per slice (FIG. 27). S-Center15-Ksegs is a newly manufactured neighborhood that is a specialization of the S-Center15 neighborhoods. S-Center15-Ksegs' associated transformations (which define the forms of the code to be generated for that neighborhood) will be specializations of the transforms of the S-Center15 neighborhood plus a few extra transformations that are specific to this newly specialized neighborhood. The set of all of these slices is represented by a newly manufactured synthetic partition Center15-KSegs, which is a specialization of the Center15 natural partition. Synthetic partitions are holders of the parameters of newly introduced design features (e.g., a sliced up center partition).

The second loop constraint ASlice (Ref. 25-03) will iterate through each of the slices produced by 25-04. A new synthetic partition (i.e., Center15-ASeg) Ref. 25-13, which is a specialization of Center15, represents each slice. It is associated with a specialization of the Center15 neighborhoods.

What is the point of this rather extended description of the domain details of the LA? The key point to recognize is that virtually all subparts of the LA that will be needed as pieces of the final generated code are accessed quite directly because they are represented as separable domain entities and not programming language entities. They imply features of the final code but are not the final code itself. And because of this, access to these elements is almost always a simple and direct navigation process. Loop constraints can be found based on their domain specific properties. Typical queries include find the loop that is associated with an input image, or the loop that is associated with fields (e.g., Red-Green-Blue fields) within a pixel, or the loop over a neighborhood, etc. The domain properties of the loop constraints uniquely identify the loop constraint sought. These queries can be extended with specification of a particular partition (e.g., edge11) or a particular kind of partition (e.g., computationally heavyweight). And one can further extend these queries with further queries to get slot values of these entities (e.g., loop index names or ranges or perhaps transformations that will resolve to code elements for specific contexts). Thus, by choosing to represent the LA in terms of domain specific elements that have not yet been turned into a programming language representation, the referencing and finding of elements that are not yet constructed and therefore, not yet named (in the programming language sense) is eminently feasible. Thus, the domain engineer can build independent components at different places and times (e.g., a design framework that defines only the skeletal, parallel architecture into which the specified computation will be put). And these components can refer to the elements within another component (e.g., the target computation specification) such that when they are combined they will interconnect in the intended way. Thus, this representation facilitates the ARPS protocol and the ARPS protocol facilitates component synchronization.

ARPS is a key element of such a domain representation because it is designed to use domain specific signposts as trail markers along the conceptual trail connecting conceptually corresponding elements of independent contexts. In a domain specific representation, these trail markers are elemental objects (e.g., a nominal loop or a partitioning object) with slots (i.e., fields) that contain the specification data that defines the details of the domain specific object. Thus, a framework context may have just enough knowledge about a potential payload context to specify a search for some corresponding object in the payload. For example, the framework may need to connect to an input matrix within a payload as well as the details of a loop over that matrix in order to fill out some the (currently) abstract portions of its definition. Thus, a search for a matrix with a property like "input" in a domain specific representation is just a straightforward search of an AST (Abstract Syntax Tree internal program representation) for nodes that are matrices with a property of "input". A search for nominal loop details is a network search for a loop object specific to matrices and associated an AST subtree containing the aforementioned matrix. The variables that are used to index that loop are directly available from the loop object. No syntax or AST structure analysis is needed to extract loop information as would be required in a programming language based representation. Nor is data flow analysis is needed to infer the dependency between the loop and the matrix. Nor is exhaustive analysis of portions of loops to determine their nominal ranges and the variables that are used to index them. Nor is subtle inference to determine restrictions such as the single user parameter restriction on user written thread routines.

Figure 26:
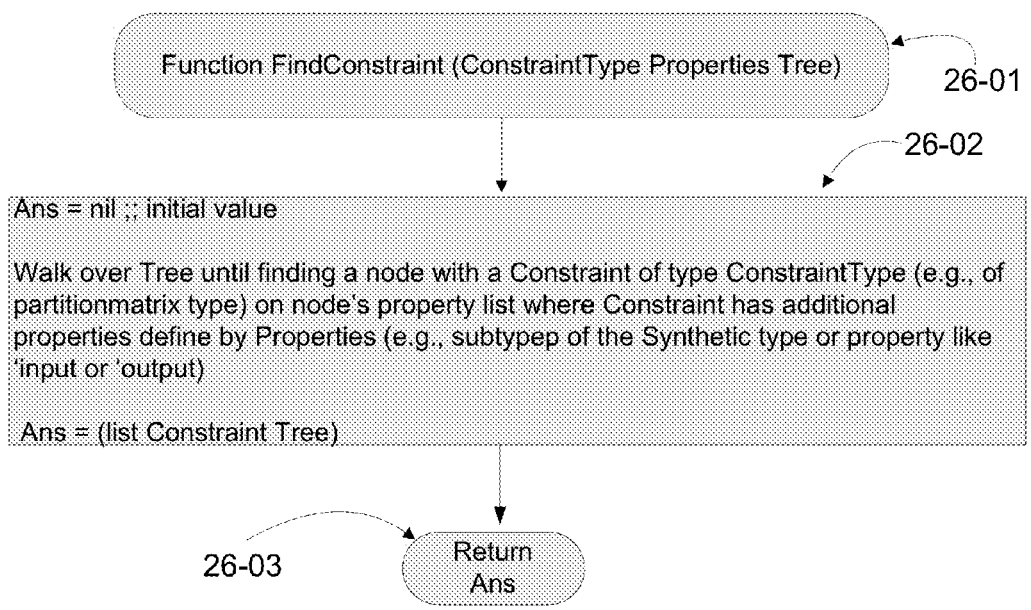
FIG. 26: ASPS FindConstraint operator
Figure 28:
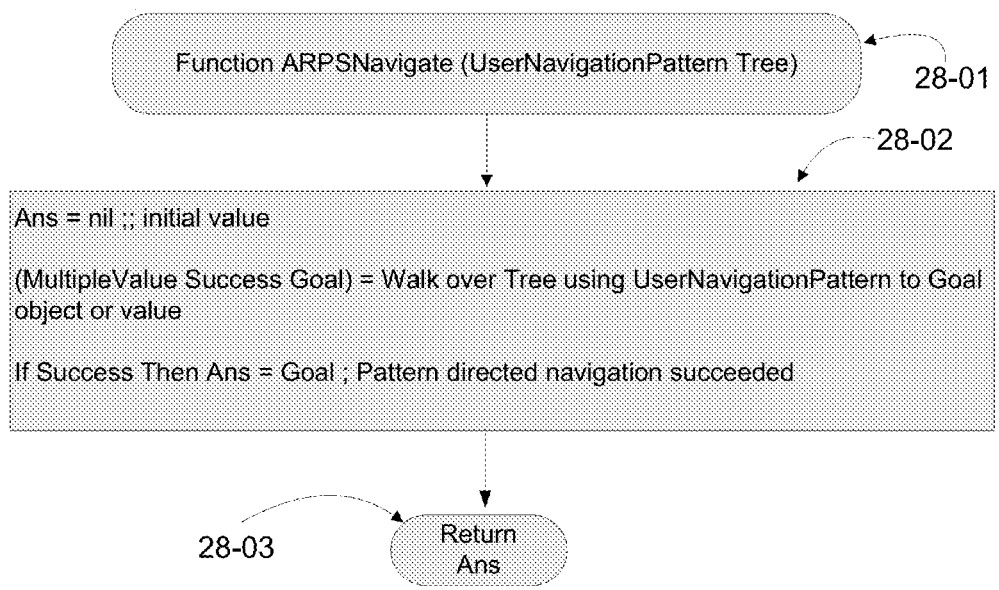
FIG. 28: ARPSNavigate general utility to navigate logical architecture per user defined pattern

The general forms of ARPS elements are quite simple, e.g., search a data structure for a type, get the value from a slot of an object or navigate the problem domain data structures to an object of interest. Atomic ARPS operations on candidate objects are operations like match a structure for an element, decompose a structure into elements, fetch a value from an object slot, check the property list of an item for a property etc. A specific ARPS expression is some composition of these kind of elements. Illustrative examples of ARPS elements are given in FIGS. 26-28. The ARPSNavigate function is just a general wrapper for a user written pattern of search and navigation, thereby precluding the necessity of writing a plethora of similar navigation functions having only tiny differences.

Is this Redesign Machinery Really Needed?

One could try to make the argument that we can formulate design frameworks that require little or no information about the target payload that will be inserted into the holes within them and therefore, this machinery is not really needed. But in general, this is Panglossian optimism. It is true that if one is very careful in the choice of problems and the construction of the design framework one can come close to achieving this level of independence. For example, if each thread computation is completely independent of the others (which is sometimes called "embarrassingly parallel"), the framework needs to know very little about the nature of the computation going on in its threads. The synchronization depends only on computation completion. In this case, one could build the framework data structure package (i.e., expression [15]) to be passed to the user's thread routine using just the information from the payload. The few simple interrelationships that there are (e.g., the index that iterates through the slice partitions in the matrix center of the foregoing example) can be handled with little more than ARPS expressions to place the payload variables at the correct places within the design framework. However, many, if not most, real world cases have framework and payload interrelationships that preclude this level of simplicity. They require the full machinery of this invention.

Consider some of the example designs in the Mattson, et al book (Op. Cit.). If the parallel programming pattern of the design framework is a "divide and conquer" pattern, termination of the problem division on a branch will depend upon a computation to test some terminating condition that is specific to the nature of the payload computation (e.g., termination conditions such as—Is the difference between current answer and the previous answer is less than some problem specific error limit? Or is some data structure within the design framework exhausted?). Additionally, some design features of such a test can arise from the design framework itself if there are framework data structures specific to the divide and conquer framework where the data within those data structures comes from the payload computation. Similarly, the split function that divides the current case into sub-cases that can be run in parallel will likely depend upon both the divide and conquer framework and the payload computation.

A good example of such complex interrelationships is provided by Delaunay triangulation. (See "Computational Geometry: Algorithms and Applications, M. de Berg, M. van Kreveld, M. Overmars, O. Schwarzkopf, Springer, 1997, pp. 181-207. See also, http://en.wikipedia.org/wiki/Delaunay_triangulation.) Triangulation, in general, is a computational method of representing a geometric surface defined by a point set as a set of triangles. The triangulation representation can then be used to generate a graphical display of the surface on a computer display. Delaunay triangulation, in particular, produces a triangulation where the triangles have certain desirable properties that can avoid visual misimpressions when the surface is viewed by the human eye. For large point sets, Delaunay triangulation can be computationally intensive and require long computational times.

The atomic operations of Delaunay triangulation involve converting a set of touching triangles in one locale into a different set by moving one connecting line at a time. The details of these operations are not relevant to this discussion but suffice it to say, they introduce complex interrelationships between any fairly generic parallel computation framework that might be used to host Delaunay triangulation and the details of the Delaunay operations. There are a number of methods for performing Delaunay triangulation in parallel to shorten the time to complete the computation. One of those methods is a divide and conquer algorithm. The problem from the standpoint of hosting a payload within a pre-defined framework is that the synchronization operations are complex and will require knowledge of the computation. There are triangles with one or two of their points on a boundary between point set regions (i.e., subdivisions of the computation) that might be candidates for parallel computation. Each Delaunay operation must assure that no other parallel operation can operate on a point that it intends to disconnect or to connect. For example, if all points of the triangles to be modified are not on the boundary of a group of triangles that are being handled by a single thread, then the atomic operation on those triangles can proceed. If not, some alternate computational path must be taken. Such synchronizations must have data representations that can easily identify triangles that are currently in the process of being changed and the processes that are involved in changing them. A process must wait until the points it plans to change are free. The general pattern of synchronization is defined within the framework (which has no notion that the payload is working with point sets or performing Delaunay triangulation) but the computational details of the synchronization tests will depend on knowledge of the payload computation (i.e., Delaunay triangulation). Such decomposition, which depends on interrelationships that are "to be named later," is the kind of decomposition that the machinery of this invention was developed for.

Prior Art

There is a rich set of prior art that has some weak similarities to but falls short of the novelty, structure, capability and utility of the machinery of this invention. This section is a short discussion of the prior art and it attempts provide an overview of the broad prior art context, to show where the invention fits in that context, and to show connections to, similarities with, and differences from elements of that context. Since the invention makes significant use of data types, we will use data types as the focus of the description. We will define the key features and properties that distinguish this or that kind of data type but we will largely focus on the uses to which the data types and their systems are put.

In summary, this invention is distinct from the prior art a number of ways but perhaps most notably by:

1. The nature and novelty of the type structures that it builds (i.e., chains of functionally related types that incorporate details specific to the instance of the target program currently being generated and how those chains operate are novel),
2. The novel uses to which they are put (i.e., the invention's process of redesigning generic code to add or subtract design features is novel) and
3. The novelty of the problem that it is addressing (i.e., synchronizing two disparate sets of domain specific constraints, design components and pre-code components from different contexts each with slightly different sets of design features is novel).

There are several references that provide a summary of the current state of the prior art with respect to type systems and their uses. These may help the reader become conversant with the key terminology, ideas and structures.

1. Wikipedia has a short overview of types from a theoretical perspective at http://en.wikipedia.org/wild/Type_theory.
2. Wikipedia has a short overview of types from a programming point of view at http://en.wikipedia.org/wiki/Type_system#Strong_and_weak_typing:_Liskov_Definition.
3. An extended and deeper point of view can be found in Luca Cardelli and Peter Wegner, "On understanding types, data abstraction, and polymorphism," ACM Computing Surveys, Vol. 17, No. 4, December 1985.

Data types in the prior art have several broad kinds of purpose and use that have some limited relationships to this invention:

Type checking and inference in the context of strongly typed programming languages,
Program language design for enhancing reusability of code (e.g., through abstract data types, object oriented programming and polymorphism),
Composite type creation schemes that make programming easier or more succinct (e.g., the composite type scheme of the C language),
Program language design to enhance the ability to write correct programs (e.g., via functional and applicative languages where types play a role in specification and compilation),
Writing correct programs using formal specifications (e.g., stepwise refinement), and
Formal specification of the "meaning" (i.e., semantics) of computer programming elements (e.g., denotational semantics and models like the Z language or the VDM method).

Only the first three items in this list have any (although limited and somewhat trivial) relationship to this invention.

Type Checking and Inference:

Type checking and type inference rules are only tangentially related to this invention and related specifically because they are used as a tool in the operation of the preferred embodiment. For example, Ref. 10-05 generates type inference rules for use by the preferred embodiment in the overall course of program generation. Thus, generation of type checking and inference rules are just a service for the preferred embodiment but are not directly required by core machinery of the invention, that is, the machinery for redesigning disparate components.

Enhancing reusability, on the other hand, is highly relevant both to the preferred embodiment and to this invention in particular because this is a primary result produced by the machinery of this invention.

Enhancing Reusability:

In general within the preferred embodiment, domain operators enhance program reusability because they imply a near infinite variety of manifestations of target program elements (e.g., forms of loops) with each manifestation tailored to a different kind of receptacle with different requirements and restrictions. While this is useful to the implementation of the preferred embodiment it is not a central mechanism of this invention but rather a property of the central mechanisms of this invention. Similarly, abstract data types, object oriented programming and polymorphism are used heavily in the implementation of the preferred embodiment but they are largely low level but useful tools that are not a core element of this invention any more than the programming language that it is written in.

Type differencing uses the functional relationship between types to determine how to redesign program components to introduce design features so that they will be consistent with some target context (i.e., a hole or receptacle) within some design framework. Type differencing as used to generate redesign transformation in this invention is a novel part of the mechanism.

Composite Types:

There are a variety of methods of building composite types (i.e., defining new types as compositions of more primitive types) in various programming languages. One of the most interesting early methods was introduced in the definition of the C programming language. (See Kernighan, Brian W. and Ritchie, Dennis M.: C Programming Language (2nd Edition), Prentice Hall, 1988) It was interesting because it was so new and somewhat alien to the programmers of that time. Recall expression [2](restated here)

$$\text{int B [m] [n]};\qquad[2]$$

This expression declared B as an m by n matrix of int's. This is really two declarations in one, an implied type declaration and a declaration of an instance of that type. The implicit type might be notionally represented as "int ?X [m] [n]" where I have parameterized the name of the instance as "?X" to notionally factor out the instance name. Then B, when occurring in the ?X position, becomes a specific instance of that type. (Note: This is not operational C code but rather a notional attempt to separate the two aspects of this definition.) Why this is relevant is that C allowed composite types to be built up via compositions of constructors, which is weakly similar to the functional constructors of FIGS. 1a-c. Thus, by allowing constructors like "&" (i.e., pointer to), "*" (i.e., pointer dereference), "f( )" (i.e., a function), and others, the declaration system allows expressions that mimic the structural relationships among the types. For example, it is easy to directly write a C language type expression defining "a function that returns an array of pointers to a struct containing fields of pointer to an SSN field (i.e., presumably, a social security number) and a Person field containing a string type (e.g., presumably, the name of the person with the particular SSN)". This C declaration is shown in expression [39].

$$\text{struct pair \{int*ssn; char person[30];\}*(*findaray( )) [ ];}\qquad[39]$$

Such a specification would be a Context Free expression (i.e., built using a Context Free Grammar, in the Computer Science meaning of the term) comprising a legal composition of the grammatical forms for the primitive type expressions. In other words, the declaration expression could be parsed into subtrees each of which corresponds to a more primitive type sub-expression, and where each type sub-expression would correspond to a grammatical rule in the context free grammar. So in this context, each such grammar rule is the analog of one of the functional type constructors from FIGS. 1a-c.

Of course there are important differences that make the C declaration strategy inadequate for use by this invention. Notably, the interspersing of type definitions and instance definitions would make such a strategy unmanageably complex at best and infeasible at worst. The machinery of this invention requires a clear separation and distinction between the declarations of types and instances, notwithstanding the fact that instances may be used as modifiers in the highly specialized and computation specific type definitions used by this invention. Composite types must be first class objects that can be used and operated upon just like any other piece of data. Without a clear separation of declarations of types and declarations of instances of those types, the first class property becomes muddied.

Further, the type constructors must be uniform and recursively related from the highest level composite type down to the lowest level primitive type so that mechanical composition and decomposition of composite types can be implemented by simple recursive algorithms, and even more importantly, so that there is a direct relationship between type pairs and the difference functions that can redesign instances of those type from one related type to another. Recursively applicable constructor functions serve this purpose. Introducing programming language like syntax would produce "a" hierarchical composite structure but not the one required by this invention. At best, it would vastly complicate the automation of the composition/decomposition process. Note that the recursively applicable type constructor functions of this invention (FIGS. 1a-c) are deconstructed in a very regular pre-order manner that mimics the top-down, left to right structure of the type description tree. (Note: a pre-order scan of a tree means process the current node first and then recursively process lower subtrees left to right.) And that order of construction/deconstruction maps one to one onto the type difference functions. This relationship is critical to making the invention work. On the other hand, the structure of [39] starts with the "findaray" function, which produces a pointer, which is dereferenced to the array type "[ ]", which is dereferenced to the "struct", which contains the two fields, where the "ssn" field is dereferenced to get to the int that is the ssn value, while the "person[30]" array field is contained within the "struct." A C-like parsing solution to this would find the types (mostly) from the leaves up, which is a "post-order" processing of [39]. (Note: a post-order scan of a tree is bottom up, meaning process the leaf nodes first and then process the subtree nodes containing those leaves.) In other words, the structure of the specification of [39] does not mimic the occurrence order of the underlying type structures. And the critical mapping between type pairs and difference functions is lost with a syntax oriented parsing solution to declaration. Thus, the inconsistency is that the invention relies on pre-order style of type specifications (and the correspondence of that structure to the type difference transforms) whereas the C language based specifications (often) rely on post-order type specifications. In fact, parsing C declarations like [39] can be a mixture of recognizing expressions in a mix of top down (like pre-order) and bottom up (like post order) processing. To make the C composite type forms work for this invention, one would have to revise the C composite type specifications to change it into the style of type specifications of this invention. That is to say, the style of type specifications of this invention are novel with respect to C style specification prior art. Of course, their novelty goes beyond their differences with C style specifications but those aspects are dealt with elsewhere in this document.

But the novel characteristic of this invention that absolutely precludes the use of a C-like syntax based composite type construction system is the requirement to allow arbitrary key fields that distinguish between type constructions that include one or more modifier fields from those that don't. Key fields in type definitions are critical for expressing domain specific design features that are being added to or deleted from the instances that are being redesigned by this invention. For example, critical to solving the problem as defined earlier is the ability to make the type constructions specific to particular scopes (i.e., allow scoped types) and to be able to distinguish them from types that are exactly the same composite type except that the scope of definition is different. The invention uses the "key" field machinery to accomplish this. Thus, while the C composite type system is weakly analogous, it is inadequate for the machinery of this invention on that basis.

Of course, one could extend the C system by extending the grammatical syntax to include key-like fields but this would just be taking this invention and re-casting it into a C composite type system equivalent to the solution defined by this invention. Therefore, the machinery of this invention is fundamentally different from the seemly similar machinery of the C system and is therefore novel with respect to that prior art.

Another distinction that applies to the C system of composites as well as a variety of other data type mechanisms and machinery is that in virtually all other instances of data type machinery, the underlying assumption is of a uniform overall context of application where the various type constructions within that context are compatible with each other in the sense that there are no type inconsistencies that must be resolved by redesigning program parts. That is, in the prior art, types are developed in synchrony. Needed additionally design features are added by the human programmer to account for the incremental design evolution of types that may be related. In the earlier example of designing the Sobel edge detection algorithm for threads, the programmer would perceive a set of non-localized but related changes that would be required to keep the design consistent as it is evolved to a thread design. Those changes would include introducing the parameter structure needed by the thread routine, initializing the structure fields with the appropriate data (e.g., the input and output matrices) and redesigning (by hand) the computational expressions that are to be inserted into the thread routines. Once these steps had been completed manually by the programmer, the overall design would be consistent.

In contrast for this invention, there are two distinct and inconsistent a priori contexts (i.e., the computational specification and the design framework for threads into which the computational specification is to be put). These are analogous to a binary nerve gas model where the nerve gas does not exist in its operational form until two inert precursor chemicals are brought together to form the final result. In the same way in this invention, the final fully synchronized (i.e., globally consistent) target program does not exist until the two components are brought together and using the agency of this invention, are made consistent through the automated addition of the necessary design features to the computational specification to bring it into synchrony with the design framework. In general, this is a two way interaction in that the design framework itself may be modified to accommodate the computation specification. For example, the parameter structure may be generated using knowledge of what data will be needed from the computational specification. This extra step of generation would make the design framework infinitely more useful in that virtually any computation that has a few required domain specific properties (e.g., the output parts are computationally independent of each other) could be combined to generate a target program using the "slicer/slicee" design framework that is used to turn the logical architecture of FIG. 25 into a thread based implementation. This multiplicatively increases the reusability of the design framework. Thus, there are two distinct and inconsistent contexts that can be automatically brought into consistency via this invention, which thereby illustrates another novel aspect of this invention.

SEQUENCE LISTING

Not Applicable

What is claimed is:

1. A method of using composite types constructed by type constructors to automatically transform programming language code or a precursor form thereof that will perform a desired computation within a first generator design context to a redesigned but computationally equivalent programming language code or a precursor form thereof that will perform said desired computation within a second generator design context,
  wherein a composite type of said composite types is comprised of a programming language type and a plurality of domain specific design features that constrain said programming language type,
  wherein said type constructors allow but do not require incorporation of domain specific design features into said composite types,
  wherein a generator design context is represented by a plurality of composite types with each of said composite types comprising a programming language type qualified by keyword pair type modifiers that imply desired domain specific design features within said programming language code or a precursor form thereof whose type is said composite type,
  wherein said first program generator design context and said second program generator design context are distinguished along dimensions that include but are not limited to dimensions of time, space, computer code structural locations, computer code variable scopes, computer code design forms, computer code design requirements, computer code versions, and programmers,
comprising:
  automatically creating said first generator design context containing composite types constructed using recursive application of type constructors,
  automatically creating said second program generator design context containing yet to be defined composite types that have implicit relationships to composite types of said first program generator design context,
  automatically inferring defined composite types for said yet to be defined composite types of said second program generator design context using as input composite types from said first program generator design context and a plurality of other information, and thereby making said implicit relationships explicit relationships,
  automatically computing, from composite types of said first generator design context, composite types of said second generator design context and said explicit relationships, a set of transformation steps expressed as class methods utilizing an executable object system that will transform said programming language code or a precursor form thereof that performs a desired computation from a first program generator design context to a second program generator design context, and
  automatically applying said set of transformation steps to transform said programming language code that performs a desired computation or a precursor form thereof from a first program generator design context to a second program generator design context.

2. A method of claim 1 using type constructors for defining of a composite type comprising a functional relationship between said composite type, comprising a programming language type qualified by keyword pair based type modifiers, and one or more previously defined types such that said functional relationship automatically derives, for each of said one or more previously defined types, a plurality of bi-directional difference functions between an instance of said composite type and an instance of said each of said one or more previously defined types,
  whereby a difference function from said composite type to one of said one or more previously defined types, if said difference function exists, will automatically convert an instance of said composite type into an instance of said one or more previously defined types, and a second said difference function from one of said one or more previously defined types to said composite type, if said difference function exists, will automatically perform an inverse conversion of an instance of said one or more previously defined types into an instance of said composite type,
  whereby when a first type from a first design context and a second type from a second design context specify equivalent computational results, then a code component of said first type executed in said first design context will produce an equivalent computational result as said second type from said second design context,
  whereby if a type difference function between said first type and said second type exists and a code component of said first type exists, then said difference function will automatically produce a code transformation, that if said transformation is applied to said code component of said first type, will produce a code component for said second design context that when executed will produce said same computational result,
  whereby said code transformation automatically introduces requirements from said second design context and altered requirements from said first design context into said code component of said second type without altering said computational result,
comprising:
  constructing, as a first step, composite types via recursive application of type constructors;
  automatically finding pairs of types created by said first step that imply said difference functions, and
  automatically creating said difference functions based on said functional relationship, if said difference functions can exist but have not yet been created.

3. A method of claim 2 for automatically redesigning an instance of a first type to a form that is an instance of a second type, where said second type is functionally related to said first type as defined in claim 2,
comprising:
  applying an automatically derived difference function of claim 2 that will convert an instance of said first type to an instance of said second type.

4. A method of claim 3 for automatically converting an instance of a first type in a chain of functionally related types to an instance of a last type in said chain of functionally related types,
comprising:
  automatically redesigning an instance of said first type into an instance of said last type by applying claim 3 method on said first type and then successively applying claim 3 method on results of each previous application until said last type has been reached.

5. A method of claim 1 for automatically constructing a functional relationship between types by using a type constructor that specifies a type/subtype relationship.

6. A method of claim 1 for automatically constructing a functional relationship between types by using a type constructor that specifies an arbitrary functional relationship construction.

7. A method of claim 1 for automatically constructing a composite type by automatically processing a type constructor expression to generate said composite type.

8. A method of claim 7 for constructing a recursive composite type from a recursive expression of type constructors, comprising:
  applying, as a first step, said method of claim 7 to each leaf level type constructor expression in said tree to create a result that replaces said each leaf level type constructor expression thereby producing a new intermediate form of said tree, and repeating said first step on said new intermediate form of said tree until all levels of said tree have been processed thereby producing a recursive composite type as a final result.

9. A method of claim 8 for expressing chains of functionally related types,
comprising:
applying said method of claim 8 to a plurality of recursively composed type constructors.

10. A method of claim 9 for expressing chains of functionally related types connecting conceptually corresponding but computationally disparate expressions of data entities within separate contexts,
comprising:
creating a first chain by applying said method of claim 9 within a first context;
creating a second chain by applying said method of claim 9 within a second context; and
connecting said first chain and said second chain with a non-type/non-subtype functional relation.

11. A method of claim 1 for specializing types through addition of properties that modify or limit an existing type, whereby a specialized type is a subtype of said existing type,
comprising:
adding property pairs comprising a key field and a value field, where said key field indicates a semantic indicator of a property, which is a property name, and said value field is an instance of said property name.

12. A method of claim 11 for embedding arbitrary information in a definition of a composite type, whereby said arbitrary information is available for use in redesigning instances of said composite type to and from some other type functionally related to said composite type.

13. A method of claim 12 for embedding a design feature specification in a definition of a composite type, whereby said design feature specification is available for use in redesigning instances of said composite type to and from some other type functionally related composite type,
comprising:
using said design feature specification to specialize an instance of a type without said design feature specification into an instance of a functionally related type with said design feature by redesigning said instance of a type without said design feature specification into an instance of a functionally related type with said design feature specification; and
using said design feature specification to generalize an instance of a type with said design feature specification into an instance of a functionally related type without said design feature specification by redesigning said instance of a type with said design feature specification into an instance of a functionally related type without said design feature specification.

14. A method of claim 12 for producing contexts that are separated in space, time, version, developer or a plurality of other discriminators, wherein said contexts may have been developed at different places, or at different times or in different versions or by different developers or differ by a plurality of other discriminators, or any combination of place, time, version developer, or plurality of other discriminators,
comprising:
using a scope object to create a different context, where said context is specific to a place, time, version, developer or a plurality of other discriminators, or any combination of place, time, version, developer or other discriminators, and
using an arbitrary designator object to create a different context, where said context is specific to a place, time, version, developer or a plurality of other discriminators, or any combination of place, time, version, developer or other discriminators.

15. A method of claim 11 for specializing a non-scoped type to produce a scoped type through addition of a scope property that designates a scope context wherein said type is defined,
comprising:
defining a scope to designate a named context in which types may be defined; and
producing a scoped type from said non-scoped type by adding a property pair comprising a scope indicator and a name of a scope, where said scoped type is a composite type, where said scoped type is a subtype of said non-scoped type, and where a scoped type is defined and usable only within said scope or any other scope defined to be within said scope.

16. A method of claim 11 for revising a scope of a first scoped type to produce a second scoped type through replacement of a scope property of said first scoped type with a different scope property to produce said second scoped type.

17. A method of claim 11 for generalizing a scoped type to produce a non-scoped type by removal of a scope property that designates a scope context wherein said scoped type is defined.

18. A method of claim 1 for generalizing types through deletion of properties that modify or limit an existing type, whereby a generalized type is a supertype of said existing type,
comprising:
deleting property pairs comprising a key field and a value field, where said key field indicates a semantic indicator of a property, which is a property name, and said value field is an instance of said property name.

19. A method of claim 1 for automatically generating type inference rules for functionally related types,
comprising:
identifying a composite type and a set of types from which said composite is composed,
computing a type difference between said composite type and each of said set of types from which said composite is composed and computing a reverse type difference, where said reverse type difference computes a type difference between each of said set of types from which said composite is composed and said composite type,
formulating, as a third step, a type pattern by rewriting each type difference and each reverse type difference by substituting a type for each instance within respectively said type difference or said reverse type difference,
producing a type inference rule with an inferred type that is said composite type and a pattern of types derived from said type difference by said third step, and
producing a type inference rule with an inferred type that is one of said set of types from which said composite is composed and a pattern of types derived by said third step from said reverse type difference for said one of said set of types from which said composite is composed.

20. A method of claim 1 for automatically computing elements needed to synchronize conceptually corresponding but not initially computationally equivalent data items from disparate components to allow automated integration of said disparate components, where said disparate components differ because a first data item in one of said disparate components that conceptually corresponds to a second data item in another of said disparate components has a plurality of design features that said second data item does not have, or said disparate components differ because said second data item in one of said disparate components that conceptually corresponds to said first data item in another of said disparate components has a plurality of design features that said first data item does not have, and where there may be a plurality of conceptually corresponding but not initially computationally equivalent data items within said disparate components,
comprising:
- defining a correspondence between said conceptually corresponding but not initially computationally equivalent data items by an anaphoric reference expression, including but not limited to Anaphoric Reference Protocol for Synchronization (ARPS), that defines a connecting pathway between said conceptually corresponding but not initially computationally equivalent data items, where said pathway traverses a logical architecture of domain specific, non-programming language entities;
- introducing a plurality of cross connecting types that introduce said plurality of design features that are in one but not another component and thereby establish a type chain that connects said conceptually corresponding but not initially computationally equivalent data items from disparate components; and
- using type difference functions to derive a plurality transformations that will redesign data type instances to and from data types of said conceptually corresponding but not initially computationally equivalent data items from disparate components.

21. A method of claim 20 for automatically synchronizing separate but related scopes containing disparate but conceptually related elements by creating redesigned elements from elements of a first related scope, where said redesigned elements, when inserted into a second related scope, are computationally equivalent to said elements of said first related scope,
comprising:
- computing a substitution list comprising pairs of instances of endpoint data types of a chain of functionally related types that connect said data types of conceptually corresponding but not initially computationally equivalent data items of claim 20, where said instances of endpoint data types comprise a pair on said substitution list if both data types of said data type instances are equivalent types except for differing scope designations;
- distinguishing scopes of said disparate but conceptually related elements as host scope and payload scope, where computations from said payload scope are to be employed by said host scope; and
- redesigning all occurrences of payload data type instances within computations from said payload scope to host data type instances within said host scope, where a payload instance occurrence will be rewritten to a computationally equivalent host instance occurrence only if a payload data type instance and a host data type instance exist as a pair on said substitution list.

22. A method of claim 21 for specializing computational specification components to computationally equivalent components within a design framework by using synchronization method of claim 21,
comprising:
- designating said computational specification components as components of said payload scope of claim 21;
- designating said design framework components as components of said host scope of claim 21;
- using an anaphoric reference expression, including but not limited to an Anaphoric Reference Protocol for Synchronization (ARPS) expression, within said host scope and said payload scope to direct instantiation of elements of said payload scope into said anaphoric reference expression specified locations within said host scope;
- synchronizing instantiated elements of said payload scope to said host scope using said method of claim 21 and thereby specializing said instantiated elements to said design framework.

23. A method of claim 1 for including composite types constructed by type constructors in a representation of a target program, where said representation comprises distinct sets of constraint based, domain specific entities, each set of which will determine a distinct design feature within said target program without expressing a form that said feature will take when expressed in a programming language representation within said target program,
whereby design features, which within a target program form would be represented as interrelated programming language structures scattered remotely over said target program, where said programming language structures are more specifically represented as localized, atomic, domain specific entities that express an atomic design feature,
where said domain specific entities constrain evolution of said target program such that in time, said design features will be realized as said interrelated programming language structures scattered remotely over said target program and woven together with other design features separately represented from said design features,
wherein said domain specific entities include but are not limited to composite types constructed by type constructors; iteration constraints, which more specifically may be loop constraints or recursion constraints; partition constraints; sets of partition constraints; domain specific variables specialized to specific constraints, where said domain specific variables represent domain abstractions within problem and program processing domains; and transformations defining building block operations used to define higher level domain specific operators, where said transformations are specialized to partitions by virtue of dependence on said domain specific variables,
comprising:
- representing a distinct design feature as a set of said constraint based, domain specific entities;
- automatically generating said constraint based, domain specific entities in course of but before final generation of said target program in a programming language form;
- automatically processing, searching for elements of, fetching elements from and navigating over said constraint based, domain specific entities, and
- automatically evolving and combining said constraint based, domain specific entities into said target program in a programming language form.

24. A method of claim 23 for automating a connection of separate contexts containing design and programming process domain entities and structures, where said separate contexts may be separated in a plurality of dimensions including but not limited to time and space, and where said connection of separate contexts is specified by an anaphoric reference system, including but not limited to said Anaphoric Reference Protocol for Synchronization (ARPS), wherein an anaphoric reference system expression used within a source context defines specific search and navigation pathways within a second, target context, where said search and navigation pathways lead to data values within said second, target context, where said data values will be used in said source context, and where said navigation pathways traverse said design and programming process domain entities and structures within said second, target context, comprising:

defining an open ended set of access, search and traversal operations that can be combined to build problem specific anaphoric reference system expressions;

denoting program elements that have not yet evolved into program language constructs by domain specific precursors, where said domain specific precursors use a domain specific, abstract reference terminology system based on said anaphoric reference system, and where said domain specific precursors will evolve into said program language constructs; and providing a method for end users and domain engineers to extend said open ended set of access, search and traversal operations and said domain specific, abstract reference terminology system.

\* \* \* \* \*